US010676292B2

(12) United States Patent
Saylor

(10) Patent No.: US 10,676,292 B2
(45) Date of Patent: *Jun. 9, 2020

(54) COMPACT PALLETIZER INCLUDING A SKELETON, SUBASSEMBLY, AND STRETCH WRAP SYSTEM

(71) Applicant: ROI Industries Group, Inc., Durham, NC (US)

(72) Inventor: Kevin M. Saylor, Durham, NC (US)

(73) Assignee: ROI INDUSTRIES GROUP, INC., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,650

(22) Filed: May 9, 2019

(65) Prior Publication Data

US 2019/0263603 A1 Aug. 29, 2019

Related U.S. Application Data

(63) Continuation of application No. 15/894,444, filed on Feb. 12, 2018, now Pat. No. 10,287,112, which is a
(Continued)

(51) Int. Cl.
*B65G 57/03* (2006.01)
*B65B 5/08* (2006.01)
(Continued)

(52) U.S. Cl.
CPC ............... *B65G 57/03* (2013.01); *B65B 5/08* (2013.01); *B65B 5/10* (2013.01); *B65B 11/00* (2013.01);
(Continued)

(58) Field of Classification Search
CPC ......... B65G 57/03; B65B 35/04; B65B 11/00; B65B 5/08; B65B 5/10; B65B 35/52
(Continued)

(56) References Cited

U.S. PATENT DOCUMENTS 4,082,194 A 4/1978 Sheehan
4,242,025 A 12/1980 Thibault
(Continued)

FOREIGN PATENT DOCUMENTS

JP 60189413 9/1985

OTHER PUBLICATIONS

EOL Systems, UCPM Ultra Compact Palletizer Module from End of Line Systems, www.eolsystems.com; Dec. 23, 2015. 1 page.
(Continued)

*Primary Examiner* — Lynn E Schwenning
(74) *Attorney, Agent, or Firm* — NEO IP

(57) ABSTRACT

A compact palletizer including a skeleton, stretch wrap system, and a subassembly. Components of the skeleton are constructed of aluminum, which provides advantages over the prior art in terms of strength, rigidity, weight, and cost. The aluminum may be pre-tensioned or prestressed to provide these advantages. The subassembly is preferably mounted to the side of the skeleton. The compact palletizer is readily portable, and robotic elements of the compact palletizer do not need to be reprogrammed after transport, so installation time is substantially reduced compared with prior art palletizers. A compact stretch wrap system further allows for wrapping palletized products within the compact palletizer.

20 Claims, 53 Drawing Sheets

Related U.S. Application Data continuation-in-part of application No. 15/345,545, filed on Nov. 8, 2016, now Pat. No. 9,902,573, which is a continuation of application No. 14/985,588, filed on Dec. 31, 2015, now Pat. No. 9,511,957.

(51) Int. Cl.

| | | |
|---|---|---|
| *B65B 5/10* | (2006.01) | |
| *B65B 35/52* | (2006.01) | |
| *B65B 35/22* | (2006.01) | |
| *B65B 11/00* | (2006.01) | |
| *B65B 11/04* | (2006.01) | |
| *B65B 35/04* | (2006.01) | |
| *B65G 61/00* | (2006.01) | |

(52) U.S. Cl.
CPC ............ *B65B 11/045* (2013.01); *B65B 35/04* (2013.01); *B65B 35/22* (2013.01); *B65B 35/52* (2013.01); *B65G 61/00* (2013.01)

(58) Field of Classification Search
USPC .................................. 414/799, 801; 901/16
See application file for complete search history.

(56) References Cited

U.S. PATENT DOCUMENTS

| | | | |
|---|---|---|---|
| 4,409,776 A | 10/1983 | Usui | |
| 4,587,796 A | 5/1986 | Haloila | |
| 4,597,707 A | 7/1986 | Cornacchia | |
| 4,610,592 A | 9/1986 | Pienta | |
| 4,701,092 A | 10/1987 | Reynaud et al. | |
| 4,746,255 A | 5/1988 | Roccabianca et al. | |
| 4,836,111 A | 6/1989 | Kaufmann | |
| 4,850,782 A | 7/1989 | Focke | |
| 4,850,783 A | 7/1989 | Maekawa | |
| 5,005,335 A | 4/1991 | Yourgalite et al. | |
| 5,100,284 A | 3/1992 | Boisseau | |
| 5,415,520 A | 5/1995 | Seiver | |
| 5,450,709 A | 9/1995 | Steding | |
| 5,564,254 A | 10/1996 | Thimon et al. | |
| 5,768,845 A | 6/1998 | Beaulieu et al. | |
| 6,092,736 A | 7/2000 | Conkle | |
| 6,170,228 B1 | 1/2001 | Zeman | |
| 6,718,229 B1 | 4/2004 | Takebayashi et al. | |
| 6,923,085 B2 | 8/2005 | Nakano | |
| 6,987,241 B2 | 1/2006 | Häcker et al. | |
| 7,993,095 B2 | 8/2011 | Reichler | |
| 8,074,431 B1 * | 12/2011 | Pierson | B65G 47/086 414/791.6 |
| 8,371,797 B2 | 2/2013 | Bonhomme | |
| 8,539,739 B2 | 9/2013 | Pierson et al. | |
| 8,607,528 B2 | 12/2013 | Ellen | |
| 8,960,468 B2 | 2/2015 | Boivin | |
| 9,102,480 B2 | 8/2015 | Snapp | |
| 9,511,957 B1 | 12/2016 | Saylor | |
| 9,688,428 B2 | 6/2017 | Liu | |
| 9,896,229 B1 | 2/2018 | Pierson et al. | |
| 9,902,573 B2 | 2/2018 | Saylor | |
| 10,287,112 B2 * | 5/2019 | Saylor | B65B 35/22 |
| 2002/0064447 A1 | 5/2002 | Gurevich et al. | |
| 2003/0131571 A1 | 7/2003 | Demarco | |
| 2005/0265817 A1 | 12/2005 | Blanc | |
| 2009/0092476 A1 | 4/2009 | Salm | |
| 2010/0023159 A1 | 1/2010 | Mueller | |
| 2010/0226746 A1 | 9/2010 | Junghans | |
| 2010/0310349 A1 | 12/2010 | Bonhomme | |
| 2012/0213625 A1 | 8/2012 | Roberts | |
| 2012/0282066 A1 | 11/2012 | Naumann et al. | |
| 2014/0053668 A1 | 2/2014 | Shan et al. | |
| 2014/0294553 A1 | 10/2014 | Petrovic | |
| 2017/0190519 A1 | 7/2017 | Saylor | |
| 2018/0162660 A1 | 6/2018 | Saylor | |

OTHER PUBLICATIONS

Euroimpianti Skilled 101 Palletizing Robot Brochure, www.skilledrobots.com, Euroimpianti S.p.A., Via Lago di Vico, 80, 36015 Schio—Vicenza IT; 5 pages.

Izzo, Anthoney, "How to Determine Safe Stacking Heights", Jan. 16, 2014, Compliance & Risk Management.

JZW Control Systems, MiniPal Palletizer, MiniPal Compact Palletizer Brochure, PO Box 322, Dee Why NSW 2099 Australia, www.jzw.com.au. 2 pages.

* cited by examiner

COMPACT PALLETIZER INCLUDING A SKELETON, SUBASSEMBLY, AND STRETCH WRAP SYSTEM

CROSS-REFERENCE TO RELATED APPLICATIONS

This application relates to and claims priority from the following U.S. patent applications: this application is a continuation of U.S. patent application Ser. No. 15/894,444, filed Feb. 12, 2018, which is a continuation-in-part of U.S. patent application Ser. No. 15/345,545, now U.S. Pat. No. 9,902,573, filed on Nov. 11, 2016, which is a continuation of U.S. patent application Ser. No. 14/985,588, now U.S. Pat. No. 9,511,957, filed on Dec. 31, 2015, each of which is hereby incorporated by reference in its entirety.

BACKGROUND OF THE INVENTION

1. Field of the Invention

The present invention relates to a compact palletizer and the components thereof. The palletizer includes a skeleton, a stretch wrap system, and a subassembly. The present invention utilizes materials and configurations which provide for advantages over the prior art in terms of cost, size, weight, portability, speed, control, and application.

2. Description of the Prior Art

Generally, palletizers are known in the prior art. Examples of relevant prior art documents include the following:

U.S. Pat. No. 6,718,229 for "Linear actuator palletizing system and method" by Takebayashi, filed Nov. 3, 2000, describes a method for programming a multi-axis actuator system to perform palletizing uses an intuitive user interface having a data entry screen for palletizing data, which requires only a simple setting of minimal parameters including the number of rows and columns in a pallet and the pitch spacing between pallet positions. Actuator positions necessary for palletizing movements are calculated in real time by an algorithm executed in a digital signal processor of the actuator controllers. Palletizing data entries are stored in a motion profile table in a range of consecutively paired indexes which is separated from the index range dedicated to regular single-step or torque moves.

U.S. Pat. No. 4,597,707 for "Automatic operating palletizer" by Cornacchia, filed Aug. 17, 1984, describes an automatically operating palletizer which includes a vertical support column, a horizontally positioned support beam, and means for movably mounting the horizontal support beam on the support column for vertical movement relative to the support column. A horizontally extending product beam is movably mounted on the horizontal support beam and extends perpendicularly thereto. A product carrier is slidably mounted on the product support beam for movement along its length. Drive means are provided to drive the horizontal support beam and the product support beam to a plurality of vertical and horizontal positions relative to the support column, and also to drive the product carrier along the support beam. As a result the product carrier is positioned at any of a plurality of predetermined positions in a three dimensional volume to move products from one position, e.g. a pickup station, to any of a plurality of other predetermined positions. The support column and various beams of the palletizer are formed of light weight stainless steel.

U.S. Pat. No. 8,539,739 for "Method of palletizing items" by Pierson, filed Jul. 16, 2012, describes compact palletizers that include a stretch-wrap operation as the pallet is built. A four-sided compaction mechanism compresses the rough-built load to the final pallet size and then the entire layer is released to the pallet. Individual items or group of items are picked and placed onto a layer support device in a loose orientation. The loose orientation enables a much faster palletizing operation because the robotic arm that pick-and-places the item, the items, or the row of items, can travel much faster as it does not have to precisely locate the item, items, or row of items. During the time that a layer is being loosely constructed on the layer support device concurrent wrapping can occur.

U.S. Patent Application Publication No. 2012/0213625 for "Robotic Palletizer Cell And Method Of Construction" by Roberts, filed Feb. 20, 2012, describes a method of constructing a palletizer cell by providing square platform bases which are assembled into an array in abutment with each other, each platform base mounting a respective component of palletizing equipment, such as a robot, one or more conveyors, a slip sheet bin, a discharge module, etc. with one platform base anchored to the factory floor and the rest attached to one or another of the platform bases to form the array of platform bases thereby properly locating the various equipment with each other by the fitting together of the platform bases. Safety fencing sections are mounted atop one or more outer sides to substantially enclose the space within the palletizer cell. Each platform base is formed with side openings which may be engaged with the tines of a fork lift.

U.S. Pat. No. 8,371,797 for "Secured palletization facility" by Bonhomme, filed Sep. 25, 2008, describes a facility including a robot (2) for supplying pallet preparation stations with products (3) of the crate type or different. The structure of the facility includes side walls (11) and doors (13, 14) for accessing the palletization stations A and B. The structure further includes a fixed wall (15) separating stations A and B, and a cowling (20) mobile from one station to the other and in the shape of a dihedron, for alternatively converting each palletization station A and B into a kind of pallet hatch, wherein said conversion is carried out automatically before the opening of the door for accessing a loaded pallet located in said hatch. The cowling (20) is directly actuated by the product handling robot (2).

U.S. Pat. No. 4,082,194 for "Self-contained pallet-elevating bag palletizer" by Sheehan, filed Jun. 30, 1976, describes a wheel-supported palletizer frame structure that has an empty-pallet magazine containing an empty pallet stack from the bottom of which empty pallets are delivered one by one to a hydraulic scissors pallet elevator while the rearward ends of the pallets remaining in the stack are temporarily lifted. The pallet elevator has a table which is raised and then lowered step-by-step by a hydraulic scissors mechanism from successive elevated positions wherein the platform or each tier of bags thereon is lowered in timed relationship with a rotary and reciprocable open-ended bag positioner. Filled bags are fed one-by-one to either of the opposite ends of the bag positioner from a horizontal bag conveyor aligned with the bottom of the bag positioner and coupled thereto for travel back and forth therewith. The bag positioner is rotatable between either of two longitudinal positions aligned with the conveyor and movable into any one of a plurality of lateral positions disposed transverse to said bag conveyor. The bag positioner is also movable laterally of the bag conveyor to position the bags dropped therefrom onto different longitudinal positions parallel to the bag conveyor.

The bag positioner is also mounted for motion transverse to the direction of motion of the bag conveyor to deposit the bags in different lateral positions perpendicular to the bag conveyor. The open-ended bag positioner enables individual bags to be swung horizontally to positions 90° and 270° apart in order to position the sewed end of each bag on the inside of each tier of the stack of bags on the pallet. The four-wheeled mount of the entire machine enables it to be moved bodily to any desired position upon the floor of the warehouse or other palletizing building.

U.S. Pat. No. 7,993,095 for "Mobile split palletizer" by Reichler, filed Oct. 30, 2010, describes a modular split palletizer for loading layers of articles on stackable pallets. The palletizer has a frame supporting first, second, and third sections. The first section includes a layer build area and a first portion of a stacker transfer track. The second section includes a tier sheet bin, a top frame bin, and a second portion of the track. The third section includes a pallet build area and a third portion of the track. Each of the first, second, and third sections can be disassembled, moved individually and independently, and re-assembled at a new location to form the complete palletizer. Also disclosed is a method of relocating the modular split palletizer. With the palletizer at one location, the utilities connected to the palletizer are disconnected, the fasteners holding the sections together are released, and the sections are separated. The disassembled sections are moved to the new location and reassembled.

None of the prior art references discloses the compact palletizer of the present invention, specifically a compact palletizer with features such as a cantilevered y-axis, a pre-tensioned double x-axis structure, a 4-rail x-axis system, modular x, z, y, and theta subassemblies, modular design, wheels for mobility, forklift access, unibody frame construction wherein the x-axis structure is also part of the skeleton, integrated safety panels, compact height, a non-welded frame, an assembly that is not top mounted, and an extruded aluminum profile frame.

SUMMARY OF THE INVENTION

The present invention relates to a compact palletizer and the components thereof. The palletizer includes a skeleton and a subassembly. The present invention utilizes materials and configurations which provide for advantages over the prior art in terms of cost, size, weight, portability, speed, and control. Specifically, an extruded aluminum profile frame as utilized in a compact palletizer of the present invention is advantageous over the construction of palletizers of the prior art. The present invention also provides for a pre-tensioned, 4-rail x-axis system as well as a compact palletizer which can be moved without requiring reassembly for operation.

One embodiment of the present invention is a compact palletizer comprising: a skeleton including a base, a frame, and an x-axis structure; an assembly including an x-axis subassembly, a z-axis subassembly, and a y-axis subassembly; and a stretch wrap system; wherein the frame includes a multiplicity of vertical posts and a multiplicity of horizontal bars; wherein the x-axis structure includes two horizontal support beams rigidly fixed between two vertical end plates; wherein the x-axis subassembly is affixed to the x-axis structure, and the x-axis subassembly provides an interface for movement of the z-axis subassembly; wherein the z-axis subassembly includes a chassis subassembly and a spine, wherein the chassis subassembly is operable to move vertically along the spine and wherein the y-axis subassembly is attached to the z-axis subassembly via the chassis subassembly; wherein the compact palletizer further includes a plurality of panels affixed to the multiplicity of vertical posts and/or the multiplicity of horizontal bars; and wherein the stretch wrap system includes a pre-stretch unit, a swing arm with a wiper, and a turntable.

Another embodiment of the present invention is a compact palletizer comprising: a skeleton including a base, a frame, and an x-axis structure; an assembly including an x-axis subassembly, a z-axis subassembly, a y-axis subassembly, and a theta-axis subassembly; and a stretch wrap system including a pre-stretch unit and a turntable; wherein the frame includes a multiplicity of vertical posts; wherein the x-axis structure includes two horizontal support beams rigidly fixed between two vertical end plates, and two plates for mounting rails, wherein the two plates for mounting rails are parallel to the two horizontal support beams; wherein the z-axis subassembly is operable to translate horizontally along the x-axis subassembly; wherein the z-axis subassembly includes a spine and a chassis subassembly, wherein the chassis subassembly is operable to translate vertically along the spine; wherein the y-axis subassembly is attached to the z-axis subassembly via the chassis subassembly; wherein the theta-axis subassembly is mounted to the y-axis subassembly; and wherein the theta-axis subassembly includes an end of arm tooling (EOAT) subassembly.

Yet another embodiment of the present invention is a compact palletizer comprising: a skeleton including a base, a frame, and a stretch wrap system; and an assembly including an x-axis subassembly and a theta axis subassembly including an arm with an end of arm tooling (EOAT) subassembly for moving at least one object; wherein the stretch wrap system includes a pre-stretch unit, a turntable, and a swing arm with a wiper; wherein the frame includes a multiplicity of vertical posts and a multiplicity of horizontal bars; wherein the x-axis subassembly includes two sets of rails, wherein the two sets of rails are connected to roller mounts such that each set of the two sets of rails is connected to one roller mount, wherein the roller mounts provide for horizontal movement of the z-axis subassembly via the two sets of rails and the roller mounts; wherein the compact palletizer is less than approximately 2.4384 meters (96 inches) in length, between approximately 2.6924 meters to 3.6576 meters (106 and 144 inches) in height, and less than approximately 2.7686 meters (109 inches) in depth; and wherein the pre-stretch unit translates along a vertical track automatically or based on manual input.

Another embodiment of the present invention is a compact palletizer including a skeleton including a steel base and a frame, and an assembly including an arm with an end of arm tooling (EOAT) subassembly for moving at least one object, wherein the compact palletizer does not measure more than about 3.35 meters in height when assembled, and wherein a stack height of the compact palletizer is at least about 2.57 meters.

These and other aspects of the present invention will become apparent to those skilled in the art after a reading of the following description of the preferred embodiment when considered with the drawings, as they support the claimed invention.

DETAILED DESCRIPTION

Figure 1:
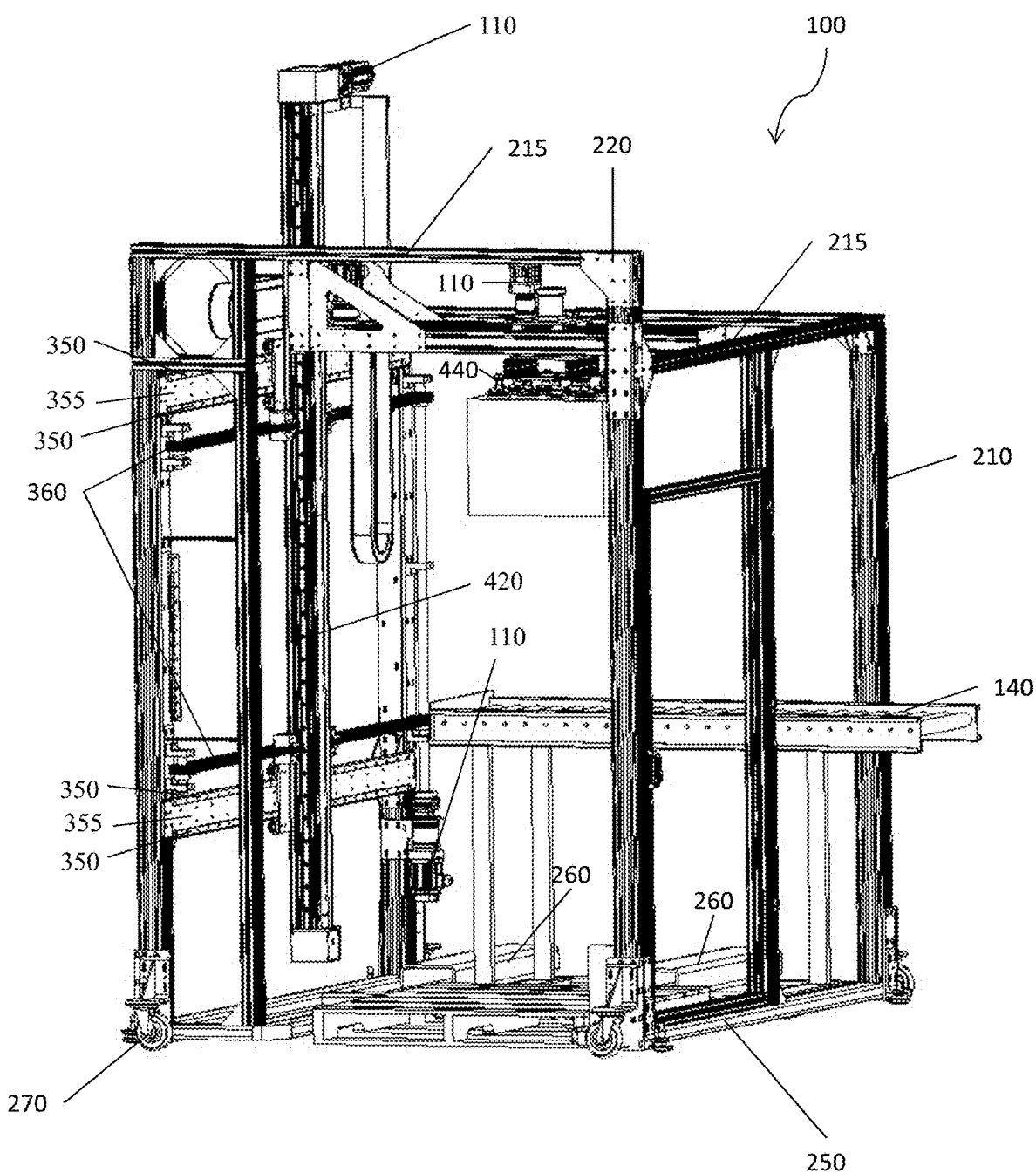
FIG. 1 illustrates a perspective front view of a palletizer with no panels according to the present invention.

Referring now to the drawings in general, the illustrations are for the purpose of describing a preferred embodiment of the invention and are not intended to limit the invention thereto.

The present invention provides a compact palletizer including a skeleton and a subassembly. In one embodiment, the skeleton includes a base, a frame, and an x-axis structure. Preferably, the base is constructed of steel. Preferably, the frame and/or the x-axis structure is constructed of extruded aluminum profile. In another embodiment, some of the components of the base, frame, and/or the x-axis structure are constructed of aluminum. Preferably, vertical posts of the frame and the x-axis structure are constructed of extruded aluminum profile. In one embodiment, the compact palletizer does not include any panels.

In one embodiment, the x-axis structure includes two horizontal support beams (top horizontal support and bottom horizontal support) rigidly fixed between two vertical end plates, and two plates parallel to the two horizontal support beams serving as v-guide rail mounts. Preferably, the two vertical end plates are two precision cut aluminum plates. The two vertical end plates set the spacing between the two horizontal support beams and to insure parallel assembly of these components. Preferably, the two horizontal support beams are constructed out of extruded aluminum profile. The two vertical end plates are preferably perpendicularly affixed to the two horizontal support beams. Preferably, the two horizontal support beams are rigidly fixed between two vertical end plates using bolts and are not welded. Preferably, the x-axis structure does not flex. Preferably, the two plates parallel to the two horizontal support beams serving as v-guide rail mounts are rigidly affixed to the two vertical end plates using bolts and are not welded.

FIG. 1 illustrates a perspective front view of a palletizer with no panels according to the present invention, showing the compact palletizer 100 having motors 110, a conveyer 140, vertical posts of the frame 210, horizontal bars of the frame 215, corner braces 220, a steel base 250, forklift pockets 260, wheels 270, v-rails 350, plates for mounting v-rails 355, timing belts 360, a spine 420, and an end of arm tooling (EOAT) assembly 440.

Figure 2:
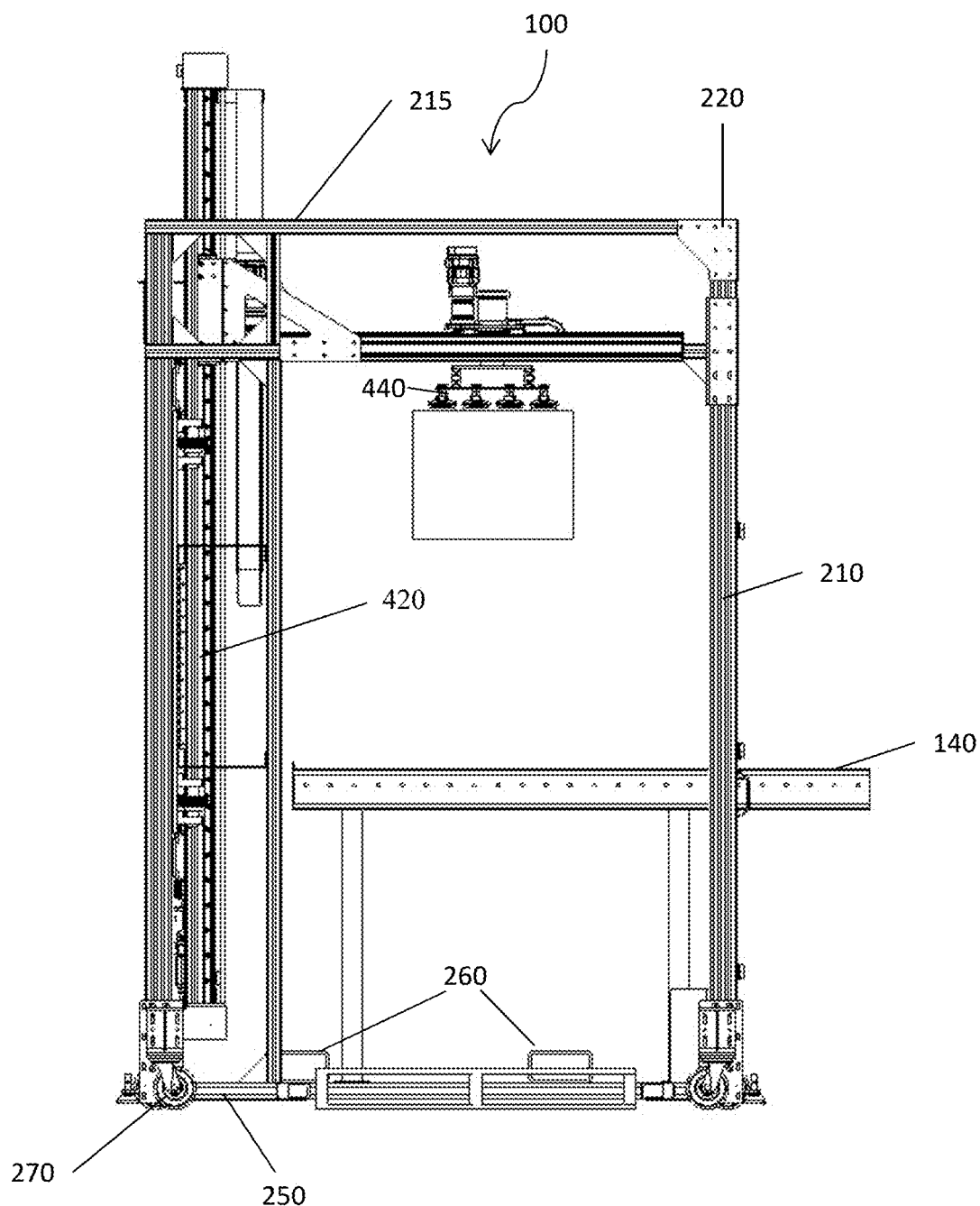
FIG. 2 illustrates a front view of a palletizer according to the present invention.

FIG. 2 illustrates a front view of a palletizer according to the present invention, showing the compact palletizer 100 having a conveyer 140, vertical posts of the frame 210, horizontal bars of the frame 215, corner braces 220, a steel base 250, forklift pockets 260, wheels 270, a spine 420, and an end of arm tooling (EOAT) assembly 440.

Figure 3:
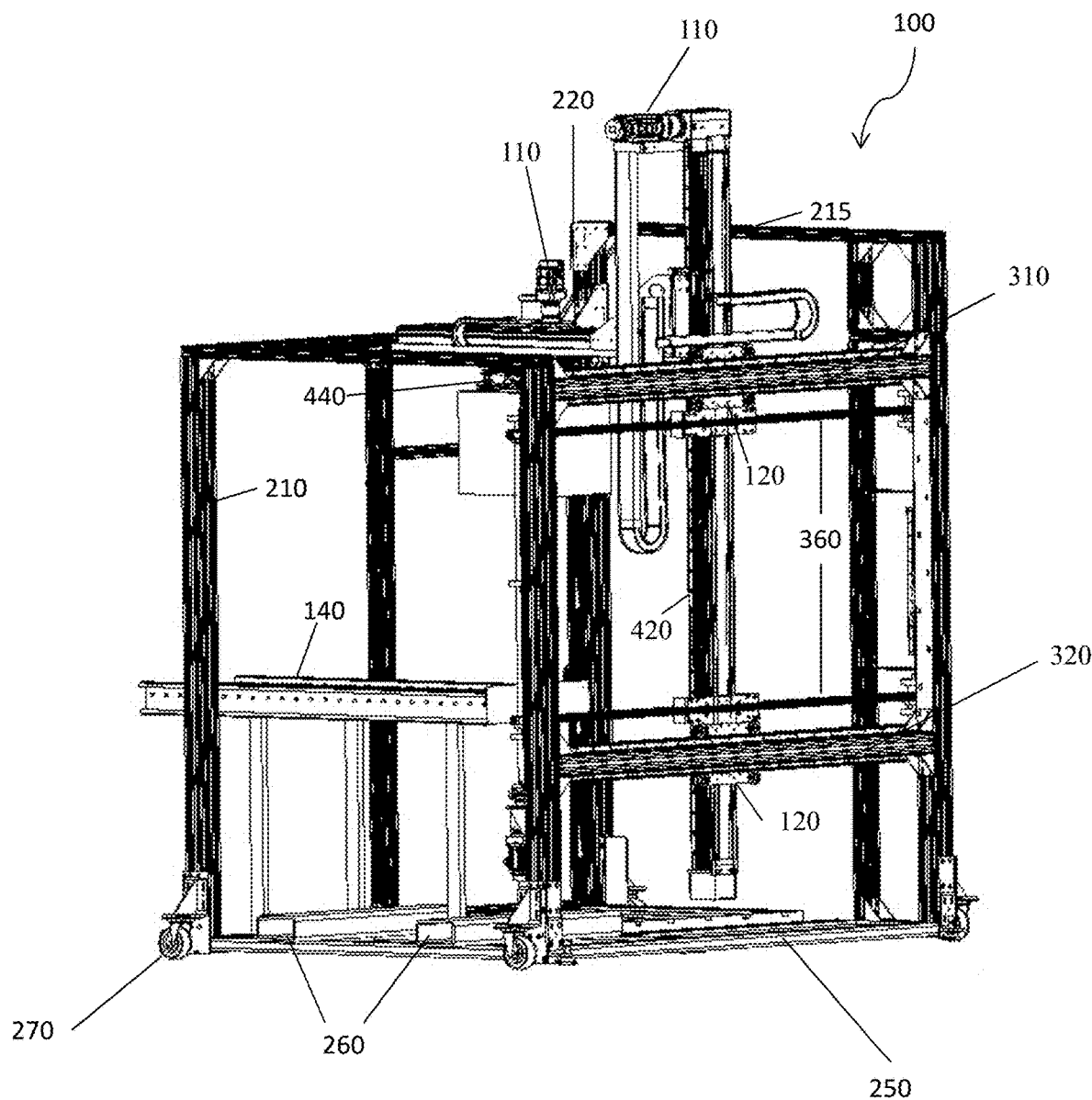
FIG. 3 illustrates a perspective rear view of a palletizer with no panels according to the present invention.

FIG. 3 illustrates a perspective rear view of a palletizer with no panels according to the present invention, showing the compact palletizer 100 having motors 110, z-axis mounting extruded aluminum profile components, a conveyer 140, vertical posts of the frame 210, horizontal bars of the frame 215, corner braces 220, a steel base 250, forklift pockets 260, wheels 270, a top horizontal support beam 310, a bottom horizontal support beam 320, a spine 420, and an end of arm tooling (EOAT) assembly 440.

Figure 4:
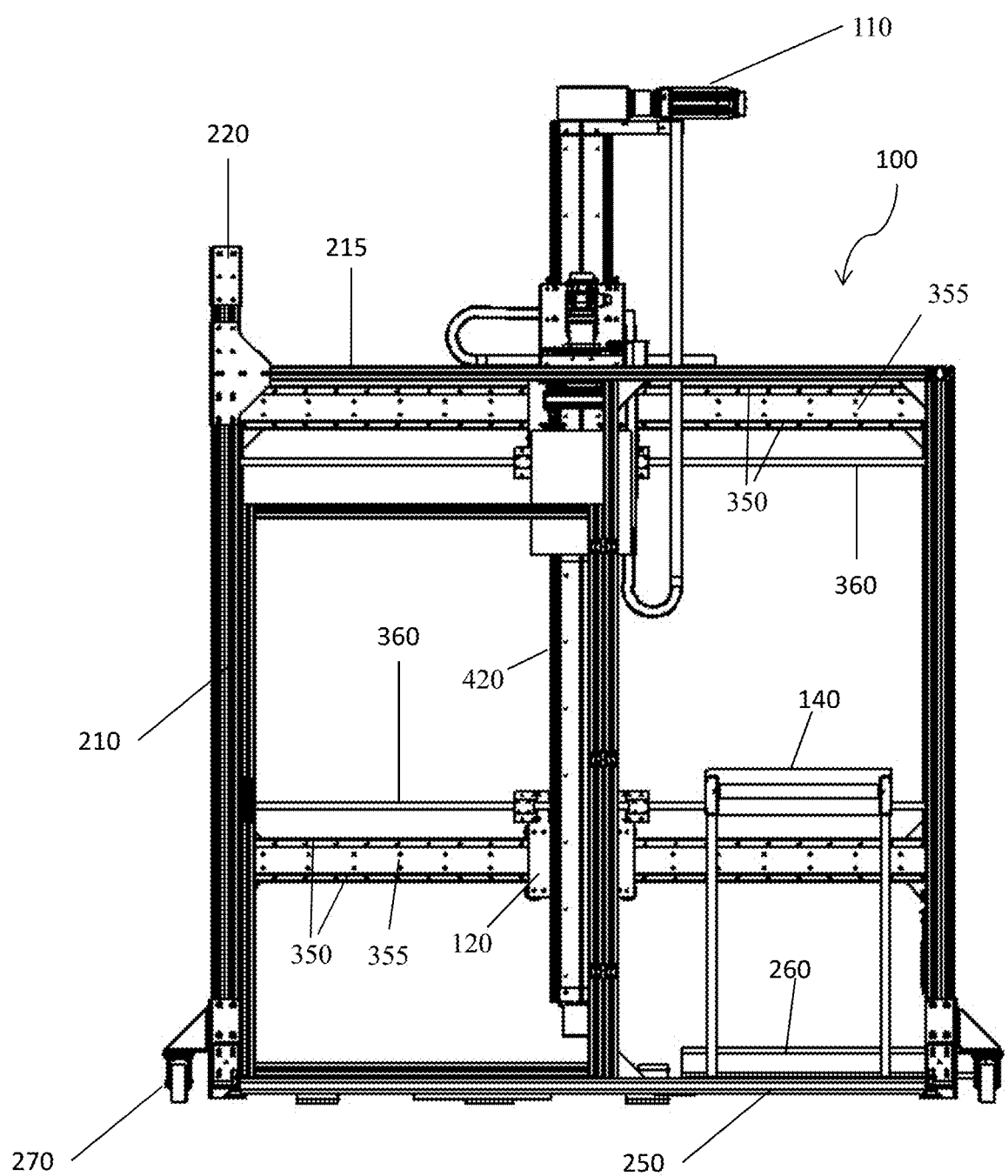
FIG. 4 illustrates a side view of a palletizer according to the present invention.

FIG. 4 illustrates a side view of a palletizer according to the present invention, showing the compact palletizer 100 having a motor 110, v-roller mount and belt tensioner 120, a conveyer 140, vertical posts of the frame 210, horizontal bars of the frame 215, corner braces 220, a steel base 250, forklift pockets 260, wheels 270, v-rails 350, plates for mounting v-rails 355, timing belts 360, and a spine 420.

Figure 5:
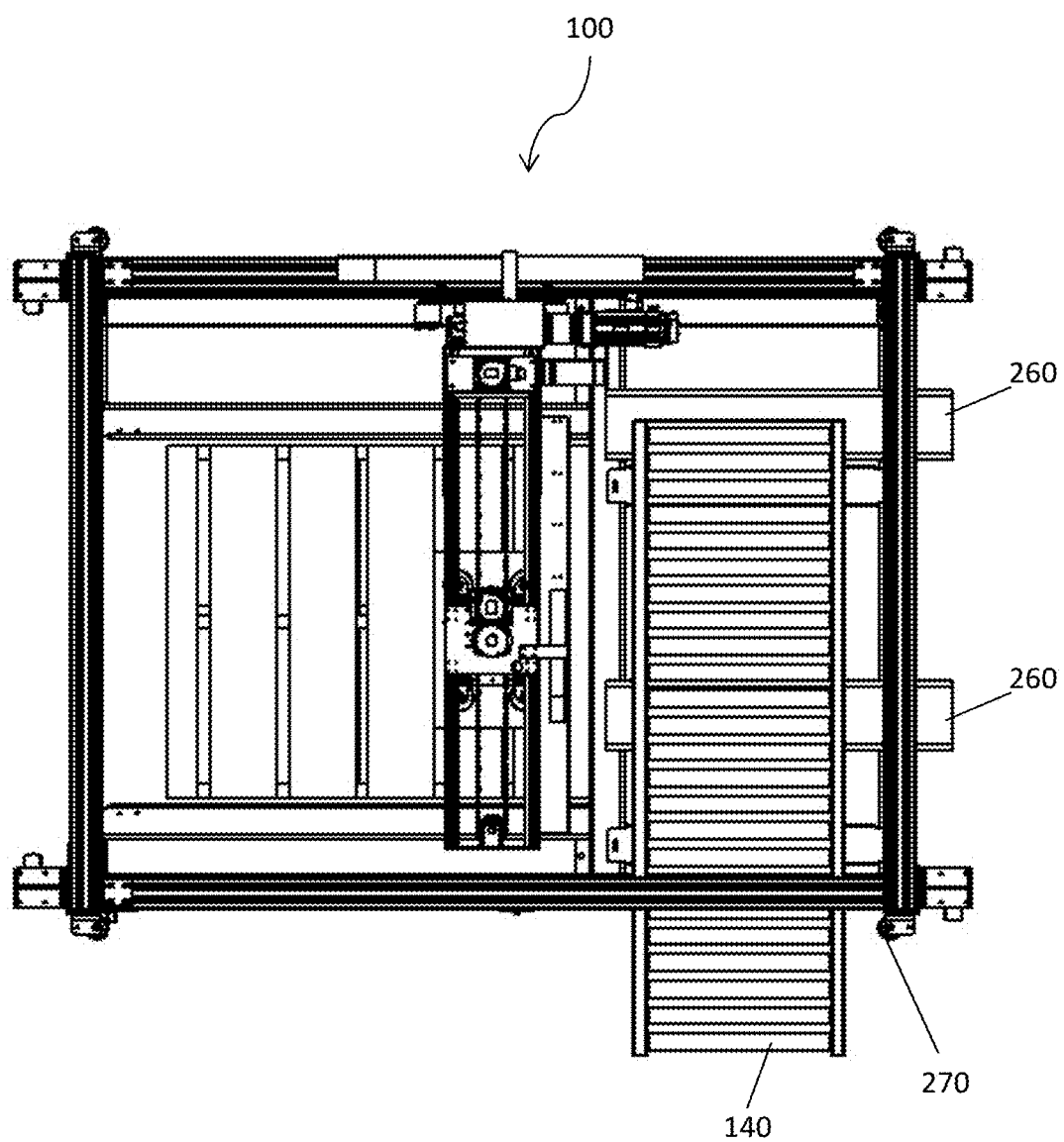
FIG. 5 illustrates a top view of a palletizer according to the present invention.

FIG. 5 illustrates a top view of a palletizer according to the present invention, showing the compact palletizer 100 having a conveyer 140, forklift pockets 260, and wheels 270.

In another embodiment, the present invention includes a skeleton having a base, a frame, and an x-axis structure and panels. Preferably, the frame is constructed of extruded aluminum profile. Preferably, the panels are constructed of polycarbonate. The polycarbonate panels add strength, rigidity, and stiffness to the structure, as well as creating a safe enclosure. In another embodiment, the panels include aluminum diamond plate. The panels provide security and safety by partially enclosing the compact palletizer. In one embodiment, the panels become an integral part of the assembly, thus adding even more rigidity to the already rigid palletizer.

In one embodiment, the compact palletizer also includes glass panels and/or glass doors. The glass panels and/or glass doors are operable to make the interior of the palletizer accessible, as well as to provide visibility into the interior of the palletizer.

Figure 6:
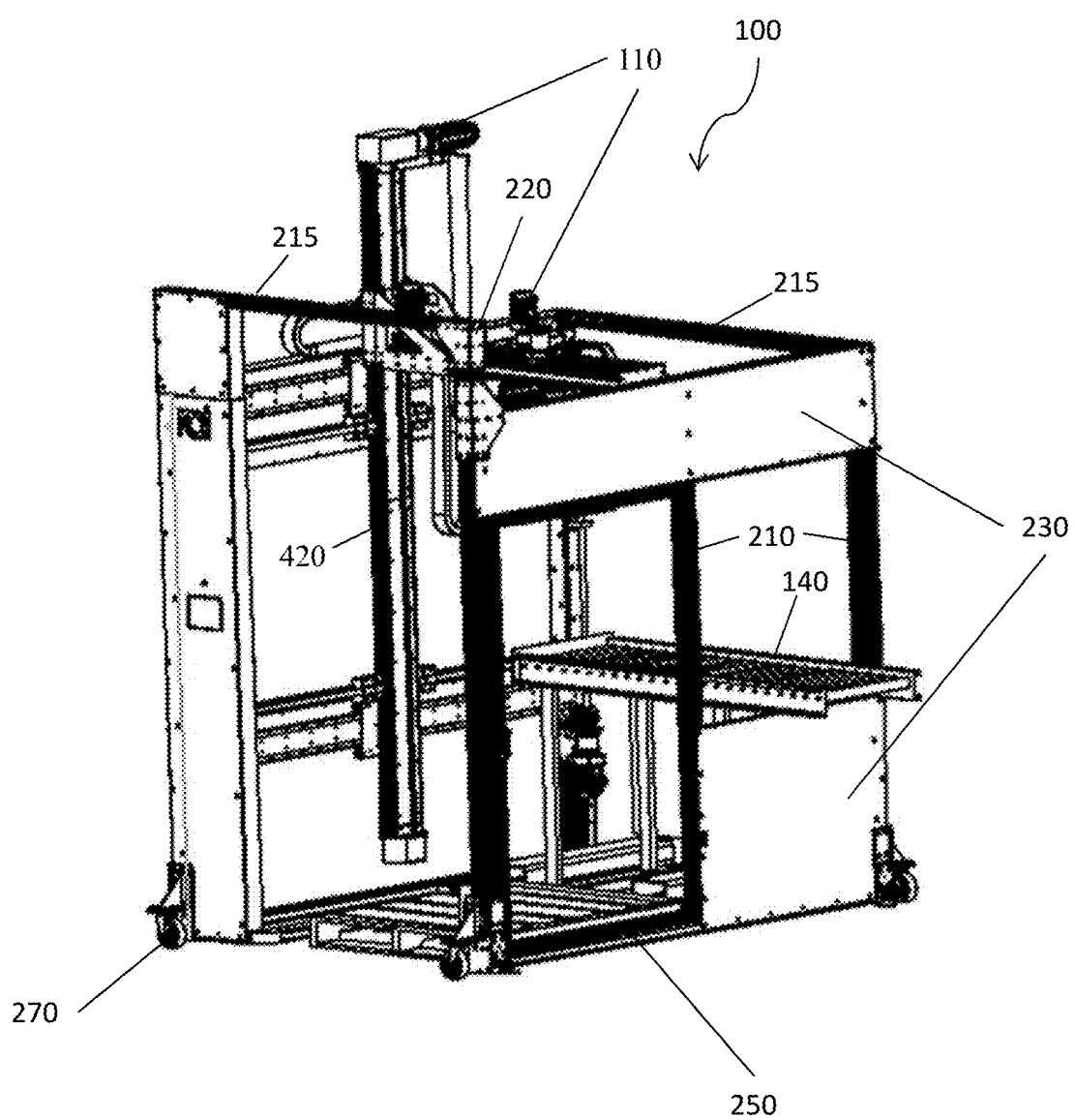
FIG. 6 illustrates a perspective front view of a palletizer with panels according to the present invention.

FIG. 6 illustrates a perspective front view of a palletizer with panels according to the present invention, showing the compact palletizer 100 having motors 110, a conveyer 140, vertical posts of the frame 210, horizontal bars of the frame 215, corner braces 220, a steel base 250, forklift pockets 260, wheels 270, and a spine 420.

Figure 7:
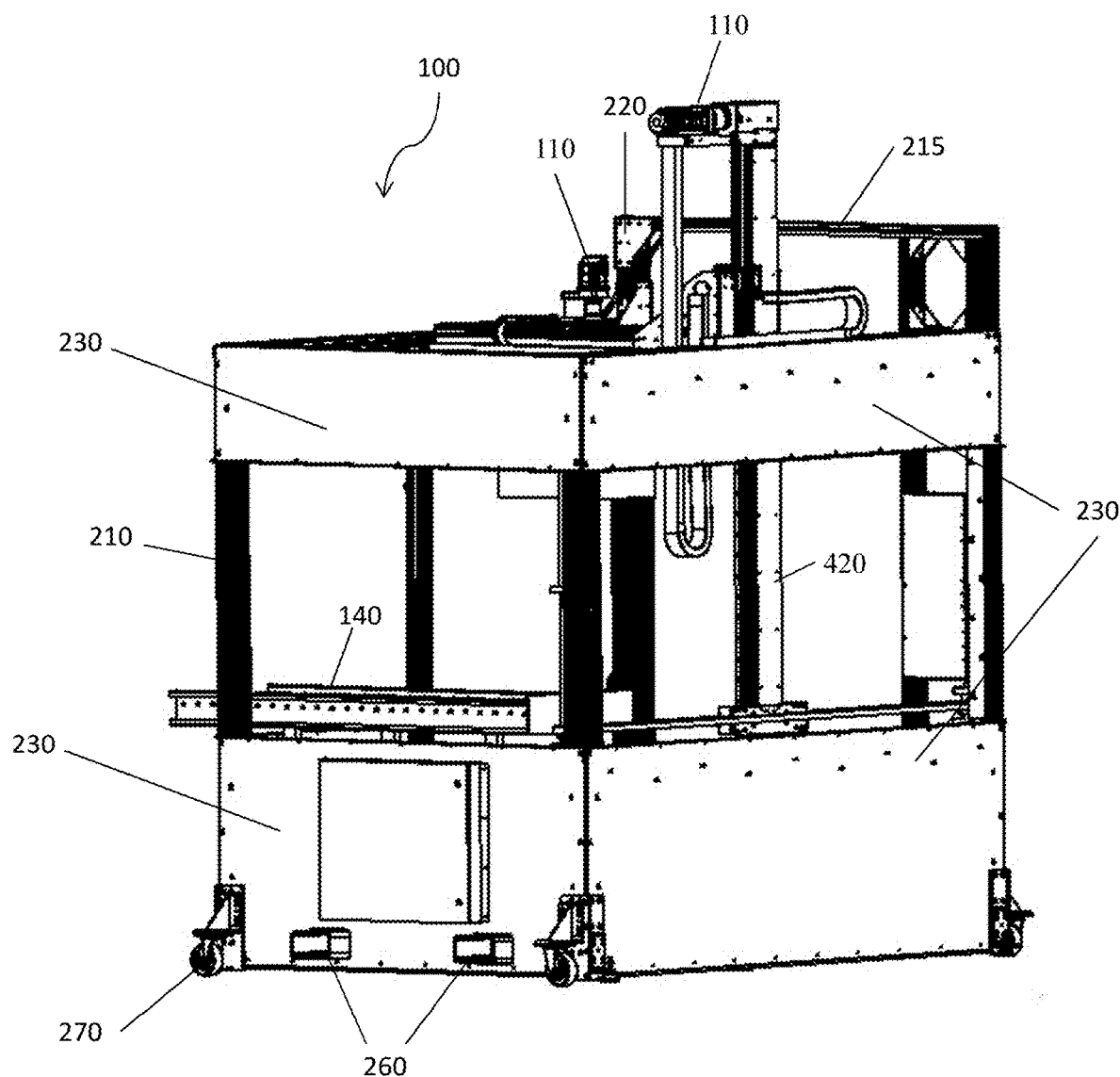
FIG. 7 illustrates a perspective rear view of a palletizer with panels according to the present invention.

FIG. 7 illustrates a perspective rear view of a palletizer with panels according to the present invention, showing the compact palletizer 100 having motors 110, a conveyer 140, vertical posts of the frame 210, horizontal bars of the frame 215, corner braces 220, panels 230, forklift pockets 260, wheels 270, and a spine 420.

Although extruded aluminum profile is preferred for use in the skeleton, other material that is lightweight, has a high tensile strength, and has a high impact resistance can be utilized in the compact palletizer of the present invention. However, stainless steel is preferred for embodiments in the food and food preparation industry because of sanitation concerns. In particular, aluminum is known to collect dust, bacteria, and other contaminants. Therefore, steel tubing may be used instead of extruded aluminum profile where avoidance of collection of dust, bacteria, and other contaminants is desired or required. Because more processing and machining is required for steel, steel would preferably only be used in specific applications where aluminum would not be a suitable material.

Aluminum, and more specifically extruded aluminum profile, is preferred for use in the frame and subassembly components of the present invention because it provides lightweight material with high rigidity, tensile strength and impact resistance. Importantly, traditional engineering principles teach away from the use of extruded aluminum profile material for a compact palletizer machine because it would increase vibration in the overall structure, which would be disadvantageous. However, surprisingly, the compact palletizer of the present invention in its preferred embodiment using extruded aluminum profile is constructed and configured under pre-tensioning and pre-stressing with bolted connections that minimize or eliminate vibration. Thus, the present invention solves a longstanding, unmet need for a lightweight, strong, and compact palletizer using extruded aluminum profile that is constructed and configured as described herein to overcome prior art disadvantages with improved structure and faster installation.

In alternative embodiments, specific applications may provide for use of other suitable lightweight, strong metals and metal alloys. In particular, suitable metals and metal alloys include magnesium, titanium, beryllium, and combinations thereof. More specifically, magnesium may be combined with silicon carbide to form a lightweight metal with record strength. Additionally, a metal alloy comprised of lithium, magnesium, titanium, aluminum, and scandium may be used in the frame and/or subassembly components of the present invention. However, aluminum, and more specifically extruded aluminum profile, is preferred in the present invention because of availability, cost, its high strength, and its light weight. Extruded aluminum profile is preferred for use in the frame of the skeleton because it is a lightweight material with high rigidity, tensile strength and impact resistance. Notably, the extruded aluminum profile frame of the present invention is bolted, not welded. Bolting allows more rapid assembly and easier repair than welding. Additionally, assembly by bolting is currently more cost effective than welding. The compact palletizer is readily portable, and robotic elements of the compact palletizer do not need to be reprogrammed after transport, so installation time is substantially reduced compared with prior art palletizers.

The extruded aluminum profile frame designed and constructed according to the present invention provides unexpectedly improved properties over the prior art. Rather than merely substituting one material (aluminum) for another (such as steel), and obtaining expected results, using an aluminum palletizer provides for enhanced rigidity and stability over a steel palletizer. Using aluminum in components of the palletizer of the present invention also provides for use of smaller motors and gears when compared to motors and gears of a steel palletizer, thereby reducing the weight of the compact palletizer even further.

Additionally, one of ordinary skill in the art would not be motivated to use extruded aluminum profile in the structural components of a palletizer because of concerns about vibrations, rigidity, and durability of an aluminum palletizer.

Figure 8:
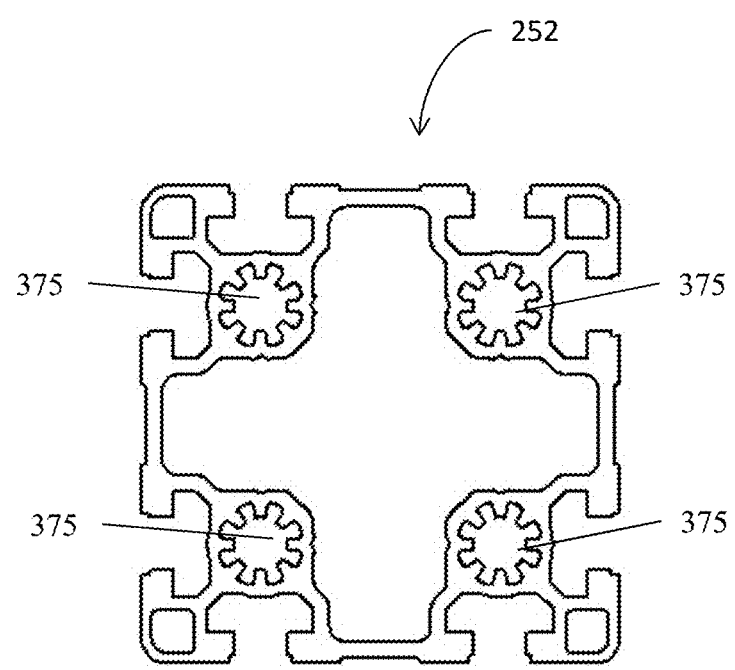
FIG. 8 illustrates an end view of a square profile of extruded aluminum profile used in one embodiment of the present invention.

FIG. 8 illustrates an end view of a square profile of extruded aluminum profile used in one embodiment the present invention. The end view shows precision cut, countersunk holes 375. Preferably, this extruded aluminum profile is used in the horizontal bars of the frame of the present invention. However, any component constructed of extruded aluminum may have this end profile.

Figure 9:
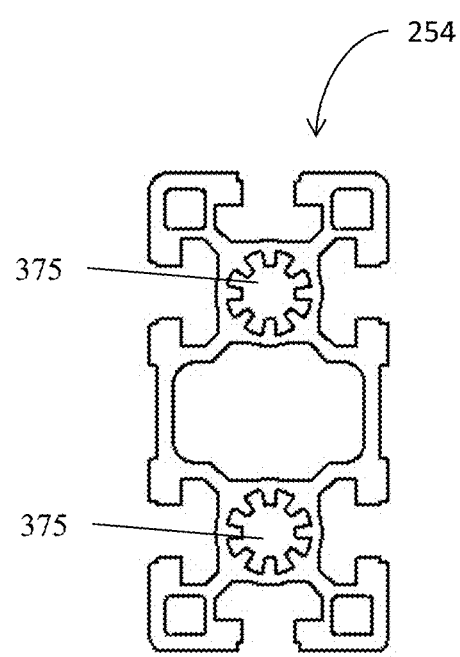
FIG. 9 illustrates an end view of a rectangular profile of extruded aluminum profile used in one embodiment the present invention.

FIG. 9 illustrates an end view of a rectangular profile of extruded aluminum profile used in one embodiment of the present invention. The end view shows precision cut, countersunk holes 375. Preferably, this extruded aluminum profile is used in the vertical posts and horizontal beams of the frame of the present invention. However, any component constructed of extruded aluminum may have this end profile.

There has also been a long-felt but unmet need to provide a palletizer that is easily and efficiently assembled. The compact palletizer of the present invention requires a group of people only 2-3 hours to assemble as opposed to prior art palletizers, which would take an identical or similar group of people 2-3 days to construct. A compact palletizer of the present invention is also movable, as it is on wheels. The compact palletizer is also transportable, solving a long-felt but unmet need. Additionally, the robotic elements of the compact palletizer are preprogrammed and merely require re-homing or re-zeroing, not reprogramming, upon assembly or transport, which solves a long-felt but unmet need of providing a palletizer that does not require reprogramming after being transported to function. There has also been a long-felt need to make palletizers lighter due to concerns about cost and portability, yet an aluminum palletizer has not been successfully commercialized. Another long-felt need is to make palletizers more cost effective, which the present invention provides in one embodiment by providing a palletizer with a frame that can be assembled using bolts, which are more cost effective than welding.

Prior art palletizer frames are typically constructed of steel and held together by welding. The prior art is disadvantageous in that welding steel together is not precise. Additionally, welding steel together provides for a permanently bonded x-frame which is not adjustable. In contrast, the present invention provides for an aluminum x-frame which is precisely assembled and, if necessary or desired, could be adjusted by unfastening the bolts with appropriate tools, adjusting the frame, and refastening the bolts. A surprising advantage of using extruded aluminum profile and bolts, and preferably a pre-tensioned extruded aluminum profile frame, for construction of the x-frame is that the x-frame is sufficiently rigid, stable, and vibration-less to allow the palletizer to be operated extensively and transported without losing calibration.

Preferably, the palletizer includes a base. In one embodiment, the base is comprised of steel tubing and steel plates. Preferably, the steel tubing and steel plates are welded together to form the base of the compact palletizer. Accommodation is made in the base for positioning a pallet and/or for adding accessories such as conveyors for automatic infeed of empty pallets and outfeed of loaded pallets. The frame also sets the vertical angle (preferably between 1 degree and 2 degrees outward) of the x-frame support columns for tensioning the frame. Pallet infeed is unique for a palletizer of this size. Pallet build-up with pallet feed is also unique. The base preferably includes access for the forks of a forklift to lift and reposition the entire compact palletizer. Preferably, the access for the forks of the forklift are comprised of steel to make the access for the forklift strong and durable and to prevent damage from the forklift. The access for the forks of the forklift are preferably pockets.

Additionally, the base preferably includes wheels for mobility. The compact palletizer is preferably moveable via the wheels, preferably via physical force resulting from one or more persons pushing and/or pulling the compact palletizer.

The frame of the present invention preferably includes at least one x-frame, at least one y-frame, and at least one z-frame. An x-frame preferably includes a top horizontal support beam and a bottom horizontal support beam. The x-frame is preferably constructed of extruded aluminum profile connected with bolts. Preferably, the x-frame is pre-tensioned or prestressed. The x-frame is attached to the base and frame by attaching the base beam and the bottom horizontal support beam to vertical posts of the frame. The base beam and bottom horizontal support beam are preferably designed and configured such that the vertical posts are angled about 1-2 degree outward at the top. When the top horizontal support beam is attached to the vertical posts, the divergence of the columns is eliminated. This provides for a pre-tensioned or prestressed x-frame when assembled. Thus, when the top horizontal support beam is attached, preferably via bolts, the tops of the vertical end plates are brought inward towards the vertical, and positioned to be substantially vertical or preferably completely vertical, bringing the entire x-frame under tension. The precision of the x-assembly is provided for by the manufacture process of the vertical posts of the frame, the endplates, the top horizontal support beam, and the bottom horizontal support beam. The endplates are precision cut, for example laser-cut. The endplates preferably also include countersunk holes for precision attachment to the horizontal x-axis support. The endplates are preferably attached to the vertical posts of the frame via bolts. The top horizontal support beam and the bottom horizontal support beam are preferably extruded with internal solid rods, cylinders, or similar shapes which allow for the precision placement of tapped holes. The extrusion process makes the tapping process more precise than other methods. The internal solid rods, cylinders, or similar shapes are preferably tapped (threaded), and the end plates are preferably bolted to these tapped holes; the countersunk holes provide for the precision alignment of the end plates and the horizontal x-axis supports.

When assembling the frame, the vertical posts are preferably slightly angled outward at the top or bottom when attached to the top or bottom support and the lower x-frame support so that when the frame is pulled together at the third support, sufficient tension is created in the skeleton to provide stability. Thus, the skeleton is preferably pre-tensioned or prestressed to create rigidity in the structure.

Figure 10:
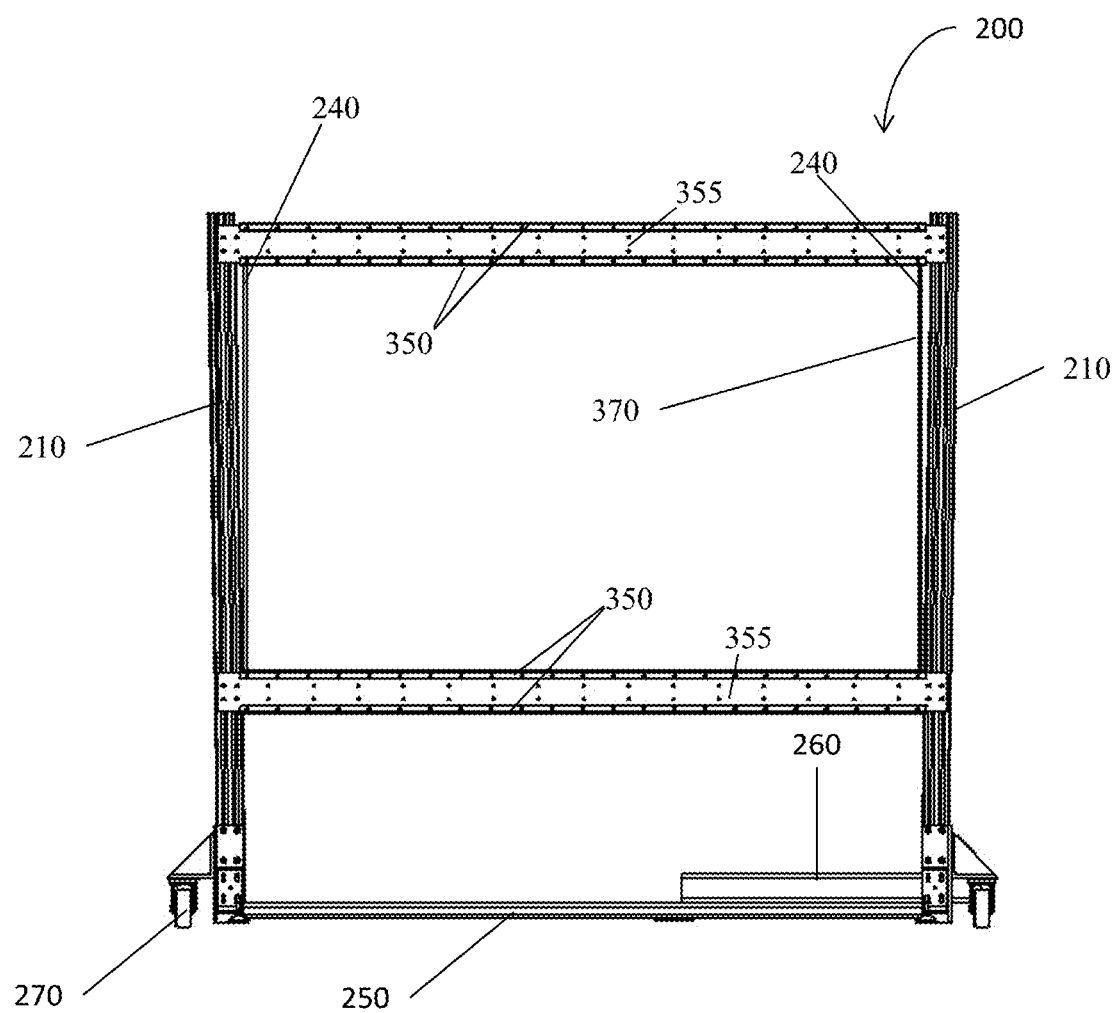
FIG. 10 illustrates a perspective view of a skeleton of a compact palletizer, showing an x-axis structure with a partial frame and illustrating the divergence of the vertical posts of the frame from the vertical during assembly according to the present invention.

FIG. 10 illustrates a perspective view of a skeleton of a compact palletizer, showing an x-axis structure with a partial frame and illustrating the divergence of the vertical posts of the frame from the vertical during assembly according to the present invention, showing part of the skeleton 200 showing vertical posts of the frame 210, the divergence of the vertical posts of the frame from the vertical during assembly by about 1 degree to about 2 degrees, a steel base 250, forklift pockets 260, wheels 270, v-rails 350, plates for mounting v-rails 355, and a vertical end plate 370.

Figure 11:
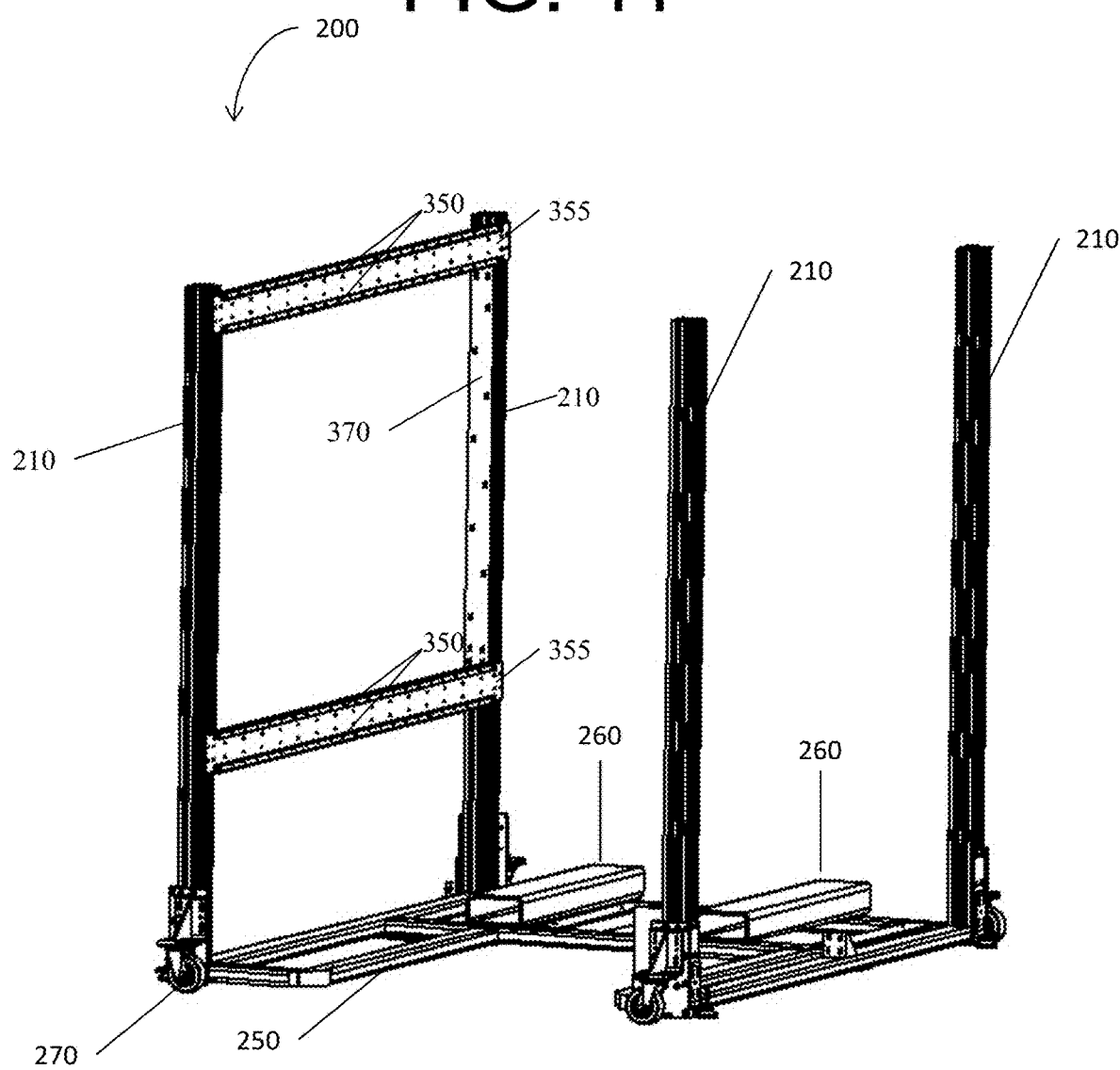
FIG. 11 illustrates a perspective view of part of the skeleton 200 having an x-axis structure, a steel base, and a partial frame according to the present invention.

FIG. 11 illustrates a perspective view of part of the skeleton 200 having an x-axis structure, a steel base, and a partial frame, showing vertical posts of the frame 210, a steel base 250, forklift pockets 260, wheels 270, v-rails 350, plates for mounting v-rails 355, and a vertical end plate 370.

The frame of the present invention preferably includes corner braces. These corner braces provide increased stability and rigidity for the frame.

Figure 12:
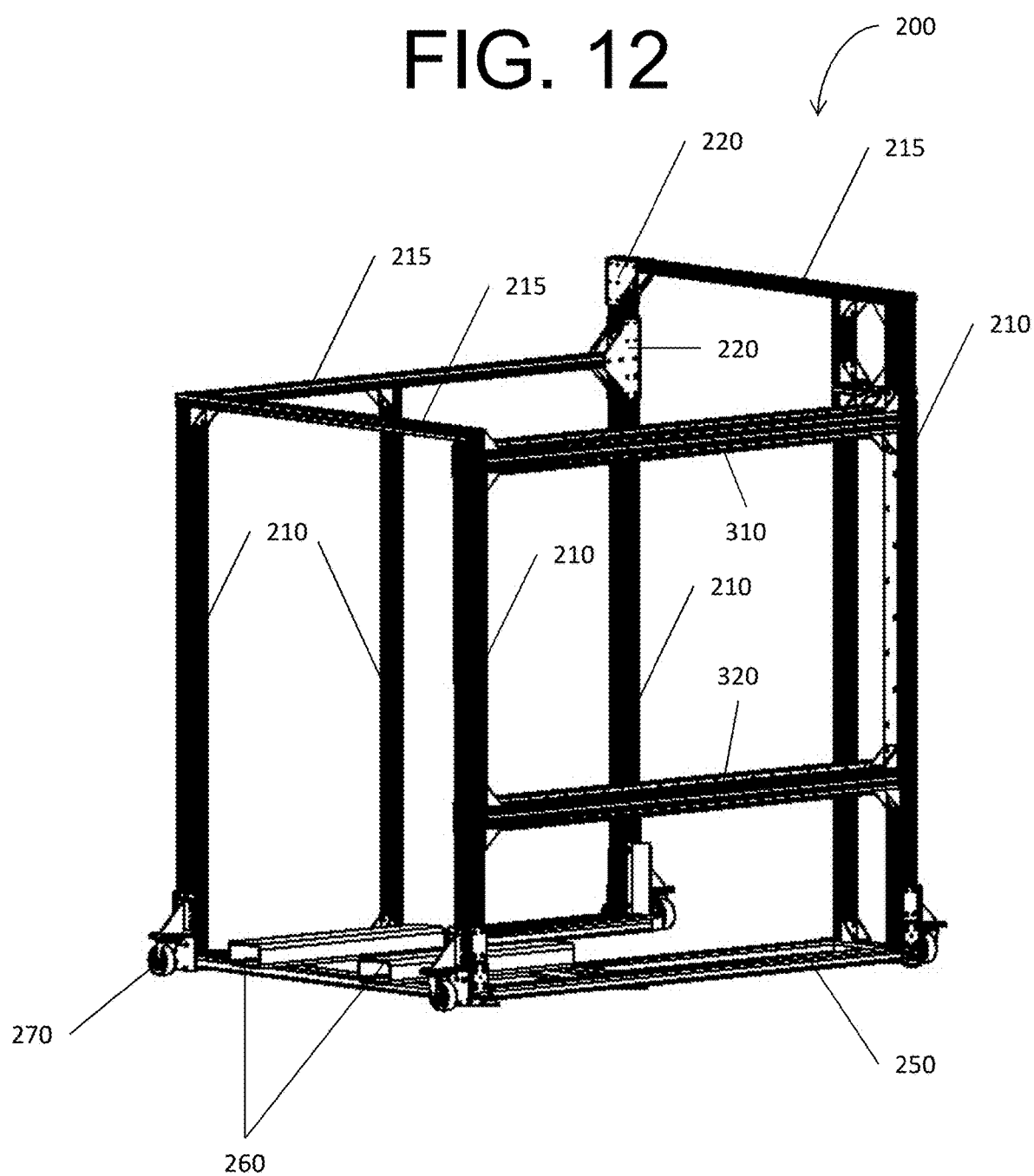
FIG. 12 illustrates a perspective back view of a palletizer skeleton according to the present invention.

FIG. 12 illustrates a perspective back view of a palletizer skeleton according to the present invention, showing the palletizer skeleton having vertical posts of the frame 210, horizontal bars of the frame 215, corner braces 220, a steel base 250, forklift pockets 260, wheels 270, a top horizontal support beam 310, and a bottom horizontal support beam 320.

Figure 13:
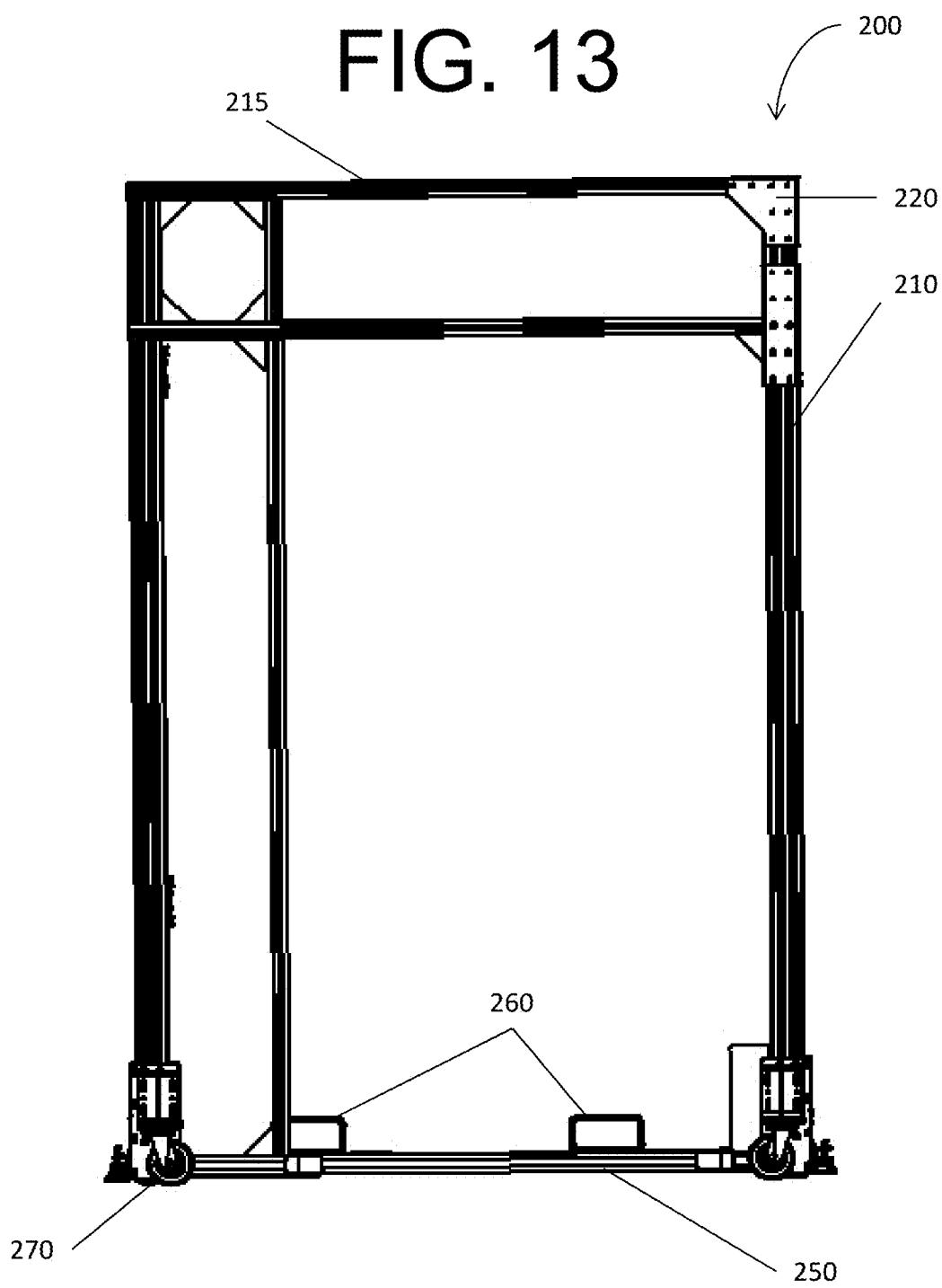
FIG. 13 illustrates a front view of a palletizer skeleton according to the present invention.

FIG. 13 illustrates a front view of a palletizer skeleton according to the present invention, showing the palletizer skeleton having vertical posts of the frame 210, horizontal bars of the frame 215, corner braces 220, a steel base 250, forklift pockets 260, and wheels 270.

Figure 14:
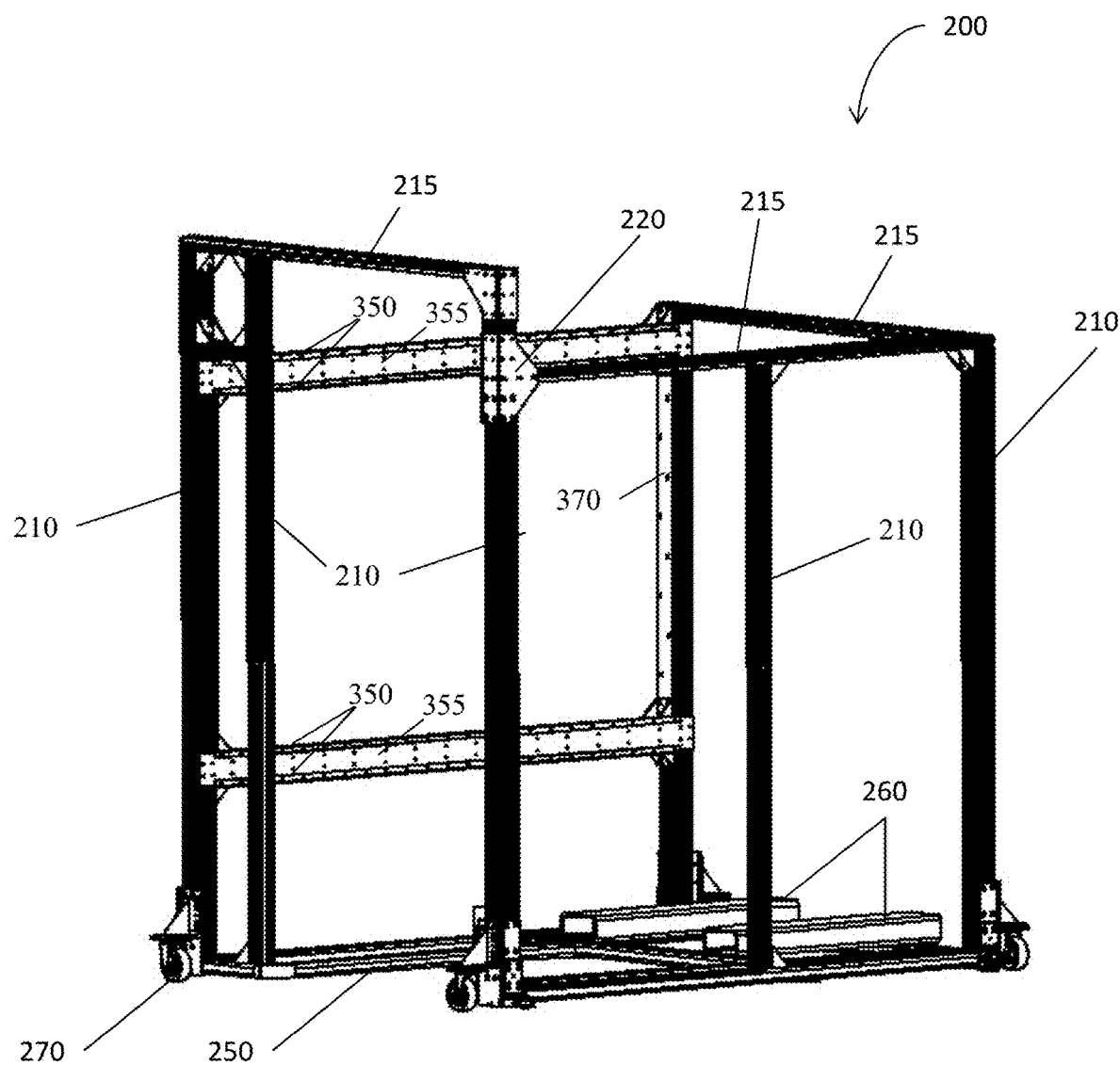
FIG. 14 illustrates a perspective front view of a palletizer skeleton according to the present invention.

FIG. 14 illustrates a perspective front view of a palletizer skeleton according to the present invention, showing the palletizer skeleton 200 having vertical posts of the frame 210, horizontal bars of the frame 215, corner braces 220, a steel base 250, forklift pockets 260, wheels 270, v-rails 350, plates for mounting v-rails 355, and a vertical end plate 370.

Figure 15:
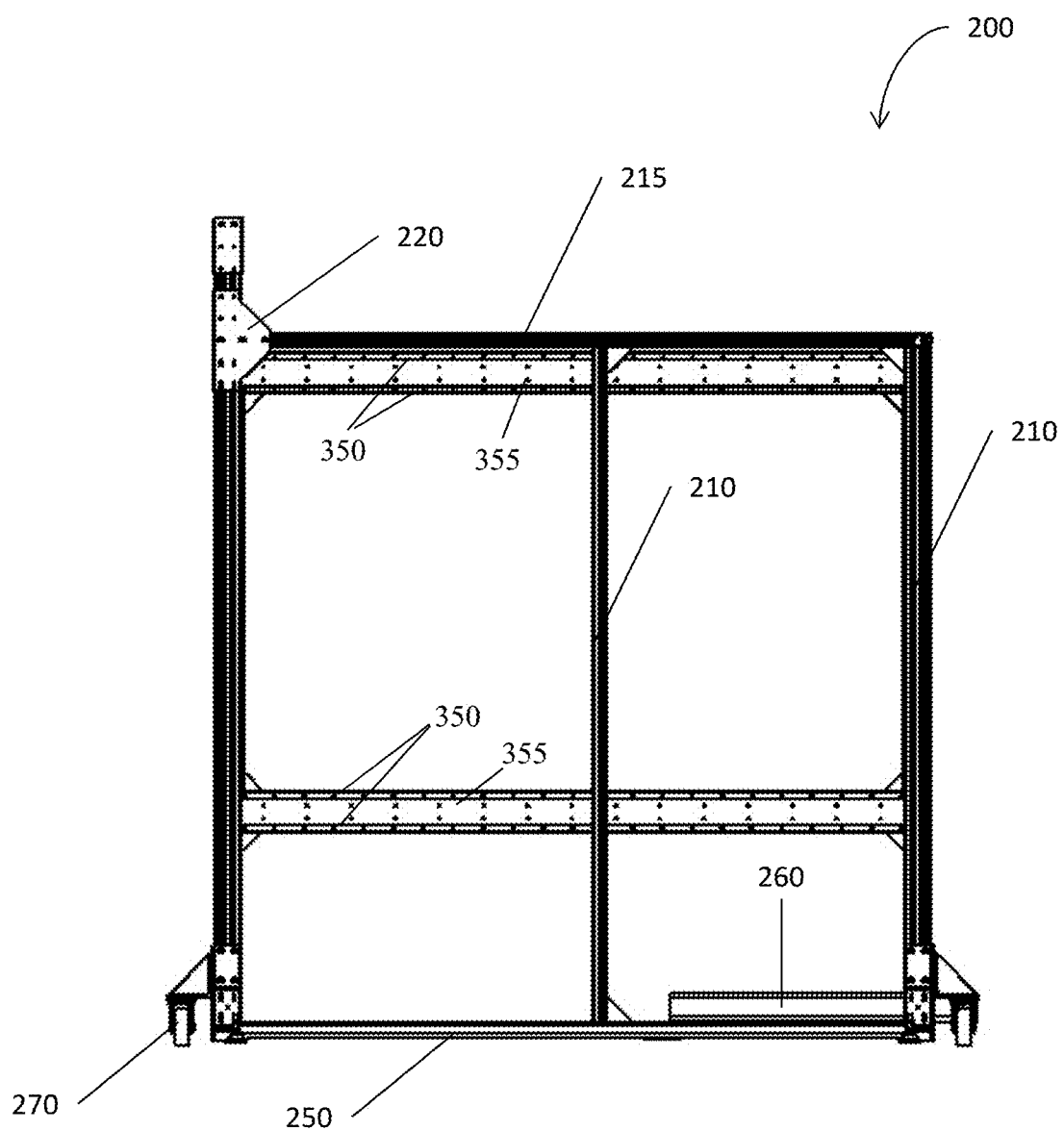
FIG. 15 illustrates a side view of a palletizer skeleton present invention.

FIG. 15 illustrates a side view of a palletizer skeleton present invention, showing the palletizer skeleton 200 having vertical posts of the frame 210, horizontal bars of the frame 215, corner braces 220, a steel base 250, forklift pockets 260, wheels 270, v-rails 350, and plates for mounting v-rails 355.

Figure 16:
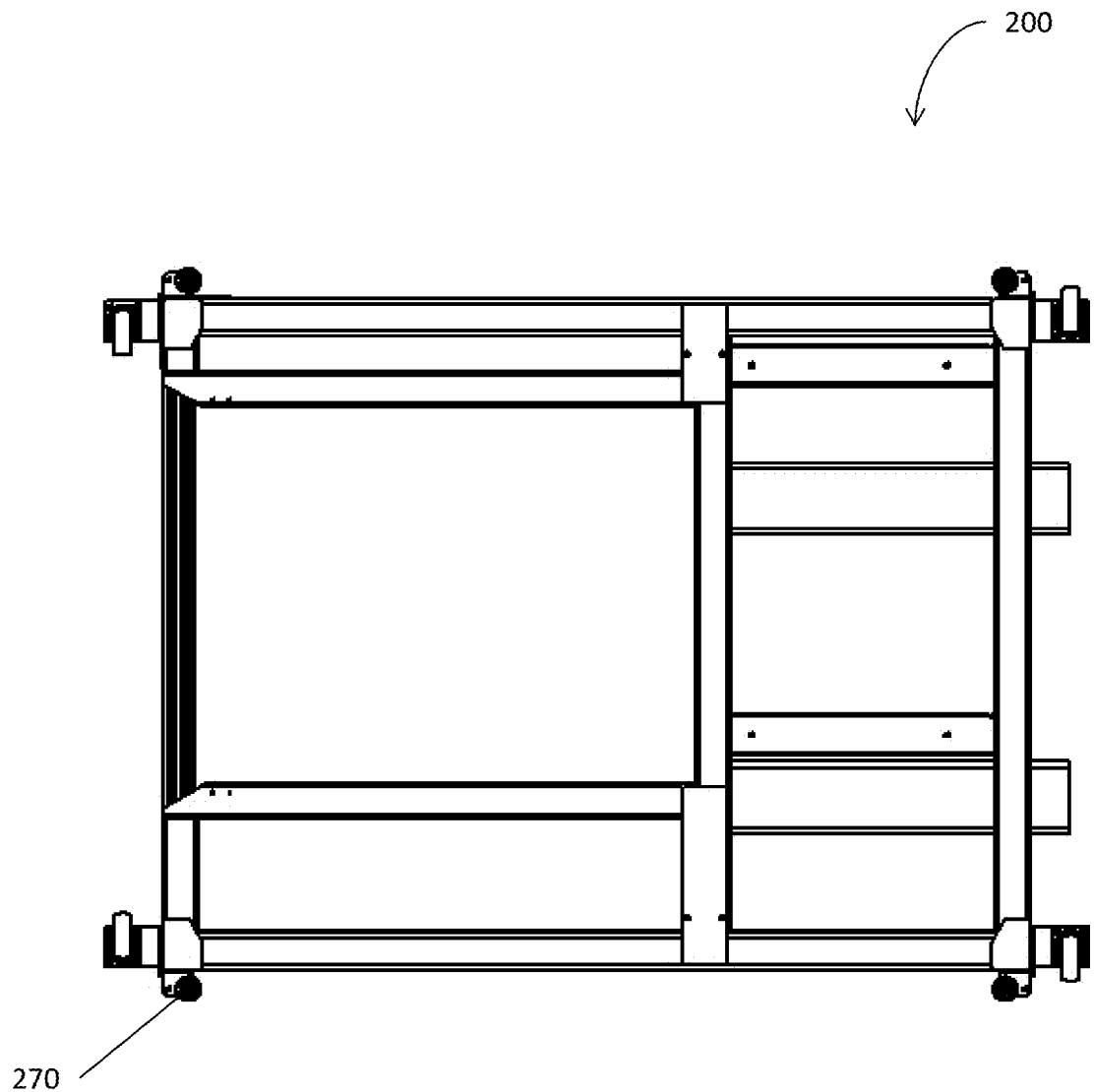
FIG. 16 illustrates a top view of a palletizer skeleton according to the present invention.

FIG. 16 illustrates a top view of a palletizer skeleton according to the present invention, showing wheels 270.

The present invention preferably includes an assembly, wherein the assembly includes an x-axis subassembly, a z-axis subassembly, a y-axis subassembly, and a theta-axis subassembly.

The present invention preferably includes an x-axis subassembly. In one embodiment, the x-axis subassembly is side mounted to the x-axis structure and includes 4 v-guide rails. Advantageously, the 4 v-guide rails are spaced apart to reduce friction in operation of the gantry. Preferably, the x-axis subassembly does not flex.

The x-axis subassembly can be described as a gantry, which is top-mounted in the prior art. However, the gantry of the present invention is preferably side-mounted. Mounting the gantry on the side as in the present invention reduces the overall height of the compact palletizer, which results in a more readily portable compact palletizer for a variety of stack heights when compared to those of the prior art.

Preferably, the gantry includes a parallel, 4 rail system. The 4 rail system includes two pairs of opposing v-rails, wherein the vertical assembly moves on the first pair of the v-rails and the second pair of v-rails prevents the vertical assembly from jumping off the first pair of v-rails. The x-axis is designed such that the first pair of v-rails are maintained parallel to each other and such that the second pair of v-rails are maintained parallel to each other. In one the horizontal assemblies are centered via flat head screws using the holes in the end of the vertical assembly.

By having the gantry side-mounted on the frame, as opposed to top-mounted, the height of the palletizer is reduced, providing a more compact palletizer than possible in the prior art for a variety of palletizers with different stacked pallet heights. The compact palletizer is also more readily portable than the palletizers of the prior art.

In one embodiment, the x-axis subassembly includes at least one timing belt to move the z-axis subassembly horizontally. In another embodiment, the x-axis subassembly includes two belts, preferably a top belt and a bottom belt. This doubles the capacity and prevents binding, thereby allowing a larger load to be moved more quickly than for a single belt.

Using extruded aluminum profile for an x-axis subassembly has presented issues in the prior art, particularly with respect to vibrations. For this reason, the most common material used in palletizer subassemblies has been steel. However, there is a longstanding unmet need for a palletizer that is lighter than a steel palletizer and more readily portable than a steel palletizer, but that maintains a rigidity and stability equivalent or even superior to a steel palletizer. Notably, even if the x-axis subassembly were to be fastened with bolts, vibrations are known to cause release of bolts. However, the present invention solves this problem by utilizing a pre-tensioned x-axis subassembly to prevent or substantially reduce vibrations and prevent the x-axis from shifting and to prevent release of bolts during operation or transport. These were unexpected results. As discussed above, the use of extruded aluminum profile in an x-axis subassembly or a palletizer frame is not obvious to one of ordinary skill in the art. In fact, one of ordinary skill in the art would discourage the use of bolted aluminum because vibrations and impact from the operation and/or transport of the palletizer would present issues such as the vibrations and impact loosening the bolts, rendering the palletizer less stable. By substantially reducing and even eliminating vibrations in the operation of the palletizer, and by eliminating the loosening of bolts when the palletizer is transported, the present invention provides unexpectedly improved properties over the prior art when extruded aluminum profile is used in the x-assembly and/or in the frame of the palletizer. The subassembly and/or frame is preferably pre-tensioned or prestressed up to about 1150 Newtons (or up to about 258 lbs-force). However, the subassembly and/or frame is preferably pre-tensioned or prestressed proportional to the dimensions of the frame. A compact palletizer taller than about 3.35 meters may be pre-tensioned or prestressed to more than about 1150 Newtons (or more than about 258 lbs-force). Alternatively, the x-axis can be pre-tensioned by angling the multiplicity of extruded aluminum profile vertical posts between about 1 degree to about 2 degrees from the vertical. The x-axis can also be pre-tensioned by angling the multiplicity of extruded aluminum profile vertical posts between about 0 degrees and about 2 degrees from the vertical. The top and bottom x-frame support beams are attached to the x-frame support columns, preferably by bolting. The bolting, when combined with the angling of the x-frame support columns about 1-2 degrees from the vertical, provides a pre-tensioned x-assembly which substantially reduces or eliminates vibrations during operation of the palletizer.

Figure 17:
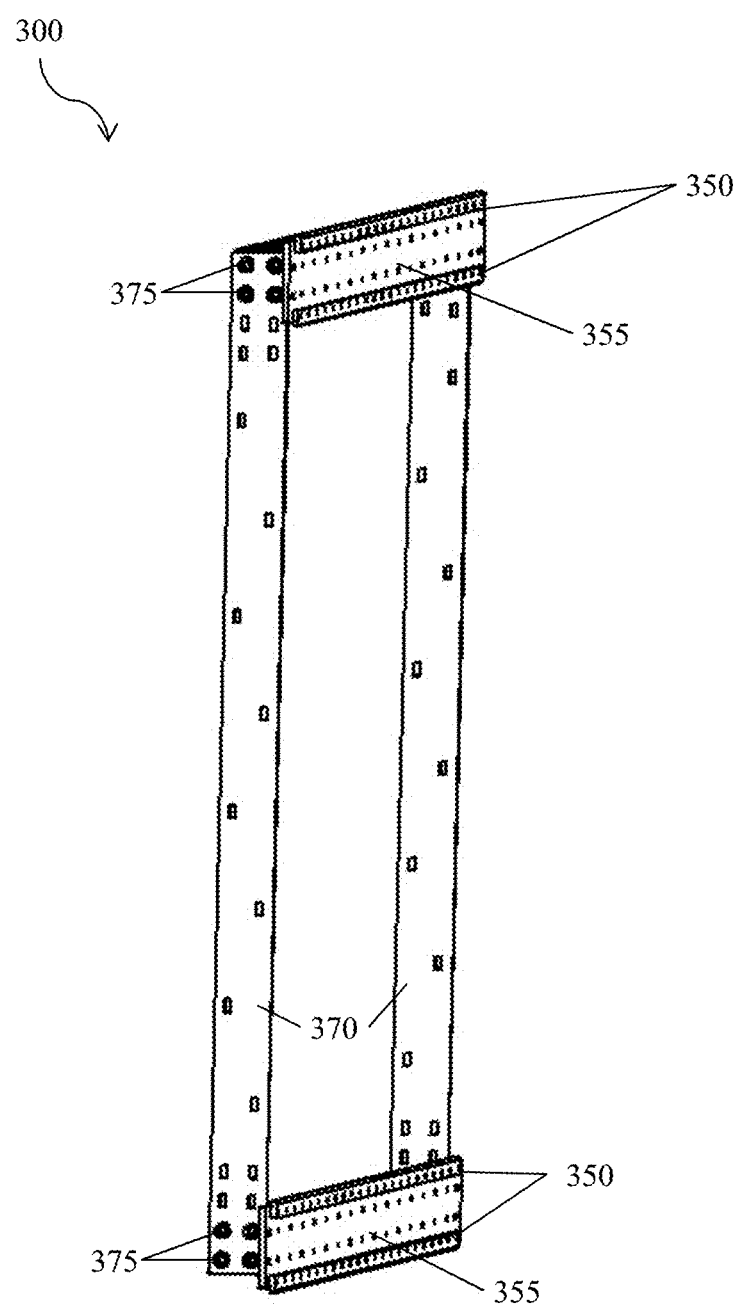
FIG. 17 illustrates a perspective view of the x-axis subassembly according to the present invention.

FIG. 17 illustrates a perspective view of the x-axis subassembly 300 according to the present invention, showing v-rails 350, plates for mounting v-rails 355, vertical end plates 370, and precision cut, countersunk holes 375.

Figure 18:
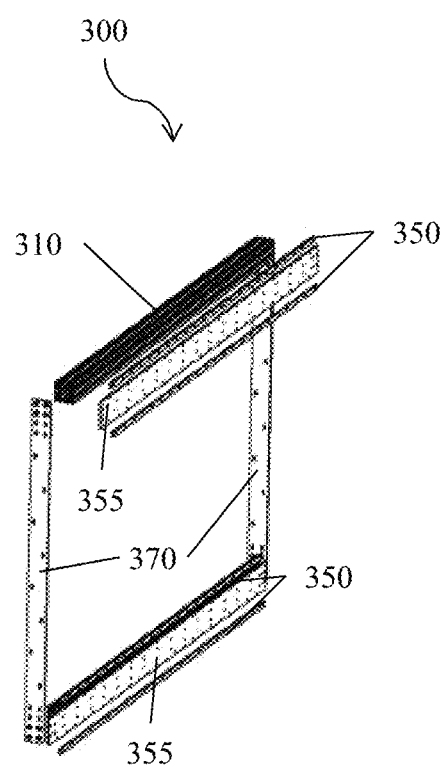
FIG. 18 illustrates an exploded view of the x-axis subassembly according to the present invention.

FIG. 18 illustrates an exploded view of the x-axis subassembly 300 according to the present invention, showing a top horizontal support beam, v-rails 350, plates for mounting v-rails 355, and vertical end plates 370.

The subassembly includes a z-axis subassembly, a y-axis subassembly, and a theta-axis subassembly. The z-axis subassembly, the y-axis subassembly, and/or the theta-axis subassembly of the compact palletizer is preferably manufactured from lightweight profiled structural material, such as profiled aluminum. Preferably, the z-axis subassembly, the y-axis subassembly, and/or the theta-axis subassembly are pre-tensioned or prestressed.

The z-axis subassembly preferably utilizes two structural aluminum profile components for mounting the spine to the x-axes. These are preferably mounted to the pair of opposing v-rails with 8 v-wheel bearings which provide for x-axis motion. The spine includes two linear, opposing rails for the z-axis movement of the y-arm. Preferably, the z-axis movement of the y-arm is precision guided by two linear rails and 4 bearing blocks. Holes and/or slots are also included, preferably at the top end of the profile, to mount a motor, a gear reducer and a drive sprocket. Preferably, slots and/or holes are provided at the bottom of the profile to mount the idle sprocket. Attached to bearing blocks that slide on the linear rails is a chassis that is designed to take up the slack and tension in the chain that raises and lowers the arm. Notably, the z-axis subassembly does not flex.

Figure 19:
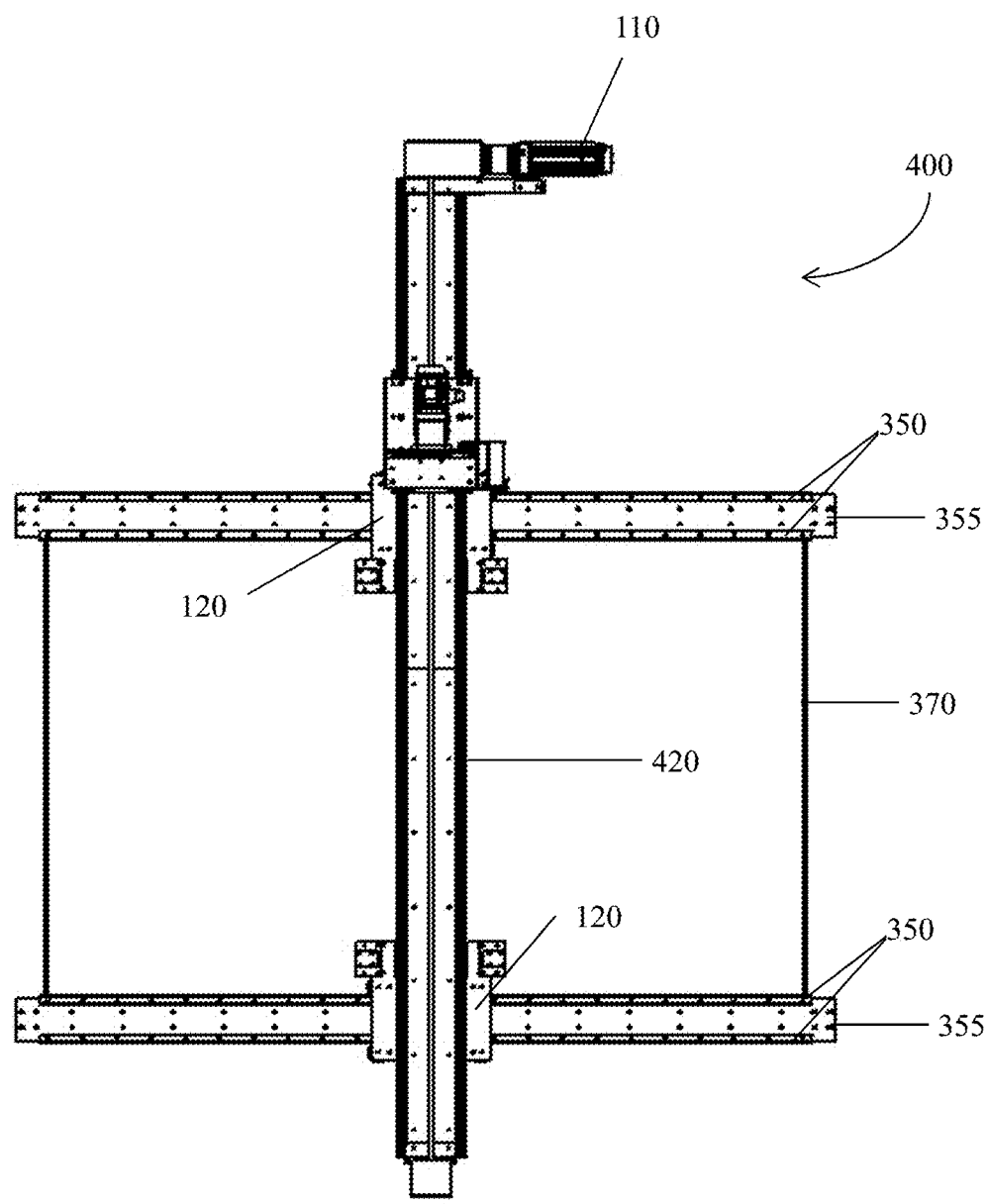
FIG. 19 illustrates a front view of an assembly illustrating the x-axis subassembly and the z-axis subassembly according to the present invention.

FIG. 19 illustrates a front view of an assembly 400 illustrating the x-axis subassembly and the z-axis subassembly according to the present invention, showing motors 110, v-roller mount and belt tensioner 120, v-rails 350, plates for mounting v-rails 355, a vertical end plate 370, and a spine 420.

Figure 20:
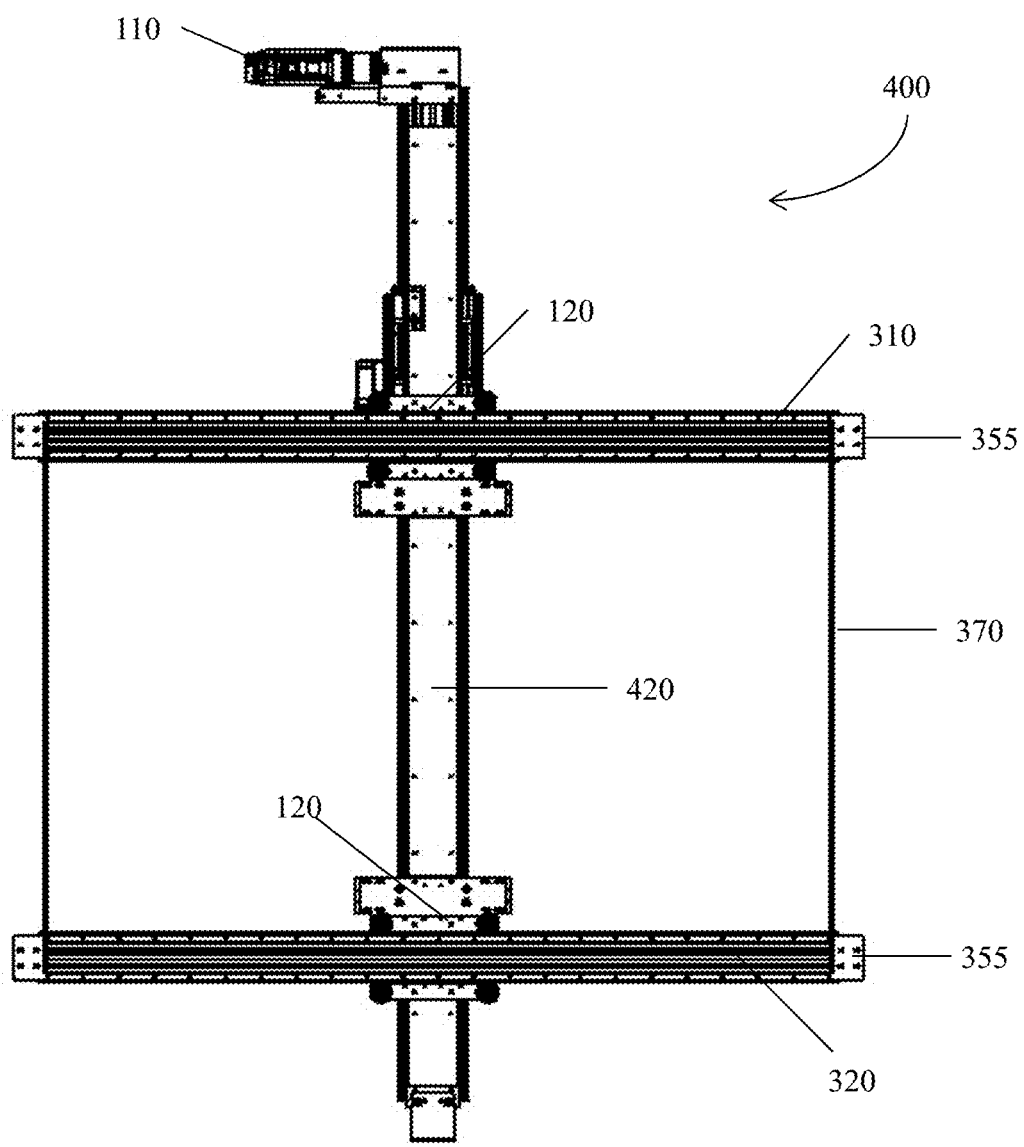
FIG. 20 illustrates a back view of an assembly illustrating the x-axis subassembly and the z-axis subassembly according to the present invention.

FIG. 20 illustrates a back view of an assembly 400 illustrating the x-axis subassembly and the z-axis subassembly according to the present invention, showing motors 110, v-roller mount and belt tensioner 120, a top horizontal support beam 310, a bottom horizontal support beam 320, plates for mounting v-rails 355, a vertical end plate 370, and a spine 420.

The y-axis subassembly preferably includes an arm which utilizes two pieces of structural aluminum profile spaced apart to allow for insertion of a timing belt. The y-axis subassembly is preferably attached to the z-axis subassembly via the chassis of the z-axis subassembly. The y-axis subassembly is preferably attached to the theta subassembly between an idle pulley and a drive pulley. Mounted to the top of the arm are two linear rails and 4 bearing blocks that guide the y-axis subassembly and theta subassembly. In one embodiment, the end of the profile includes holes to set spacing. In another embodiment, t-slots are also included for attaching side gussets. The bottom of the arm preferably includes a cable track tray. The arm is preferably a cantilever arm. The y-axis subassembly/arm can preferably flex between about 0 millimeters (about 0 inches) and about 3.175 millimeters (about ⅛ inch) under full load, which in one embodiment is about 100 kg (or about 220 lbs). In another embodiment, the y-axis subassembly/arm can preferably flex between about 0 millimeters (about 0 inches) and about 1.5875 millimeters (about 1/16 inch) under partial load, which in one embodiment is about 50 kg (or about 110 lbs). This amount of flex is slightly more than in a steel structure, but is not enough to cause performance issues. In fact, the assembly is lighter a steel structure and can be moved faster and more precisely with smaller motors.

Figure 21:
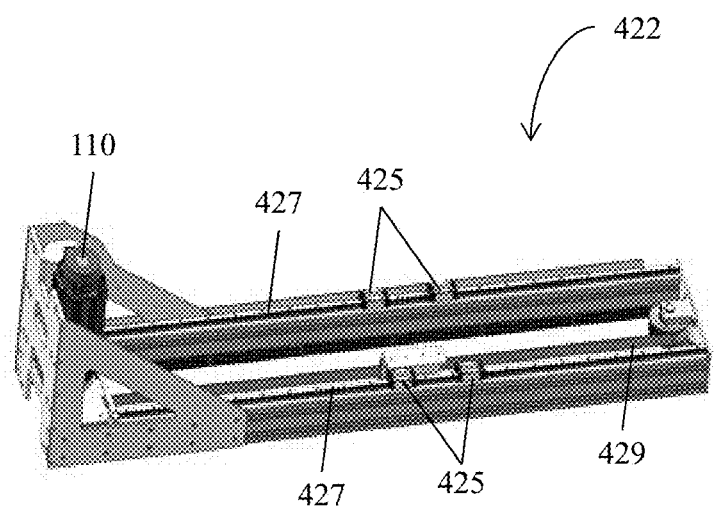
FIG. 21 illustrates the y-axis assembly according to the present invention.

FIG. 21 illustrates the y-axis subassembly 422 according to the present invention, showing a motor 110, bearing blocks 425, linear rails 427, and a timing belt for y-axis motion 429.

The present invention preferably includes a theta axis subassembly for rotating an end of arm tooling (EOAT) assembly used to move items from the conveyor to be stacked on a pallet or vice versa. The theta axis assembly is preferably mounted to the 4 bearing blocks on the y-axis subassembly. The EOAT assembly preferably moves back and forth on the y-axis arm via the theta axis subassembly. The theta axis subassembly preferably carries a motor and precision rotary bearing assembly that allows the load to be rotated up to about 365 degrees in either direction.

The EOAT assembly acts as the interface between the palletizer and the items loaded and/or unloaded by the palletizer, including box(es), bag(s), and/or pail(s). The EOAT assembly will have many variations to fit specific customer requirements. Basic units will handle single, double, triple or more boxes, as well as one bag (up to 36 kg [80 lbs]) at a time or multiple pails (up to 3 at a time). The palletizer can use any EOAT appropriate for the palletizing task. By way of example and not limitation, adjustable bag grippers, side clamps, fork-style tools, and/or vacuum technology tools can be utilized. However, any prehensile end effector can be used, including impactive, ingressive, astrictive, and contigutive end effectors. Impactive effectors include jaws or claws which physically grasp the object by using direct impact upon the object. Ingressive effectors include pins, needles or hackles which physically penetrate the surface of the object (used in textile, carbon and glass fiber handling). Astrictive effectors are those that produce a binding force using a field, and include vacuum, magneto- or electroadhesion. Contigutive effectors require direct contact for adhesion to take place, such as glue, surface tension, or freezing.

The EOAT further comprises a digital control mechanisms wherein sensors attached to the EOAT determine the position of both the EOAT, an object to be palletized, and the pallet. Sensors include computer vision sensors, (e.g., cameras, infrared (IR) emitters and receivers), sonar, radar, accelerometers, barometers, geographic positioning systems, and/or any other position sensors known in the art of control systems. A digital controller is programmed and in communication to the sensors, the EOAT, the motors, and any other actuating mechanism for the EOAT to ensure a low tolerance throughout the movement of each component throughout the palletizing process. Communication includes direct connection through "hard-wired" means (e.g., through Universal Serial Bus (USB), serial, coaxial, Ethernet connection) or through wireless networking technology (e.g., Institute of Electrical and Electronics Engineers (IEEE) 802 standard wireless technologies, including WIFI, Near-Field Communication (NFC), ZigBee). The controller is operable to be programmed, monitored, and accessed through network means, such as through a Local Area Network (LAN) or over the Internet.

The control system is operable to be programmed with an open-loop or closed-loop system with any combination of single input, single output (SISO) or multi-input, multi-output (MIMO) system analysis, including linear, adaptive, and fuzzy logic systems. The controller is any logic controller operable to receive the sensor inputs of the compact palletizer and dictate the movement and operation of the EOAT and the subassemblies (e.g., Proportional, Integral, Derivative (PID), Bang-Bang, Phase Lead-Lag Compensator controllers).

In one embodiment, a PID controller is in communication with at least two three-dimensional (3D) cameras, the subassemblies, and the EOAT determines the location of pre-palletized products in 3D space. Based on pre-programmed preference values and tolerances for package stacking density, the controller moves the pre-palletized products to a pallet. Preferably, the control system is operable to be calibrated through an on-board or external computer system with a human-machine interface (HMI), including automatically sensing and manually inputting dimensions of a pallet placement station, a conveyor location, a height of the palletizer, and locations and dimensions of external, attachable devices, including a tier sheet dispenser or a pallet dispenser. Calibration files including dimensions, preferences, values, and configurations are stored in a memory of the palletizer accessible by the control system. Notably, the compact nature of the palletizer allows removes the need for recalibration of the control system even when the palletizer is moved to a different location or connected to additional external systems.

Notably, the x, y, z, and theta subassemblies are modular in order to facilitate assembly and disassembly. In one embodiment, the frame of the present invention is integral. Notably, the compact palletizer of the present invention is readily portable, while being rigid, lightweight, and compact. The rigidity of the compact palletizer allows the palletizer to remain precise and accurate in the placement of items after transport, and even several transports. Precision is achieved by small tolerances. Rigidity prevents larger tolerances from developing. Transport does not affect the accuracy or precision of the compact palletizer. The robotic elements of the compact palletizer are preferably preprogrammed, and merely need to be re-homed or re-zeroed after transport.

Figure 22:
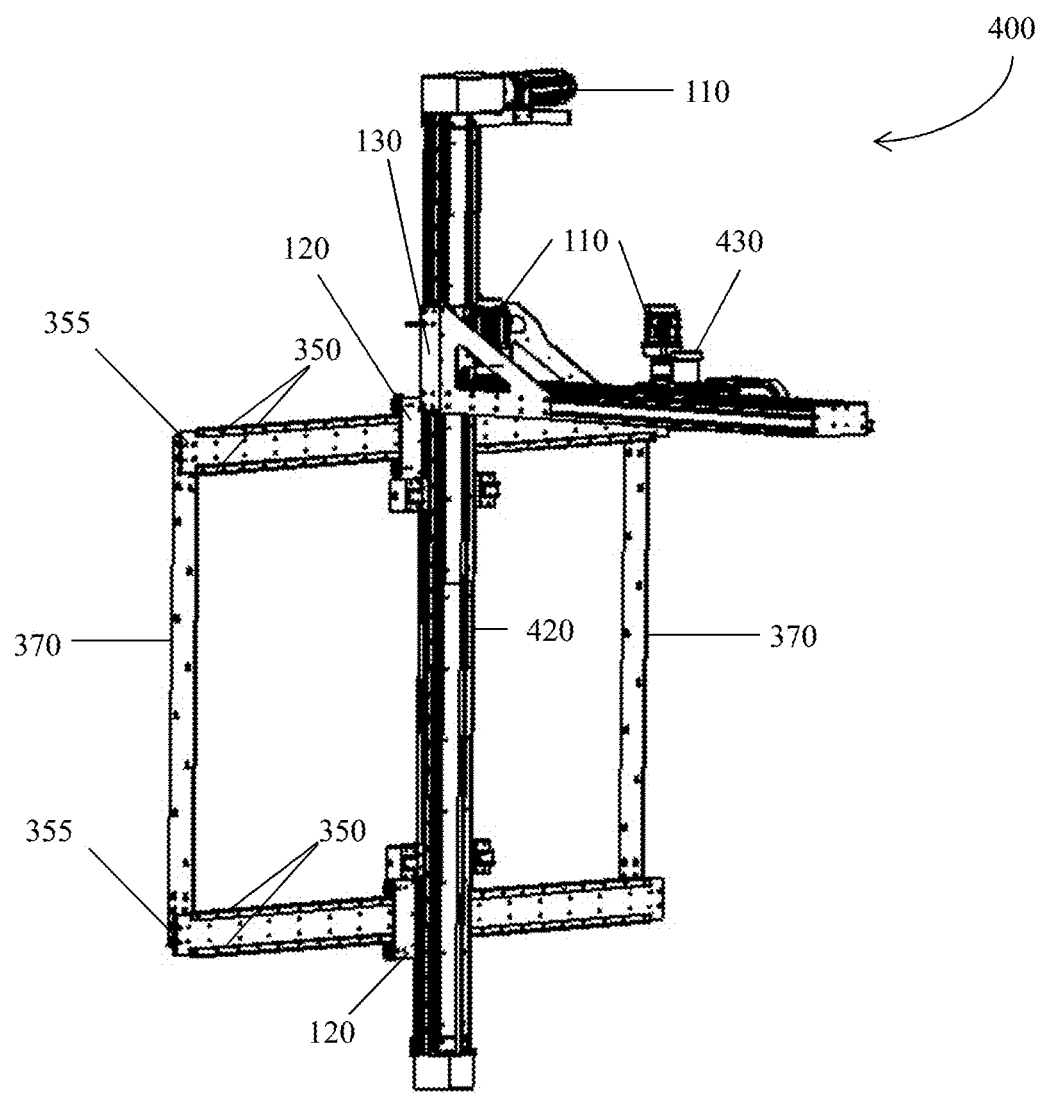
FIG. 22 illustrates a perspective view of an assembly illustrating the x-axis subassembly, the z-axis subassembly, the y-axis subassembly, and the theta-axis subassembly according to the present invention.

FIG. 22 illustrates a perspective view of an assembly illustrating the x-axis subassembly, the z-axis subassembly, the y-axis subassembly, and the theta-axis subassembly according to the present invention, showing motors 110, v-roller mount and belt tensioner 120, a chassis 130, v-rails 350, plates for mounting v-rails 355, vertical end plates 370, a spine 420, and a rotary bearing 430.

Figure 23:
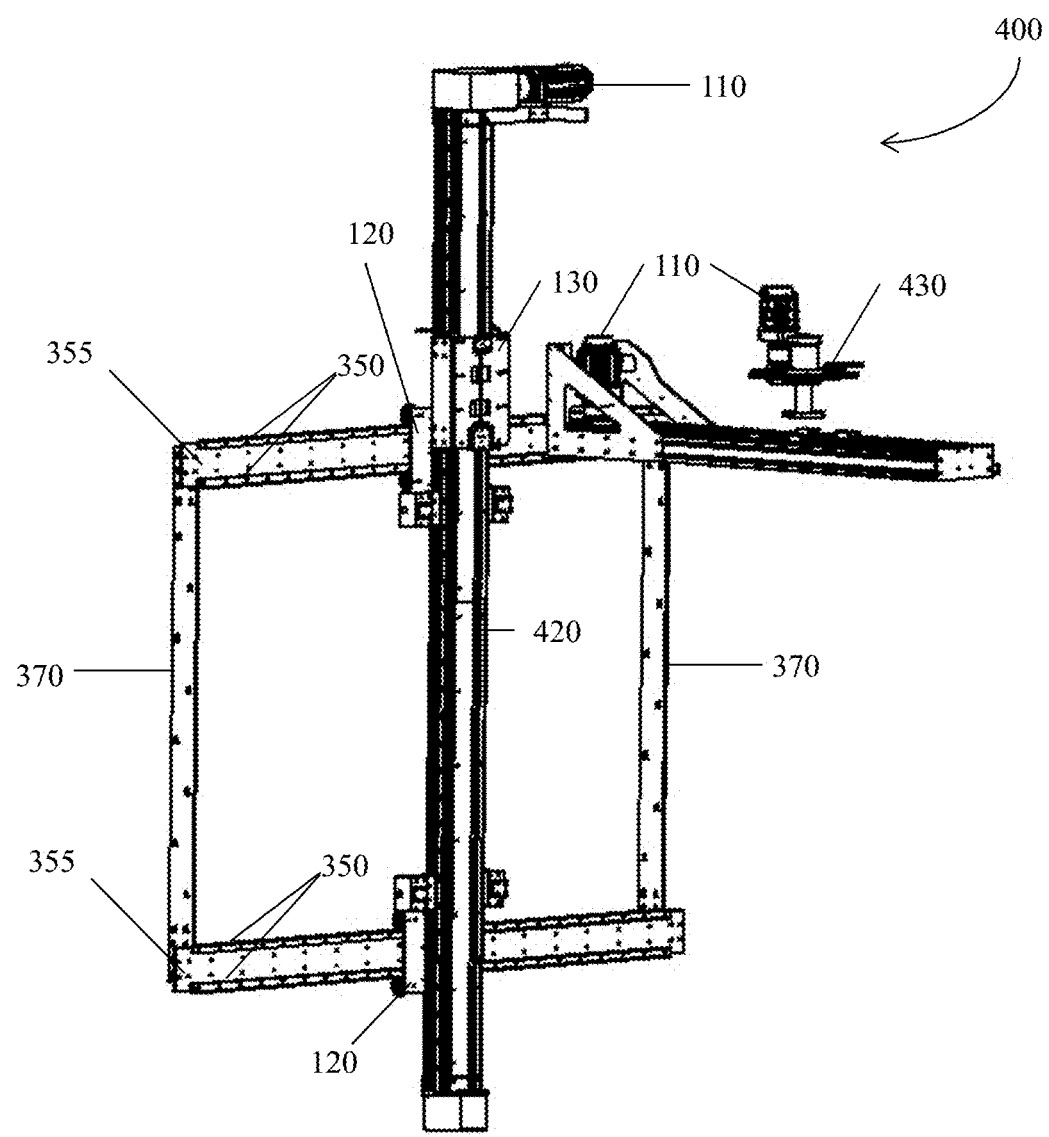
FIG. 23 illustrates a perspective exploded view of an assembly illustrating the x-axis subassembly, the z-axis subassembly, the y-axis subassembly, and the theta-axis subassembly according to the present invention.

FIG. 23 illustrates a perspective exploded view of an assembly illustrating the x-axis subassembly, the z-axis subassembly, the y-axis subassembly, and the theta-axis subassembly according to the present invention, showing motors 110, v-roller mount and belt tensioner 120, a chassis 130, v-rails 350, plates for mounting v-rails 355, vertical end plates 370, a spine 420, and a rotary bearing 430.

Figure 24:
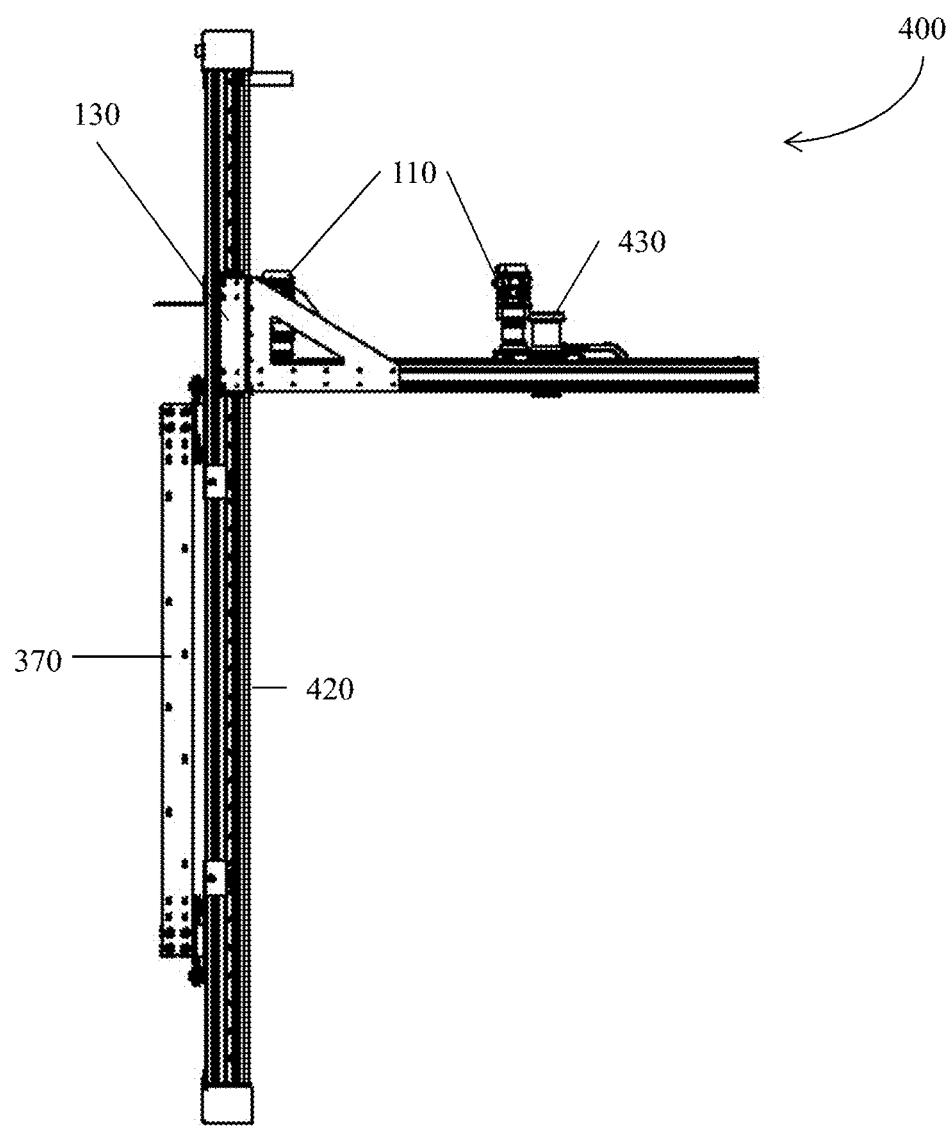
FIG. 24 illustrates a side view of an assembly illustrating the x-axis subassembly, the z-axis subassembly, the y-axis subassembly, and the theta-axis subassembly according to the present invention.

FIG. 24 illustrates a side view of an assembly illustrating the x-axis subassembly, the z-axis subassembly, the y-axis subassembly, and the theta-axis subassembly according to the present invention, showing motors 110, a chassis 130, vertical end plates 370, a spine 420, and a rotary bearing 430.

The compact palletizer can preferably be assembled rapidly. The portable construction of the compact palletizer allows easy assembly at a site, merely requiring attachment of the spine, the z-axis subassembly and set-up of the robotic elements. Preferably, the robotic elements of the compact palletizer are preprogrammed and merely require re-homing or re-zeroing, not re-programming, upon assembly or transport. Notably, the compact palletizer of the present invention requires a group of people only 2-3 hours to assemble as opposed to prior art palletizers, which would take an identical or similar group of people 2-3 days to construct from single components.

In another embodiment, the compact palletizer has a unitary and integrated uni-body construction.

The compact palletizer is notably lightweight when compared with the palletizers of the prior art. A base frame comprising a welded steel frame with fork pockets and wheels, wherein the welded steel frame includes steel tubing and steel plates welded together, wherein the frame also sets a vertical angle of about 1 degree to about 2 degrees outwards of the posts for tensioning. The frame weighs approximately 290 kg (638 lbs) in one embodiment of the present invention. Lightweight—the moving subassemblies, z-, y- and theta-axes, manufactured from extruded aluminum profile materials weigh about 237 kg (631 lbs) in one embodiment of the present invention. An x-axis structure v-guide rail mount, comprised of 2 pieces of structural aluminum profile, two precision cut aluminum plates for mounting the 4v-guide rails, and 2 precision cut aluminum plates to set the spacing between the top and bottom rails and to insure parallel assembly of the top and bottom rails weighs approximately 70 kg (154 lbs) in one embodiment of the present invention. A base frame, x-axis structure, and skeleton (structural aluminum profile frame) which does not include any panels, but includes vertical posts which are slightly angled outwards (approximately between about 1 degree and 2 degrees), wherein the skeleton is prestressed, weighs approximately 495 kg (or approximately 1089 lbs) in one embodiment of the present invention. A z-axis subassembly which utilizes two structural extruded aluminum profile components for the spine, which are mounted to the two v-guide bearing assembles for x-axis motion and to two linear rails for vertical stroke of the arm, wherein the two structural aluminum profile components include holes in the end of the profiles, slots to mount a motor, gear reducer, and drive sprocket, and slots at the bottom to mount an idle sprocket, wherein the two structural extruded aluminum profile components also include a chassis attached to the bearing blocks that slide on the linear rails, weighs approximately 160 kg (or approximately 352 lbs) in one embodiment of the present invention. A y-axis subassembly which includes an arm utilizing two pieces of structural extruded aluminum profile, having two linear rails and 4 bearing blocks mounted to the top of the arm, with holes in the end of the profile to set the spacing and to utilize t-slots for attaching side gussets, wherein the bottom of the arm includes a cable track tray, weighs approximately 55 kg (or approximately 121 lbs) in one embodiment of the present invention. A theta axis subassembly, which carries a motor and a precision rotary bearing assembly, weighs approximately 22 kg (or approximately 48.4 lbs) in one embodiment of the present invention. An end of arm tooling (EOAT) assembly weighs between approximately 5 kg (or approximately 11 lbs) and approximately 50 kg (or approximately 110 lbs) in one embodiment of the present invention. Thus, the total compact palletizer assembly weighs approximately 1451 kg (or approximately 3192 lbs) in one embodiment of the present invention.

The lighter weight of the compact palletizer provided by using extruded aluminum profile in the palletizer makes the gross weight lower, and thus allows for the use of smaller motors and gears, thereby reducing the weight of the compact palletizer even further. This unexpected result of using smaller motors and gears, and further reducing the weight of the palletizer is advantageous over the prior art. Additionally, the pairs of the rails on the x-axis provide stability and rigidity for the palletizer and prevent binding, allowing the assembly to move at much faster speeds than possible in the prior art. By way of example, a load of about 100 kg can be moved at about 1000 mm/sec (or about 3.3 ft/sec). If the load is lighter, the load can be moved even faster, depending on the stability of the product and EOAT design, up to about 2000 mm/sec (or about 6.5 ft/sec). The ability to move loads faster by using aluminum for key components of the palletizer, and therefore lighter motors and gears, is yet another unexpected and nonobvious result. Additionally, velocity and acceleration of the loads can be adjusted and/or optimized in the present invention.

In general, the operating speed of the palletizer while stacking a pallet with products is approximately 8 products per minute. In another embodiment, the operating speed of the palletizer is approximately 16 products per minute.

The compact palletizer of the present invention optionally includes accessories. Notably, accessories do not impact the envelope of the compact palletizer. The accessories are preferably modular and attach to the compact palletizer from the outside. One accessory is a pallet in-feed. The pallet in-feed is operable to be positioned to enter the palletizer from the left, right, front, and/or back; in other words, the pallet in-feed is operable to be positioned to enter the palletizer from any side.

Figure 25:
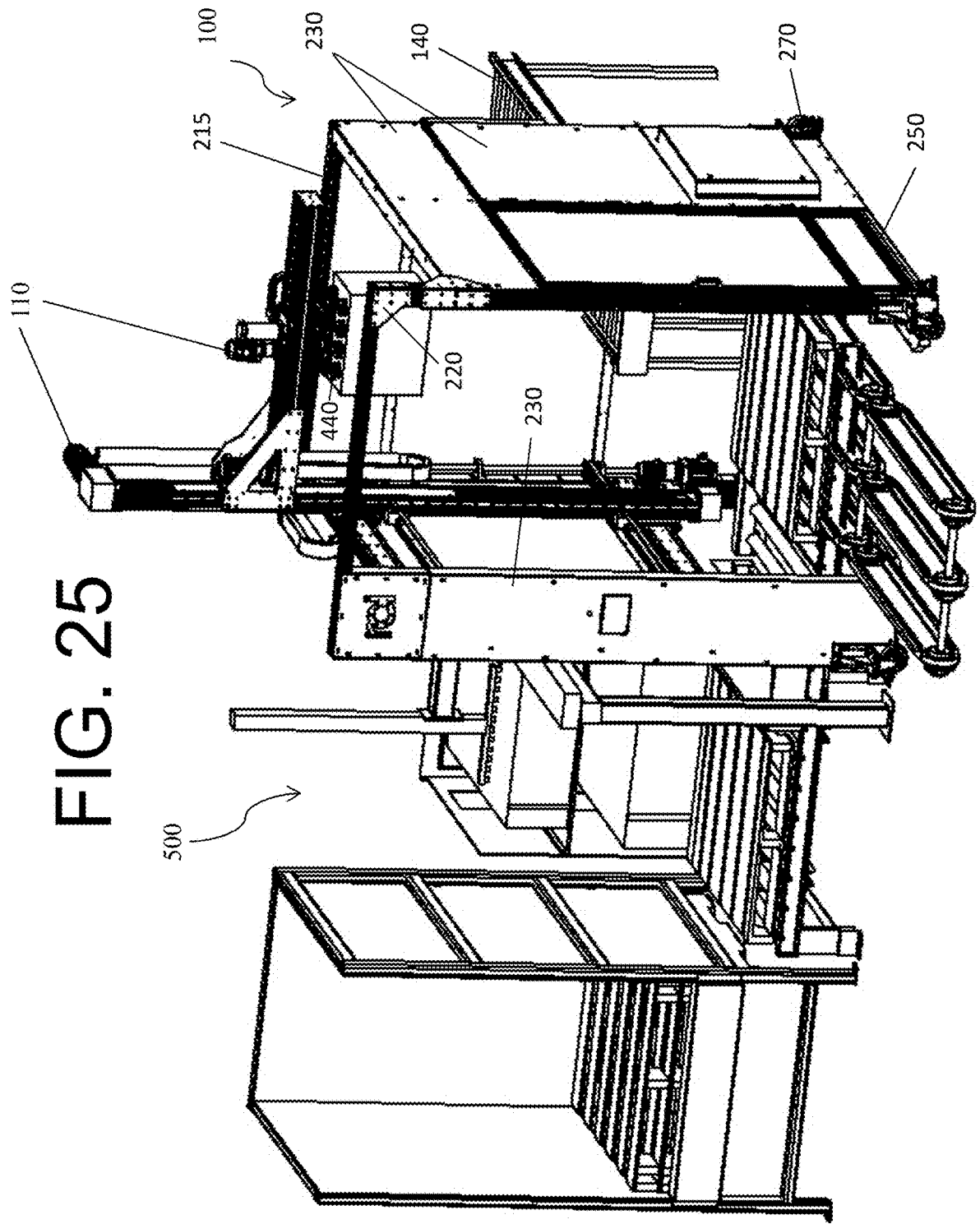
FIG. 25 illustrates a perspective front view of a palletizer with a pallet feed according to the present invention.

FIG. 25 illustrates a perspective front view of a palletizer 100 with a pallet feed 500 according to the present invention, showing motors 110, a conveyer 140, horizontal bars of the frame 215, corner braces 220, panels 230, a steel base 250, wheels 270, and an end of arm tooling (EOAT) assembly 440.

Additionally, a conveyer of the pallet in-feed has multiple "zones" in one embodiment of the present invention. These zones provide for separating the loads into discrete segments on the conveyer, preferably via sensing technology such as lasers, IR, etc., and optimize management and processing of the loads into the palletizer. Yet another accessory is a box buffering system. The box buffering system is preferably combined with the conveyer to provide for an auto-feed pallet in-feed system. A tier sheet dispenser may also be utilized in one embodiment of the present invention. The tier sheet dispenser is preferably unique for a compact palletizer having a stack height of about 2.57 meters (or about 8 feet 5 inches), with a total height of about 3.35 meters (or about 11 feet), and for a compact palletizer having a stack height of about 1.52 meters (or about 5 feet), with a total height of about 2.43 meters (or about 8 feet). Tier sheets are utilized between layers of product stacked on a pallet and create a more stable/transportable unit. Due to the size of the tier sheet, numerous engineering concerns were addressed to add the tier sheet dispenser to a compact palletizer of this size, specifically a compact palletizer having a stack height of about 2.57 meters (or about 8 feet 5 inches), with a total height of about 3.35 meters (or about 11 feet), or a compact palletizer is a compact palletizer having a stack height of about 1.52 meters (or about 5 feet), with a total height of about 2.43 meters (or about 8 feet). Due to the size of the palletizer envelope, a tier sheet is dispensed one at a time into the palletizer through a side or rear panel. Another accessory includes a stretch wrapper. In one embodiment, the stretch wrapper is integrated into the frame. Preferably, the stretch wrapper provides for stretch wrapping an entire pallet complete with its load. In another embodiment, the stretch wrapper is operable to wrap loads individually. In yet another embodiment, the stretch wrapper is operable to stretch wrap more than one load together.

Figure 26:
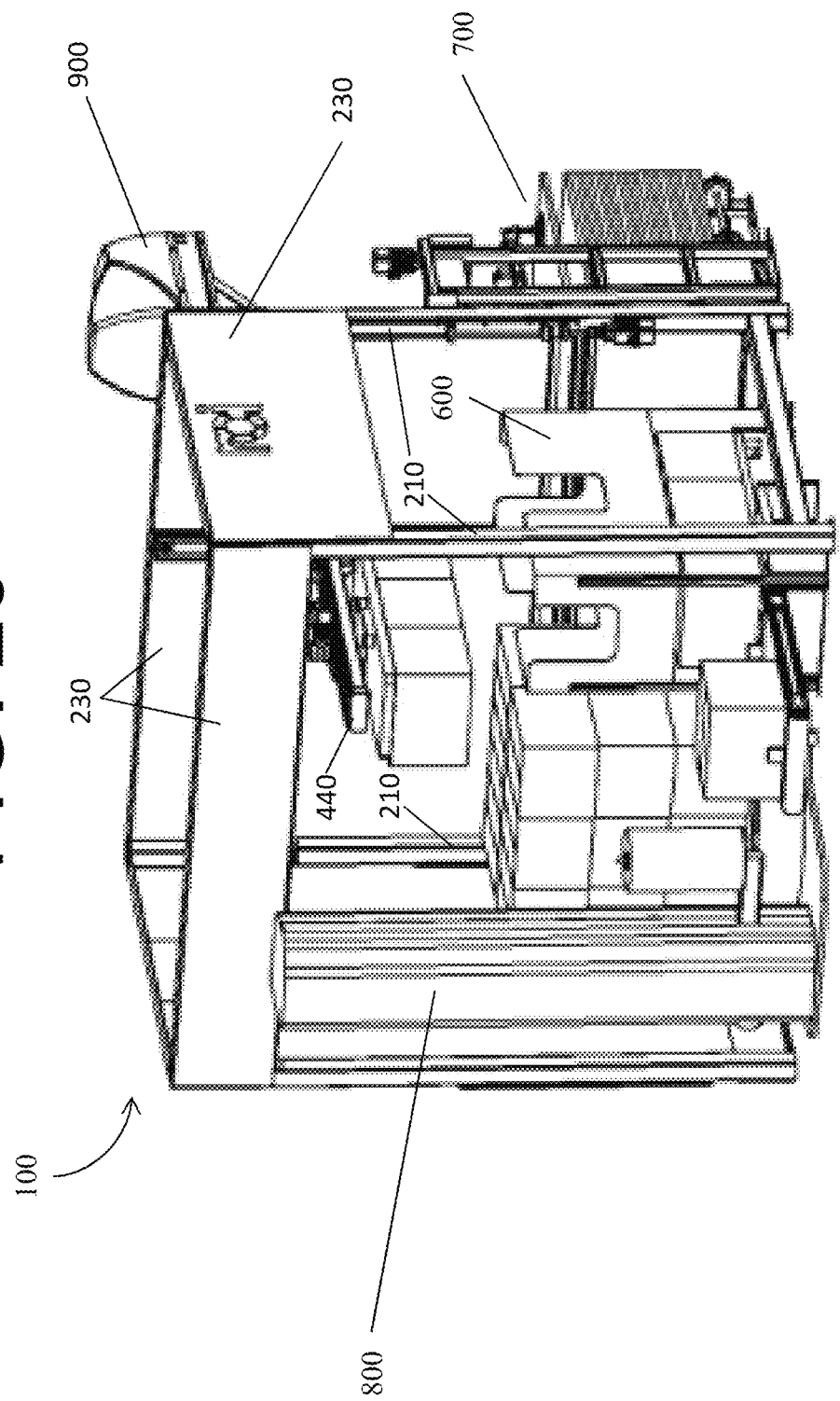
FIG. 26 illustrates a perspective front view of a palletizer with stretch wrapping and box buffering accessories according to the present invention.

FIG. 26 illustrates a perspective front view of a palletizer 100 with stretch wrapping and box buffering accessories according to the present invention, showing vertical posts of the frame 210, panels 230, a box buffering system 600, a tier sheet dispenser 700, a stretch wrapper, and 800, and a large capacity vacuum blower mounted in a silencer box 900.

The compact palletizer of the present invention preferably is operable to be constructed in many sizes. A preferred size of the compact palletizer is a compact palletizer having a stack height of about 2.57 meters (or about 8 feet 5 inches), with a total height of about 3.35 meters (or about 11 feet). In another embodiment, a preferred size of the compact palletizer is a compact palletizer having a stack height of about 1.52 meters (or about 5 feet), with a total height of about 2.43 meters (or about 8 feet). The present invention can place product onto standard size USA or European pallets. Notably, the palletizer of the present invention has a stack height to palletizer height ratio of as high as about 0.767.

Another embodiment of the present invention provides for a depalletizer. The depalletizer of the present invention is similar to the compact palletizer of the present invention, and utilizes many of the same components. However, the depalletizer preferably uses a longer x-axis. In one embodiment, the x-axis of the depalletizer is about 3.048 meters (10 feet). Preferably, the depalletizer can use any end-of-arm tool appropriate for depalletizing. Any prehensile end effector can be used, including impactive, ingressive, astrictive, and contigutive. Impactive effectors include jaws or claws which physically grasp by direct impact upon the object. Ingressive effectors include pins, needles or hackles which physically penetrate the surface of the object (used in textile, carbon and glass fibre handling). Astrictive effectors are those that produce a binding force using a field, and include vacuum, magneto- or electroadhesion. Contigutive effectors requiring direct contact for adhesion to take place (such as glue, surface tension or freezing). In a preferred embodiment, side clamps are used to unload a layer. In one embodiment, the arm of the depalletizer can move up to approximately 100 kg (or approximately 220 lbs). In one embodiment, the depalletizer has a camera that is operable to view and/or detect that a pallet is twisted, shifted, or skewed, as well as the nature and degree of the twisting, shifting, and/or skewing. Preferably, the camera is top-mounted above the arm. In one embodiment, the depalletizer can handle up to about 20.32 cm (8 inches) of skew (i.e. a load being up to about 20.32 cm (8 inches) off of the pallet) before correction is needed. In one embodiment, the depalletizer includes an assembly for correcting the twisting, shifting, and/or skewing.

In one embodiment, the depalletizer does not include panels.

Figure 27:
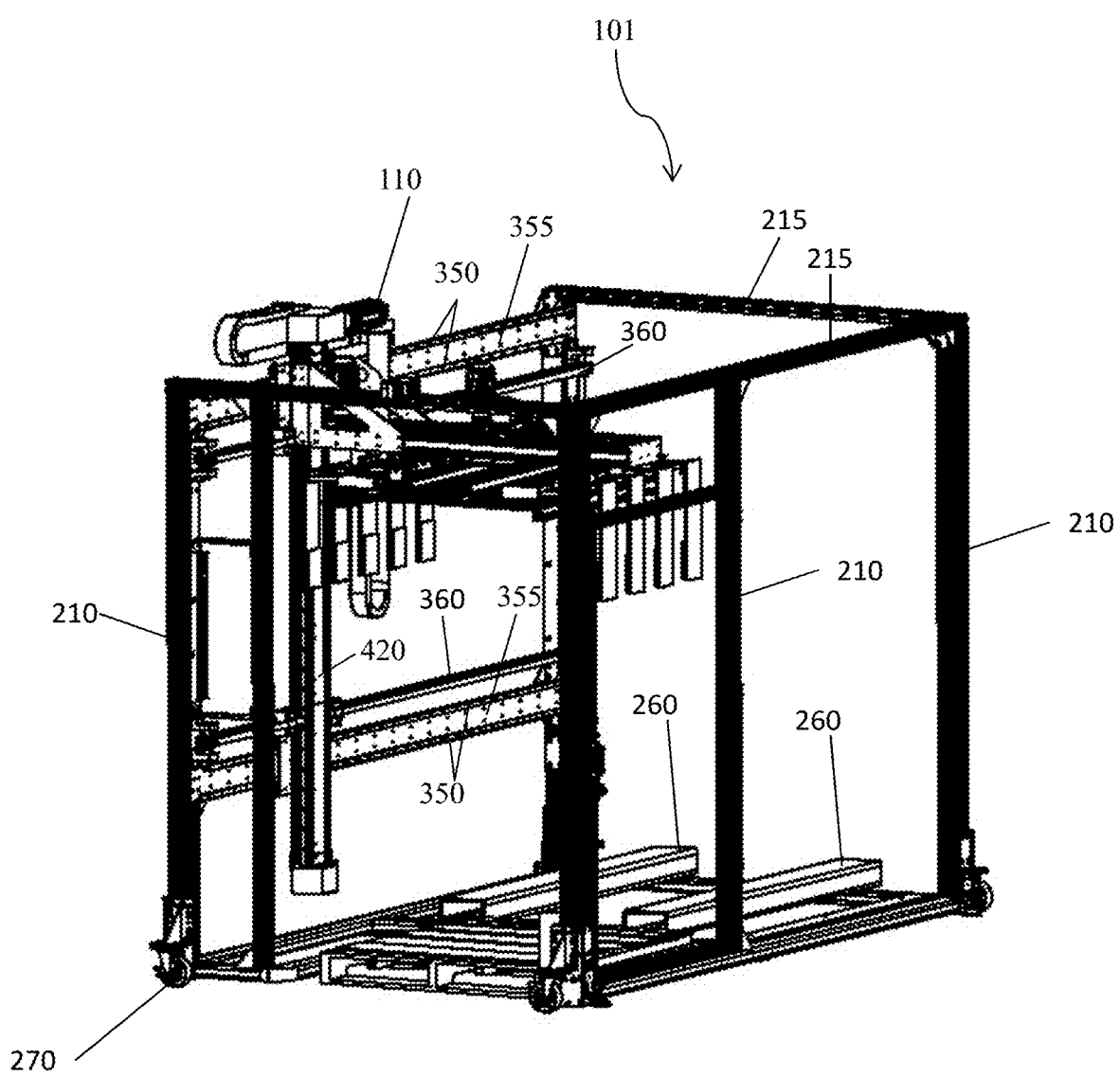
FIG. 27 illustrates a perspective front view of a depalletizer without panels according to the present invention.

FIG. 27 illustrates a perspective front view of a depalletizer 101 without panels according to the present invention, showing a motor 110, vertical posts of the frame 210, horizontal bars of the frame 215, forklift pockets 260, wheels 270, v-rails 350, plates for mounting v-rails 355, timing belts 360, and a spine 420.

Figure 28:
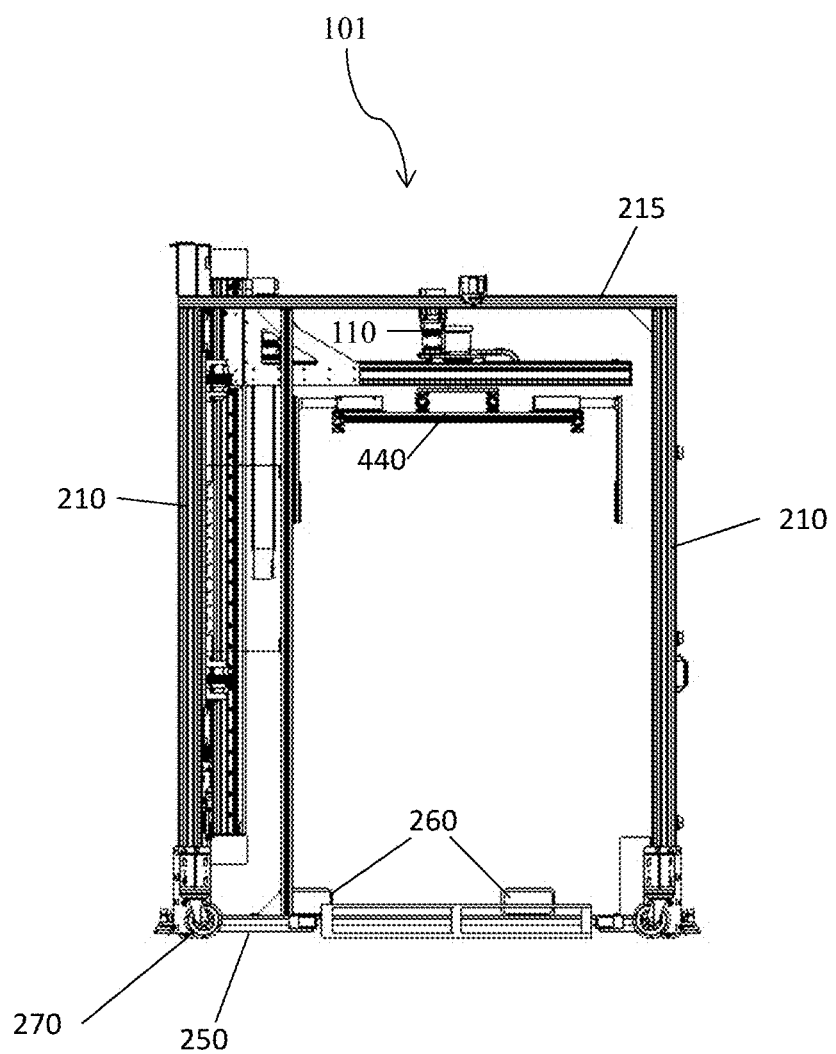
FIG. 28 illustrates a front view of a depalletizer without panels according to the present invention.

FIG. 28 illustrates a front view of a depalletizer 101 without panels according to the present invention and shows a motor 110, vertical posts of the frame 210, horizontal bars of the frame 215, a steel base 250, forklift pockets 260, wheels 270, and an end of arm tooling (EOAT) assembly 440.

Figure 29:
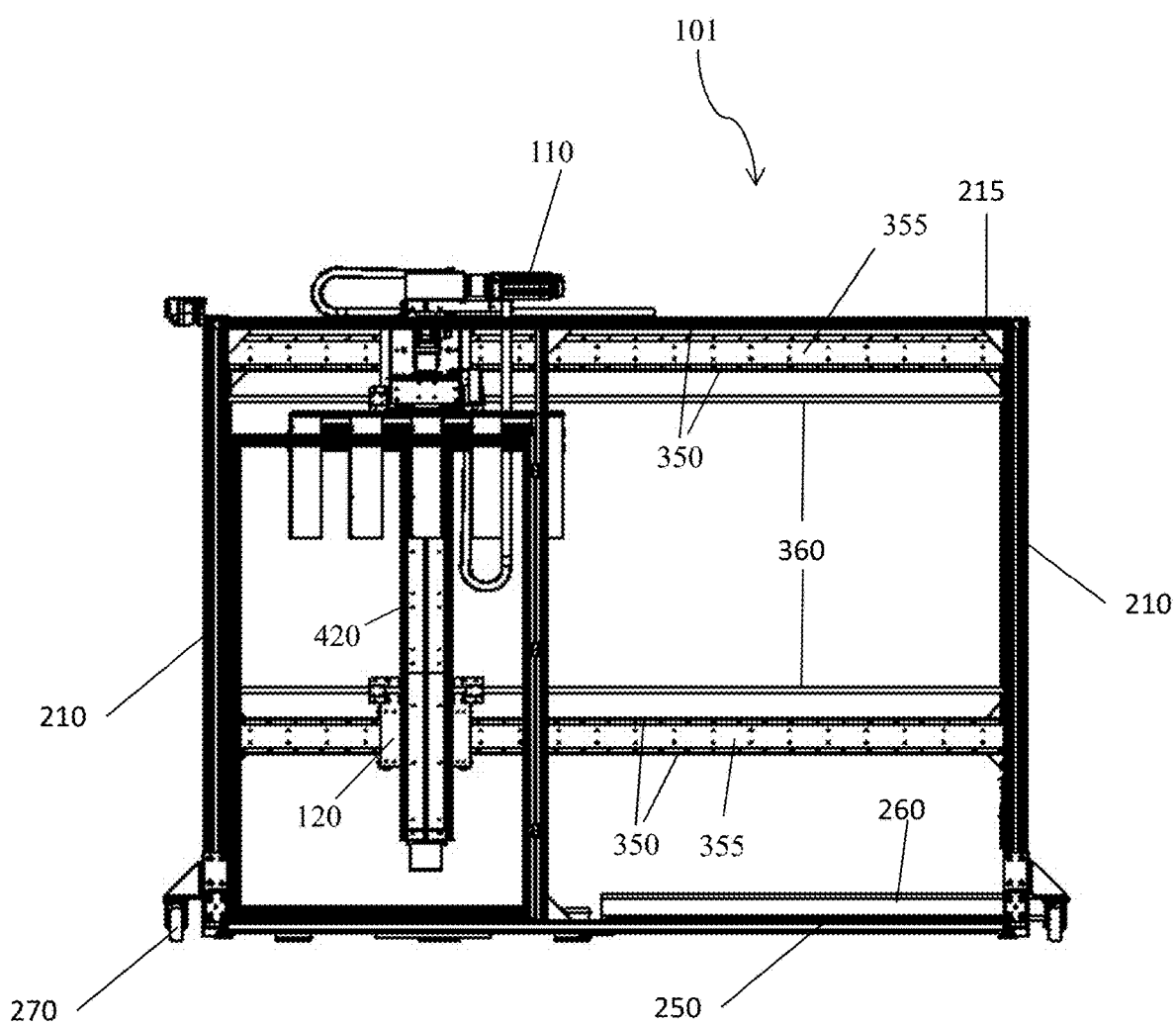
FIG. 29 illustrates a side view of a depalletizer without panels according to the present invention.

FIG. 29 illustrates a side view of a depalletizer 101 without panels according to the present invention, showing a motor 110, v-roller mount and belt tensioner 120, vertical posts of the frame 210, horizontal bars of the frame 215, a steel base 250, forklift pockets 260, wheels 270, v-rails 350, plates for mounting v-rails 355, timing belts 360, and a spine 420.

Figure 30:
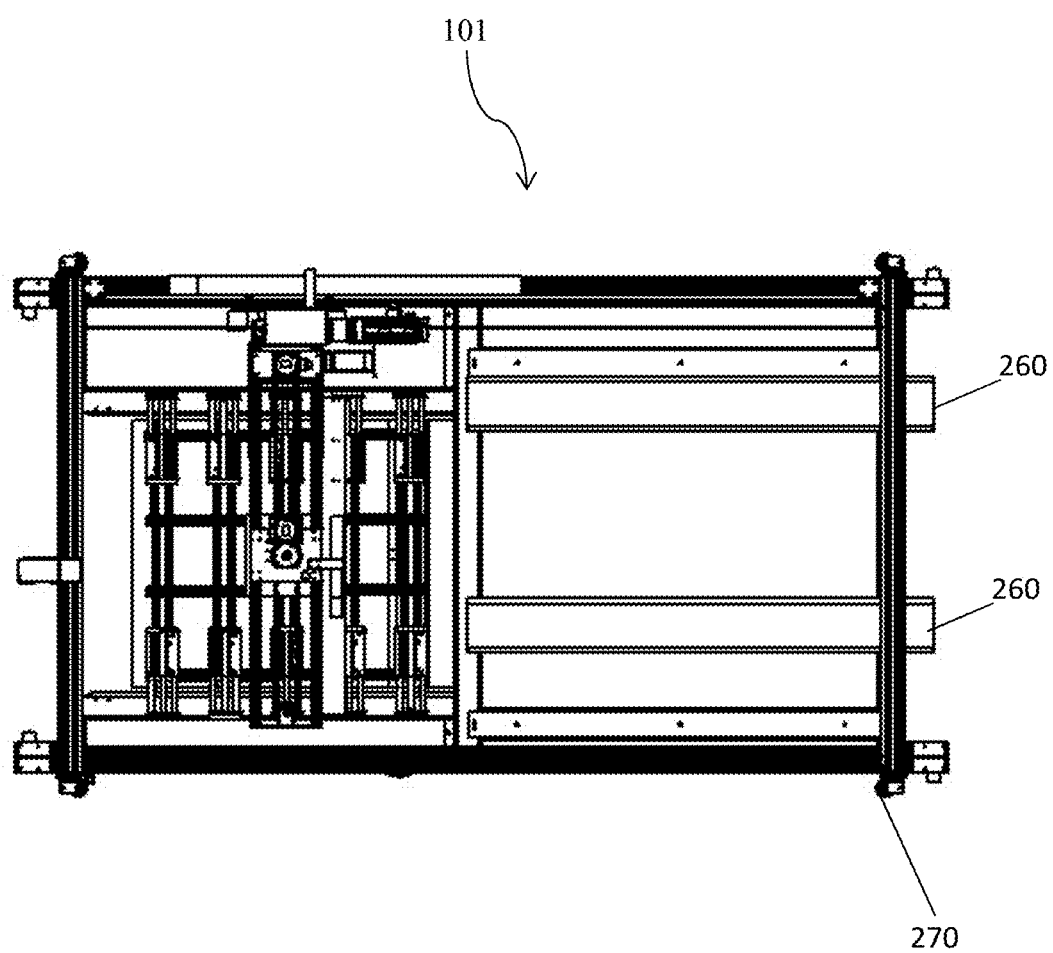
FIG. 30 illustrates a top view of a depalletizer according to the present invention.

FIG. 30 illustrates a top view of a depalletizer 101 according to the present invention, showing forklift pockets 260 and wheels 270.

In another embodiment, the depalletizer includes panels. Preferably, the panels are constructed of aluminum and/or polycarbonate. The aluminum panels add strength, rigidity, and stiffness to the structure, and the polycarbonate panels add visibility as well as creating a safe enclosure. The panels provide security and safety by partially enclosing the compact palletizer. In one embodiment, the panels become an integral part of the assembly, thus adding even more rigidity to the already rigid palletizer.

In one embodiment, the depalletizer also includes clear polycarbonate panels and/or clear polycarbonate doors. The polycarbonate panels and/or polycarbonate doors are operable to make the interior of the palletizer accessible, as well as to provide visibility into the interior of the palletizer.

Figure 31:
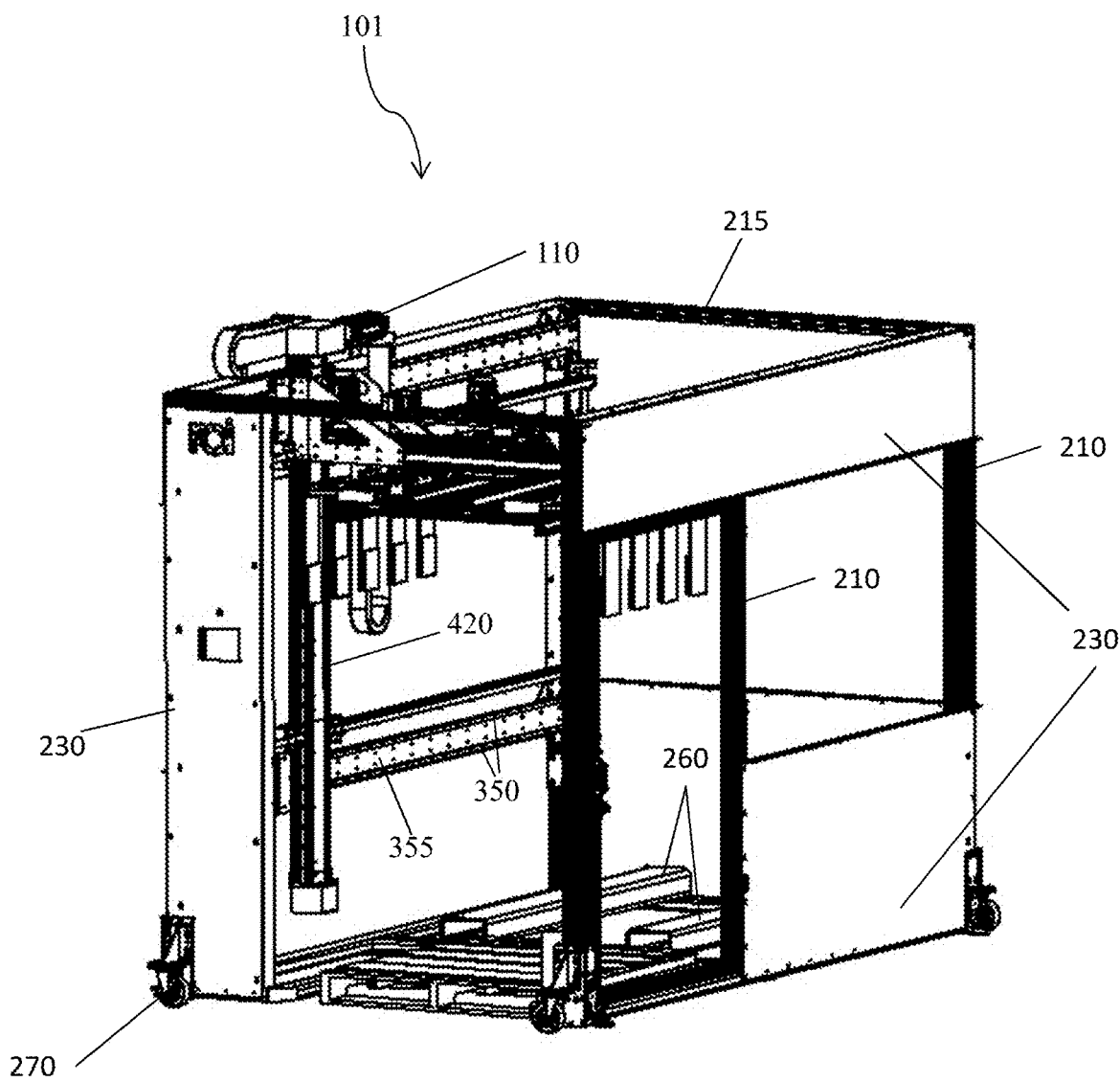
FIG. 31 illustrates a perspective front view of a depalletizer with panels according to the present invention.

FIG. 31 illustrates a perspective front view of a depalletizer 101 with panels according to the present invention, showing a motor, vertical posts of the frame 210, horizontal bars of the frame 215, panels 230, forklift pockets 260, wheels 270, v-rails 350, plates for mounting v-rails 355, and a spine 420.

Figure 32:
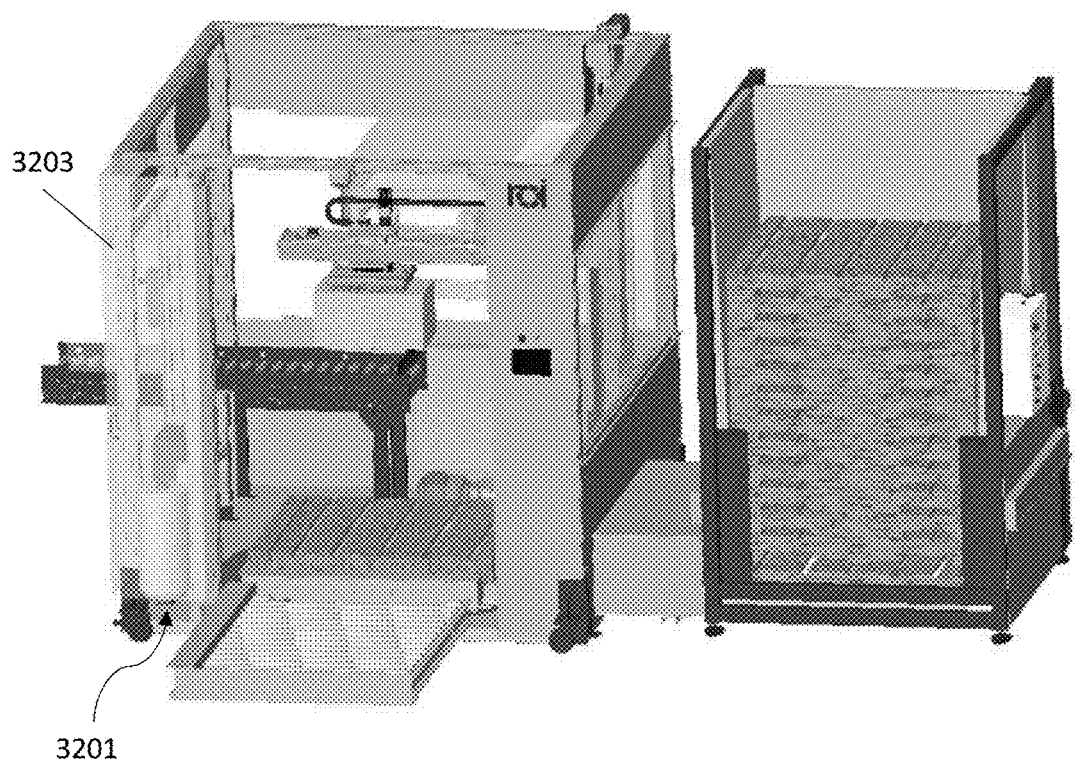
FIG. 32 illustrates a front perspective view of a palletizer with a stretch wrap system, pallet dispenser, and tier sheet dispenser according to the present invention.
Figure 33A:
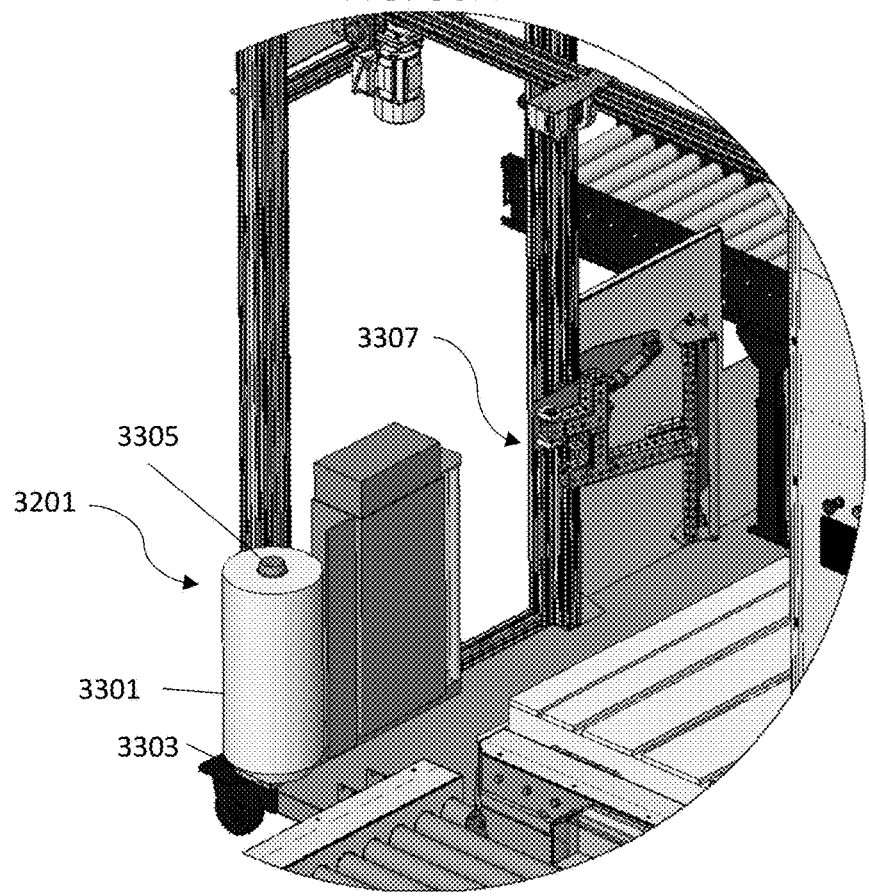
FIG. 33A illustrates a detail view of a stretch wrap system according to the present invention.

The present invention further comprises a compact palletizer with a stretch wrap system. FIG. 32 illustrates one embodiment of the compact palletizer with a stretch wrap system, a tier sheet dispenser, a pallet dispenser, and infeed and outfeed conveyors. A pre-stretch unit 3201 is manually loaded with a stretch wrap roll. A protective guard 3203 covers and provides access to the pre-stretch unit 3201. FIG. 33A illustrates a detailed view of the pre-stretch unit 3201 with the protective guard 3203 and other elements removed for clarity. The stretch wrap system includes a rolling shaft 3305 with support base 3303. A roll of stretch wrap 3301 is slidingly attached to the rolling shaft 3305 and rests on the support base 3303. Unrolled stretch wrap film is threaded through the pre-stretch unit 3201 prior to attachment to a pallet platform, pallet, or turntable.

FIG. 33A further illustrates a stretch wrap system further including a swing arm 3307 (also known as a wiper arm), which promotes automated end of wrap operations, including wiping the end of the film firmly against the load, positioning the film into an automatic stretch wrap gripper, and cutting of the stretch wrap. In a manual embodiment, an end of the stretch wrap is attached to the pallet, hooks on the pallet or turntable, or is tucked under palletized products. In an automatic embodiment, stretch wrap film is guided by the swing arm into a film clamp or automatic stretch wrap gripper mounted to the pallet platform, turntable, or pallet, wherein the stretch wrap gripper is operable to automatically retract and/or clamp an end of stretch wrap film. In an automatic embodiment, stretch wrap film is attached to hooks, clamps, grippers, or tucked under palletized products by the swing arm, by an EOAT or other robotic arm, by activation of a fan which blows an end of the stretch wrap into place, by activation of a roller or pulley system attached to the turntable or pallet, or by any other method for automatically securing an end of the stretch wrap into position. Clamps, grippers, or other automatic gripping elements are operable to retract, grab, or otherwise automatically secure an end of stretch wrap film upon activation or upon sensing the presence of the stretch wrap film. The compact palletizer begins palletizing products either before or after the stretch wrap is secured. Upon activation of an automatic or manual process, a pallet platform rotates the pallet with palletized objects, pulling an attached end of stretch wrap and consequently wrapping the pallet and products. The pre-stretch unit is powered by and controlled by a motor, which translates the pre-stretch unit 3201 vertically. In an alternative embodiment, the compact palletizer does not include a swing arm but instead allows for an end of the stretch wrap to be positioned manually in clips, hooks, or grippers on the turntable, pallet platform, or pallet without a swing arm.

Figure 33B:
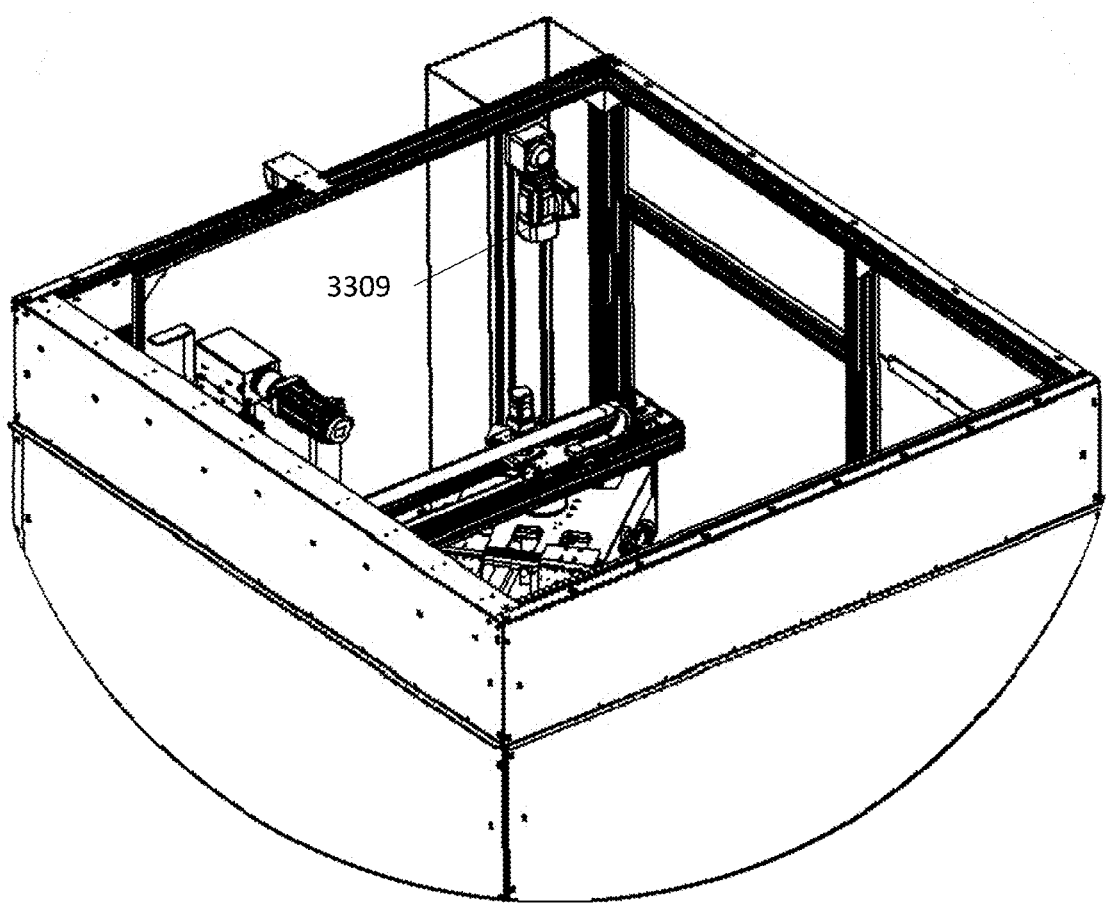
FIG. 33B illustrates a detail view of a motor for raising and lowering the plastic film pre-stretch unit according to the present invention.

FIG. 33B illustrates one embodiment of a motor 3309 for the pre-stretch unit, wherein the motor controls a belt, track, chain, or rollers, which when activated translates the plastic film pre-stretch unit vertically.

Vertical movement of the plastic film pre-stretch unit is controlled by either automatic or manual controls. In one embodiment, a stretch wrap spin value is preset, wherein the spin value is the number of revolutions the turntable performs with stretch wrap attached to the pallet. The spin value is transformed into a vertical motion speed for the pre-stretch unit. For example, in one embodiment, a stretch wrap spin value of 1=3 is preset. The palletizer uses the equation: $(hn-w)/(\Omega l)$, wherein h is the height of each pallet layer, n is the number of pallet layers, w is the width of the stretch wrap, and $\Omega$ is the rotational speed of the palletizer in revolutions per unit of time. For three palletized layers (n=3), wherein each layer is 30.48 cm (one foot) high (h=1), wherein the pallet platform turntable has a rotational speed of 2 seconds per revolution ($\Omega$=2), and wherein the stretch wrap has a width of 45.72 cm (1.5 feet) (w=1.5), the palletizer calculates a required vertical speed of 7.62 cm (0.25 feet) per second in order to wrap the pallet from top to bottom in three revolutions. This equation is only one embodiment of the vertical speed calculation and is intended to illustrate the calculation of vertical pre-stretch unit speed and not limit the speed calculation to three revolutions, 7.62 cm (0.25 feet) per second, or any other exemplary variable. The speed determination is operable to be repeated, modified, or reversed in order to set a desired level of stretch wrap coverage, layering, or process completion time.

Preferably, the pre-stretch unit completes its wrapping cycle in line with the swing arm such that the swing arm is operable to engage the dispensed stretch wrap, attach an end to the pallet platform, and cut the stretch wrap. In the illustrated embodiments, the swing arm does not translate horizontally or vertically, however one skilled in the art will recognize that in further embodiments, the swing arm is operable to be connected to a belt, track, chain, or rollers actuated by a motor, wherein the swing arm translates horizontally or vertically for engaging, attaching, or cutting at different positions for a palletized load.

In further embodiments, the palletizer determines the dimensions of objects through sensors, cameras, or other computer vision hardware and software and rotates or positions surfaces of the object such that the space of the pallet is maximized and a level surface is created. For example, if all of the objects are equidimensional rectangular cuboids, the EOAT rotates the objects to have a similar vertical orientation and positions the objects on the pallet with alternating left-right and front-back alignment for stackable structural stability and space optimization. In still further embodiments, similar palletizing patterns are repeated for multiple layers, wherein each layer is rotationally symmetrical to the layer below or above it (e.g., a second layer is rotated 90 degrees from the first layer) to improve stackable structural stability.

Further variables in determining palletizing positions include sensor determined or pre-calculated object weight, dimensions, barcode or label placement, color, temperature, density, or material.

Based on control mechanisms or timing belts, products are delivered along a conveyor to a position below or near the EOAT assembly, from which the EOAT assembly transfers the products or loads to a pallet in accordance with the software-driven algorithms for control mechanisms and palletizing procedures. For example, in one embodiment, the software-driven algorithms determine the fastest possible palletizing procedure when multiple conveyors deliver objects to the palletizer based on a speed of each of the conveyors, a size and weight of the objects, a desired pallet height, and/or a desired pallet stacking density (e.g., a predefined space between palletized objects).

Figure 34A:
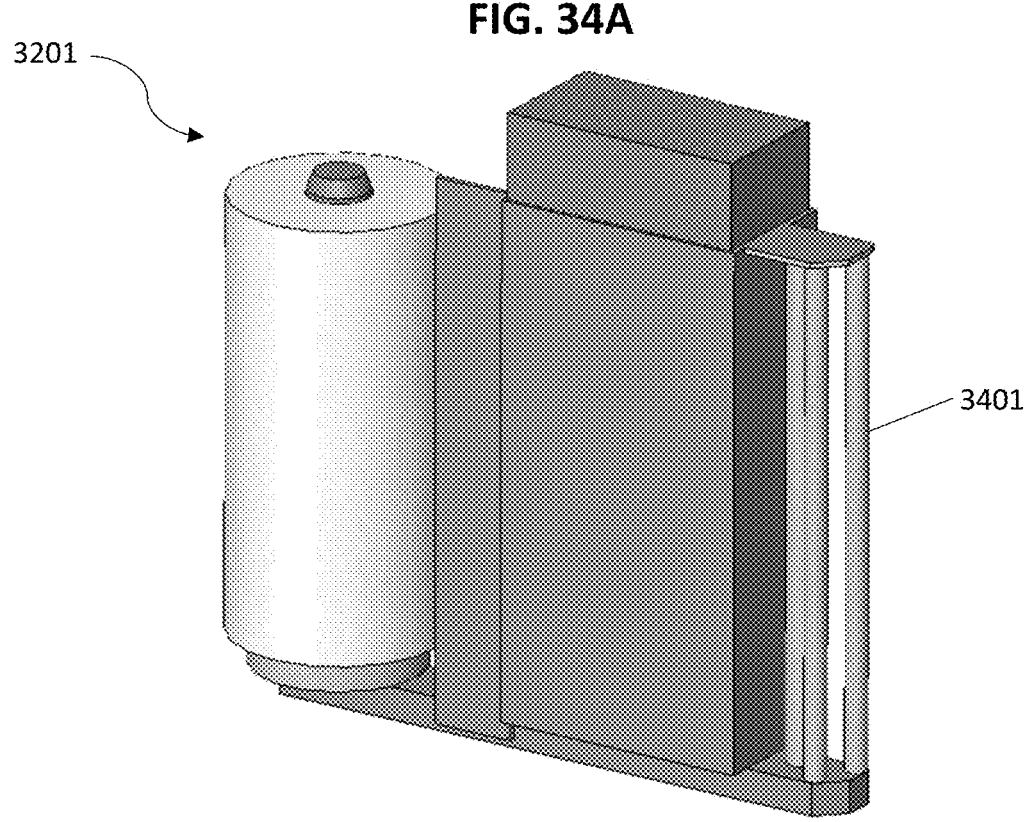
FIG. 34A illustrates a front perspective view of a plastic film pre-stretch unit according to the present invention.
Figure 34B:
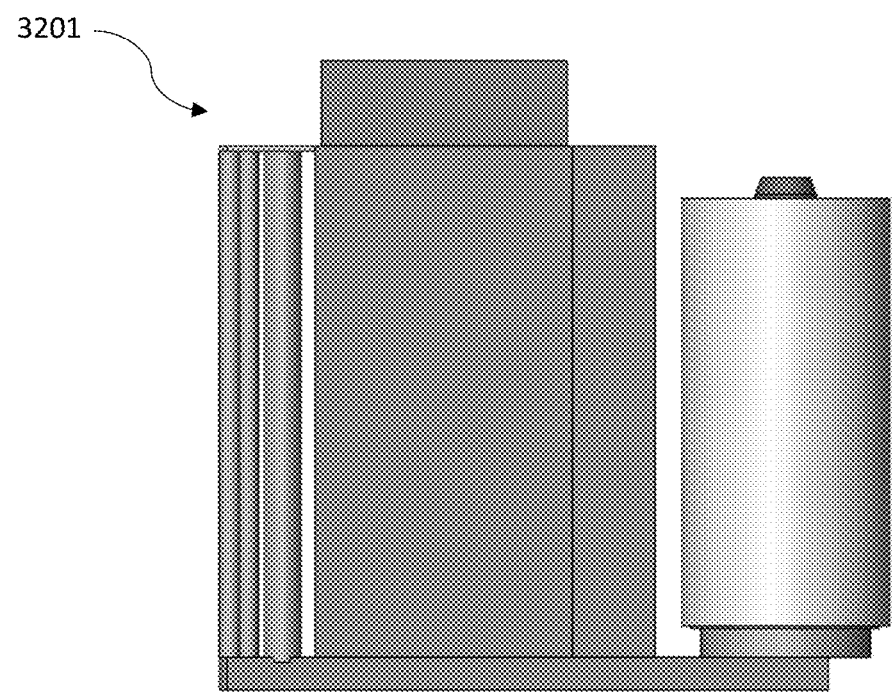
FIG. 34B illustrates a front view of a plastic film pre-stretch unit according to the present invention.

FIG. 34A illustrates an isometric view of the plastic film pre-stretch unit, wherein stretch wrap is manually fed through rollers 3401 to promote smooth dispensing, wrapping, tensioning, and yield of the unrolled stretch wrap film. FIG. 34B illustrates a front view of the plastic film pre-stretch unit.

The pre-stretch unit is further operable to contain a motor within the body of the unit, which controls a dispensing speed, a tension applied to the load, and a film pre-stretch ratio. The film pre-stretch ratio is, in one embodiment, adjusted between 150% and 300% depending on the properties and gauge of the stretch film. This value is adjusted through automatic or manual settings by way of a controller (e.g., a switch, dial, button, or an interface on an HMI) that directly controls the speed of the pre-stretch rollers. Values set through the controller are operable to be stored in a memory of the compact palletizer. Using a pre-stretch system maintains the overall maximum width of the film while providing better coverage with fewer required wraps and results in a more secure load while increasing (e.g., doubling or tripling) a yield from a roll of film. This reduces the time and overall cost of preparing and wrapping a load.

In a preferred embodiment, the pre-stretch unit is used with plastic stretch wrap, including linear low-density polyethylene (LLDPE) or polyvinyl chloride (PVC) stretch wrap. However, one skilled in the art will recognize that the pre-stretch unit is compatible with any stretch wrap material known in the art or equivalent materials developed in the future of the art.

Figure 35A:
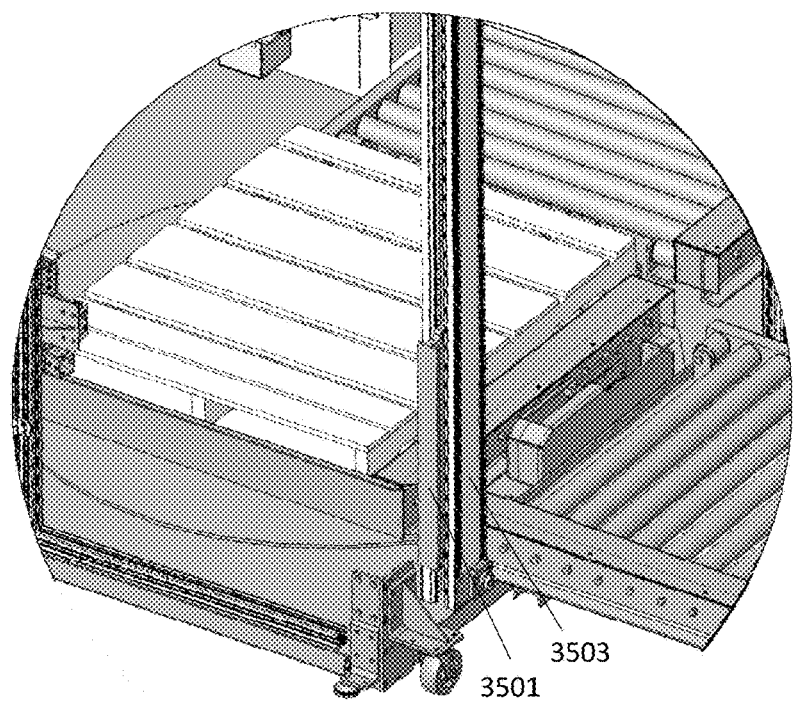
FIG. 35A illustrates a detail view of a roller block and track according to the present invention.
Figure 35B:
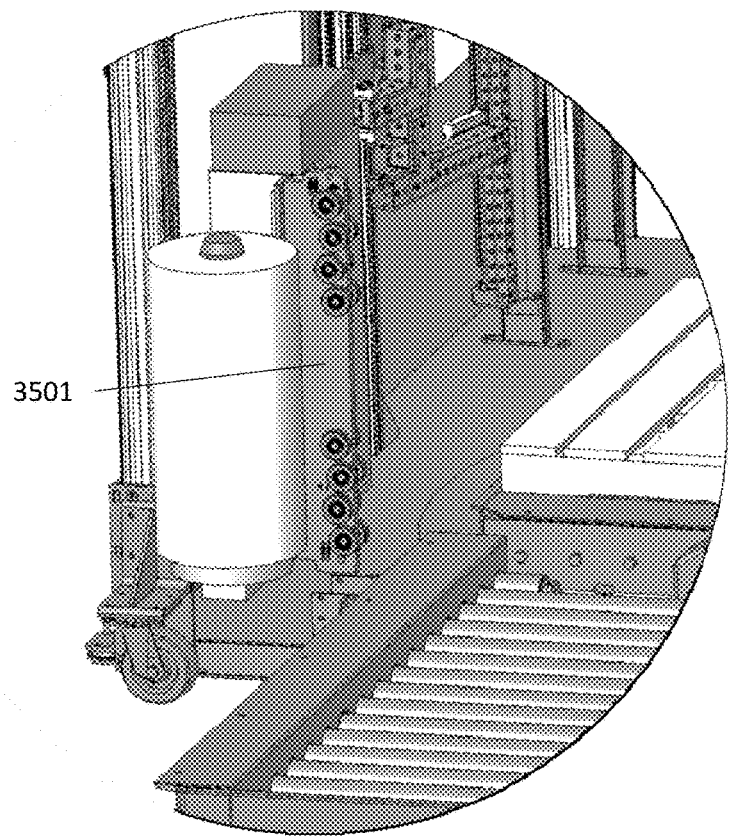
FIG. 35B illustrates a detail view of a roller block and plastic film pre-stretch unit according to the present invention.

FIG. 35A illustrates a roller block 3501, which is operable to be attached to the pre-stretch unit and to translate the pre-stretch unit along a vertical track 3503 when vertically actuated by a belt, track, chain, or roller operably connected to a motor attached to the vertical track 3503. In an alternative embodiment, at least one motor is internal or directly attached to the roller block 3501 and controls wheels or rollers of the roller block directly. FIG. 35B illustrates a view of the roller block 3501 attached to the pre-stretch unit with the vertical track not shown.

Preferably, for unstable product loads the palletizer is operable to activate the wrap unit, wrap an unstable load of stacked products, continue to stack products, and then wrap the wrapped unstable load of stacked products and the second stack of products. In another embodiment, the palletizer is operable to stack objects while the stretch wrap system is simultaneously wrapping. In yet another embodiment, the stretch wrap system is activated during downtime or pauses of the palletizing process (e.g., the palletizer is waiting for an object to be delivered along a conveyor). These wrapping processes promote stabilization of the pallet load as the palletizer continues to palletize products. Alternatively, a second stretch wrapper system with stretch wrap of a different height is included in the compact palletizer to wrap individual layers of products. The second stretch wrapper system includes a platform with a motor, jack, or any other means for powering vertical and/or horizontal movement for other components of the palletizer as described herein and rails, rail guides, or any other means for permitting vertical and/or horizontal movement for other components of the palletizer as described herein. This process is repeatable for any number of products allowed by the height of the palletizer.

Figure 36:
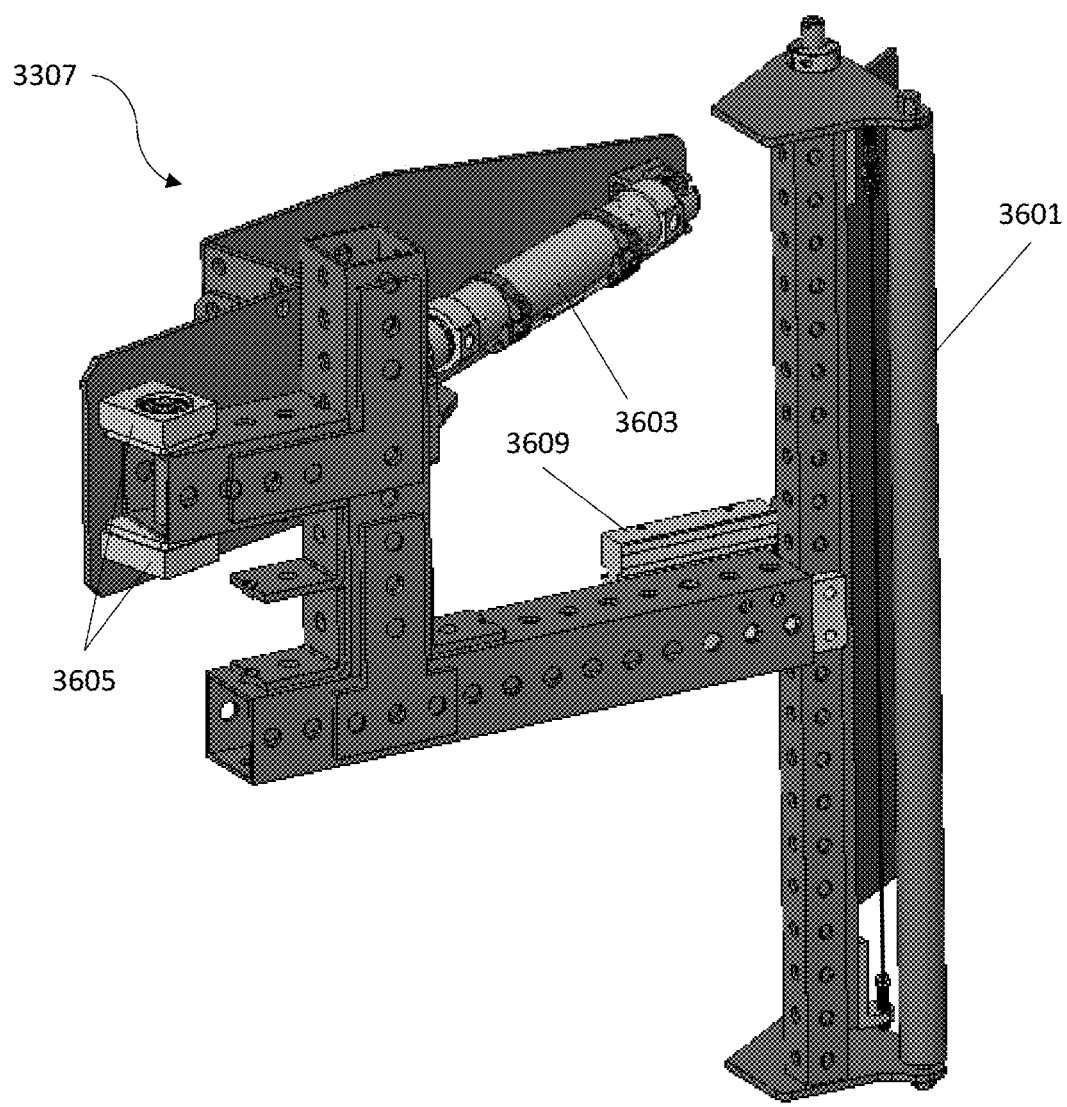
FIG. 36 illustrates a front perspective view of a swing arm according to the present invention.
Figure 37A:
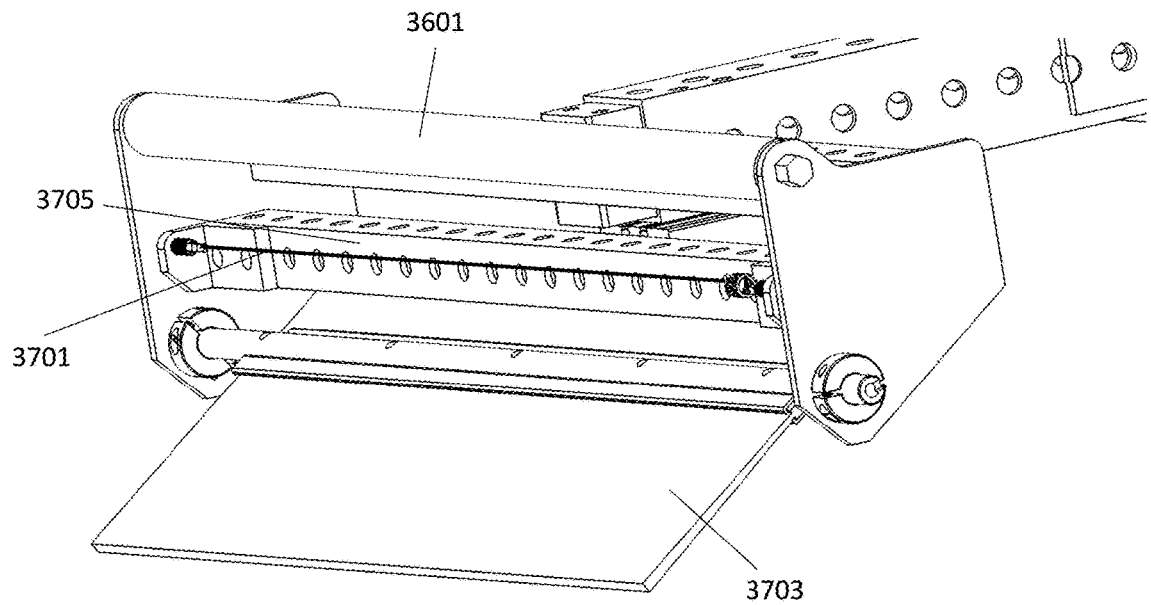
FIG. 37A illustrates a detail view of a swing arm with wiper and heat wire according to the present invention.
Figure 37B:
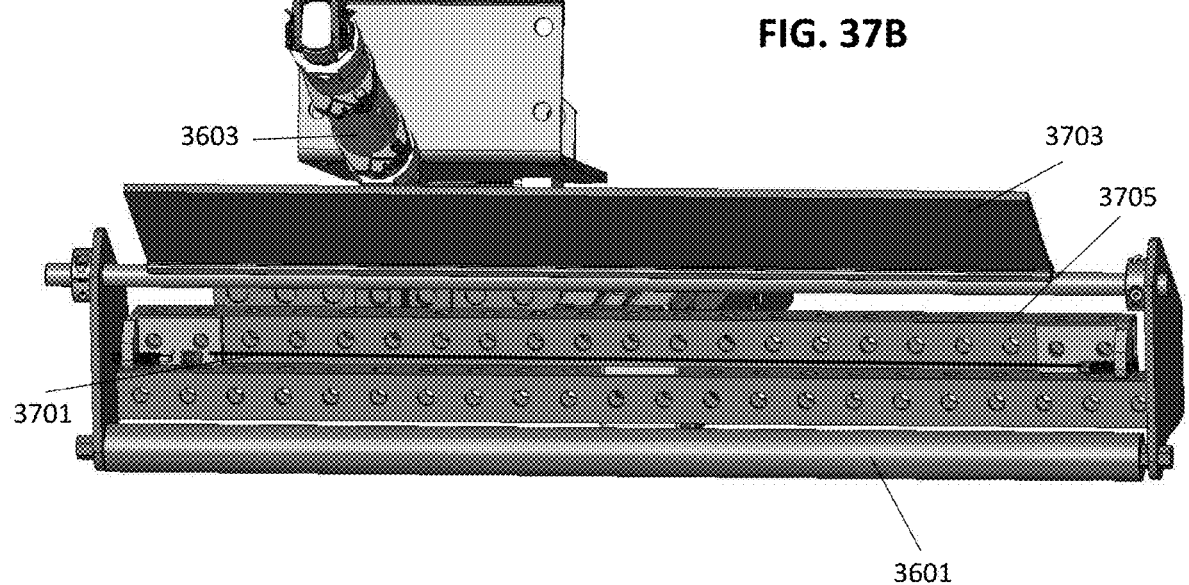
FIG. 37B illustrates a right perspective view of the swing arm with wiper and heat wire according to the present invention.
Figure 37C:
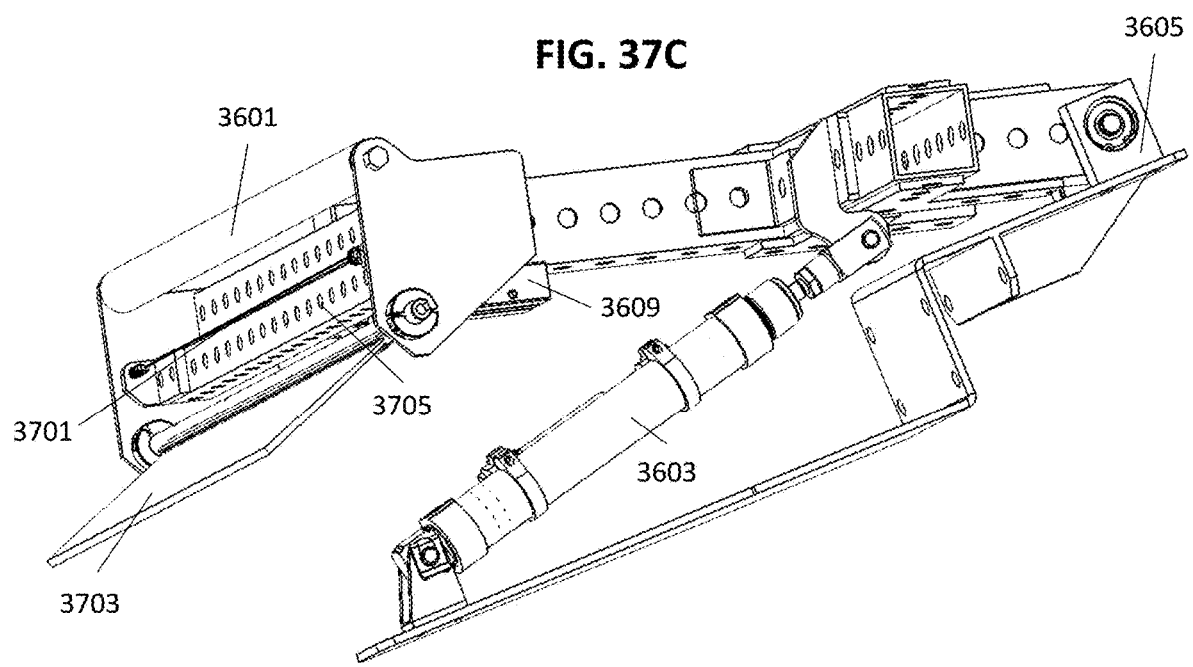
FIG. 37C illustrates a top perspective view of the swing arm with wiper and heat wire according to the present invention.
Figure 37D:
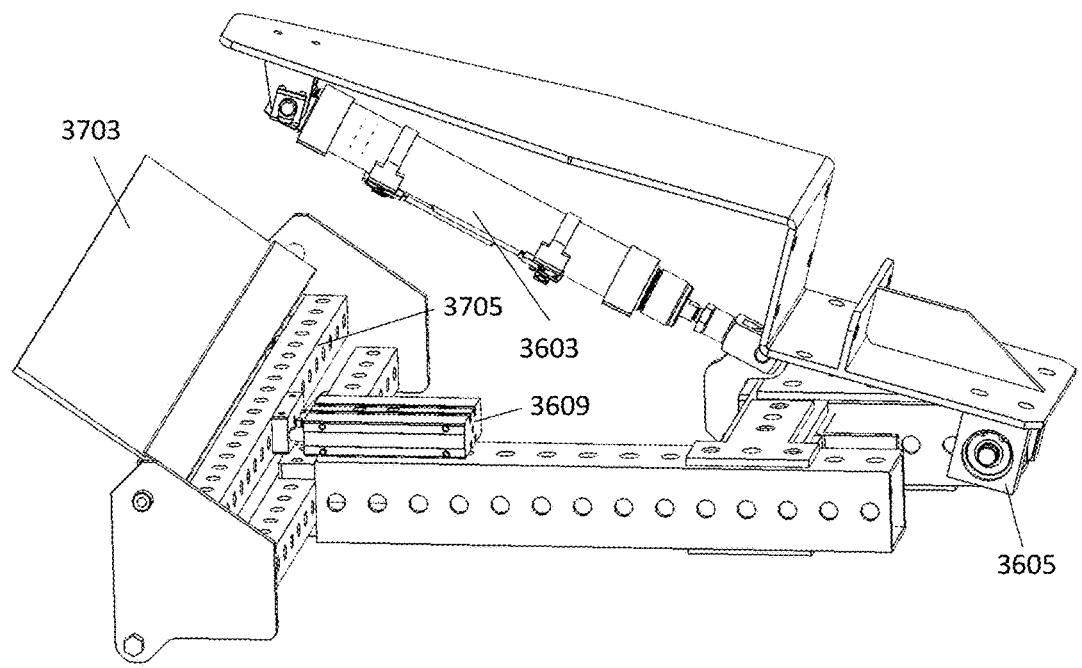
FIG. 37D illustrates a bottom perspective view of the swing arm and linear pneumatic cylinder according to the present invention.
Figure 37E:
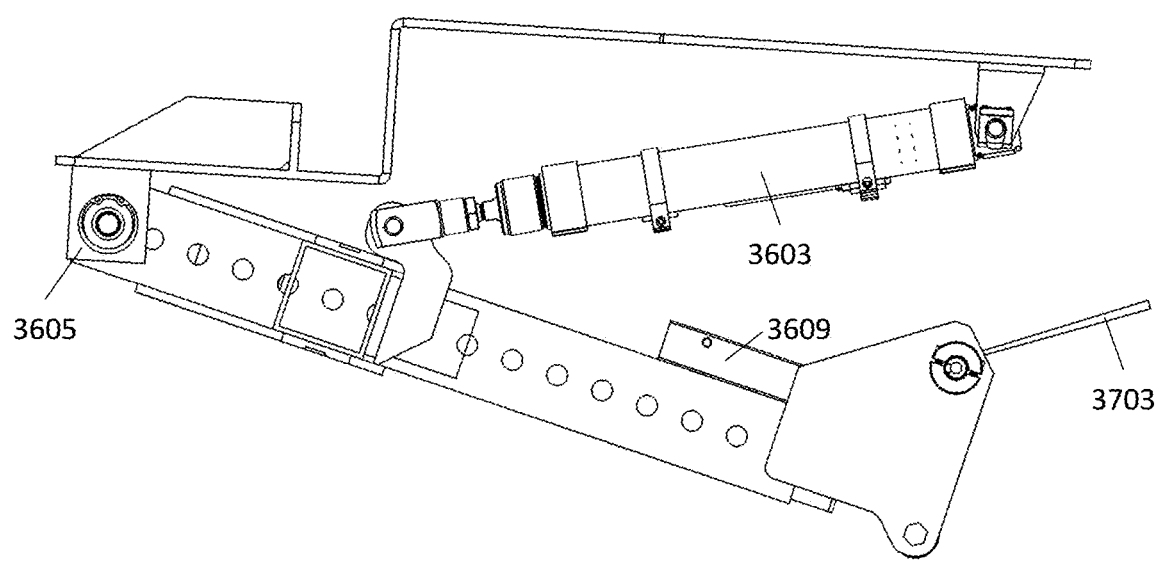
FIG. 37E illustrates a top view of the swing arm with wiper, main pneumatic cylinder, and linear pneumatic cylinder according to the present invention.

FIG. 36 illustrates a front perspective view of the swing arm 3307, wherein the swing arm 3307 includes a roller 3601 for the stretch wrap, a main pneumatic cylinder 3603, a linear pneumatic cylinder 3609, and a pivot bearing 3605. Stretch wrap is fed through the roller 3601 upon setup. Upon activation of the pneumatic cylinder 3603, the swing arm engages unrolled stretch wrap film and a wrapped, palletized load with the roller 3601, applies pressure to secure the stretch wrap film to the palletized load, guides the stretch wrap into gripper jaws, hooks, or other attachment mechanism on the pallet platform, and activates the linear pneumatic cylinder 3609 to activate a cutting device to cut the stretch wrap film. The swing arm then returns to its retracted position. While the figure illustrates pneumatic cylinders, one skilled in the art will recognize that further embodiments include hydraulic cylinders, electric cylinders, solenoids, or other mechanical actuation methods. FIG. 37A illustrates a detail view of the swing arm further depicting a wiper 3703, a heat wire 3701, and a heat wire tubing 3705. The wiper 3703 assures that the stretch wrap film is smoothly and securely applied to a palletized load and is aligned with the attachment mechanism of the pallet platform. Notably, the wiper 3703 is operable to take any shape that is operable to accomplish the application and alignment functionality required of the wiper 3703, including a rounded or double-layered sheet. Further, the wiper 3703 is operable to be made of any material that allows for the same functionality, including aluminum, rubber, silicone, or plastic. Upon activation of a linear pneumatic cylinder, the heat wire tubing 3705 is pushed towards an engaged stretch wrap film, whereby the heat wire 3701 cuts the stretch wrap film. The heat wire 3701 is preferably heated through electrical means and is connected to the palletizer electrical system, an internal battery, or other power source. In further embodiments, the heat wire 3701 is replaced with a blade, a laser, or any other means of cutting the stretch wrap film.

FIGS. 37B, 37C, 37D, and 37E illustrate a right perspective, top perspective, bottom perspective, and top view, respectively, of the swing arm with wiper.

Figure 38:
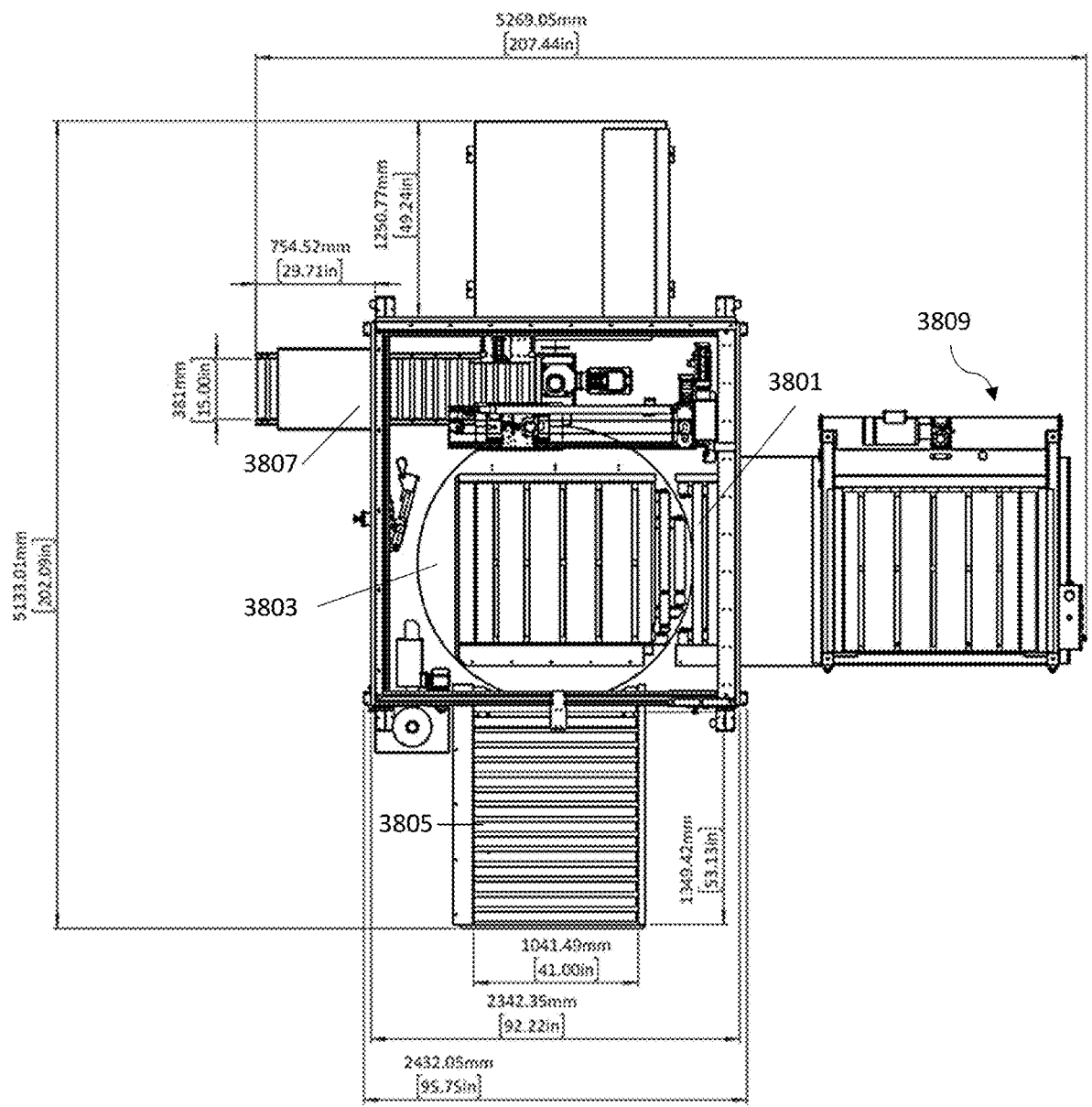
FIG. 38 illustrates a top view of a compact palletizer with a pallet dispenser, stretch wrap system, infeed and outfeed conveyors, and a tier sheet dispenser according to the present invention.

Significantly, the stretch wrap system for the compact palletizer is more compact than wrap units provided by prior art. Whereas other palletizers provide stretch wrap systems that are external to the palletizer or have components that extend beyond the palletizer dimensions, the stretch wrap system of the present invention provides for wrapping to occur within the confines of the compact palletizer. In one embodiment, the only component that extends beyond the compact palletizer is the half of the pre-stretch unit that holds the stretch wrap roll, which is surrounded by the stretch wrap protective guard. This extension provides easy maintenance and replacement of the stretch wrap roll. In one embodiment, the dimensions of the palletizer are approximately 2.3484 meters (96 inches) in length (measured along the front of the palletizer), 2.6162 meters (103 inches) in height, and approximately 2.7686 meters (109 inches) deep (without external attachments or conveyors). In another embodiment, the height is approximately 3.6576 meters (144 inches). In a further embodiment, the height is between approximately 2.6162 meters (103 inches) in height and approximately 3.6576 meters (144 inches) in height. The pre-stretch unit is approximately 77.47 cm (30.5 inches) in length (measured from the stretch wrap roll end to the roller end), 74.93 cm (29.5 inches) in height, and 16.51 cm (6.5 inches) in width. The stretch wrap protective guard extends approximately 19.05 cm (7.5 inches) from the edge of the palletizer. The innovatively compact size provides for increased portability. FIG. 38 illustrates a top view of the compact palletizer with a pallet dispenser and a tier sheet dispenser. In the illustrated embodiment, the conveyor extends approximately 76.2 cm (30 inches) from the side of the palletizer. A tier sheet dispenser is attached to the rear of the palletizer and extends approximately 1.2446 meters (49 inches) from the rear of the palletizer.

FIG. 38 further illustrates a pallet dispenser 3809 attached to the compact palletizer, wherein the pallet dispenser 3809 releases one pallet along an indexing conveyor 3801 to the pallet platform 3803. The pallet platform then rotates the pallet in line with an outfeed conveyor 3805 and begins palletizing from products delivered along the infeed conveyor 3807. In a further embodiment, the pallet platform is operable to rotate the pallet any number of degrees to align the pallet with a conveyor, with an external attachment (e.g., a pallet dispenser or tier sheet dispenser), or to the EOAT during a palletizing procedure.

Figure 39:
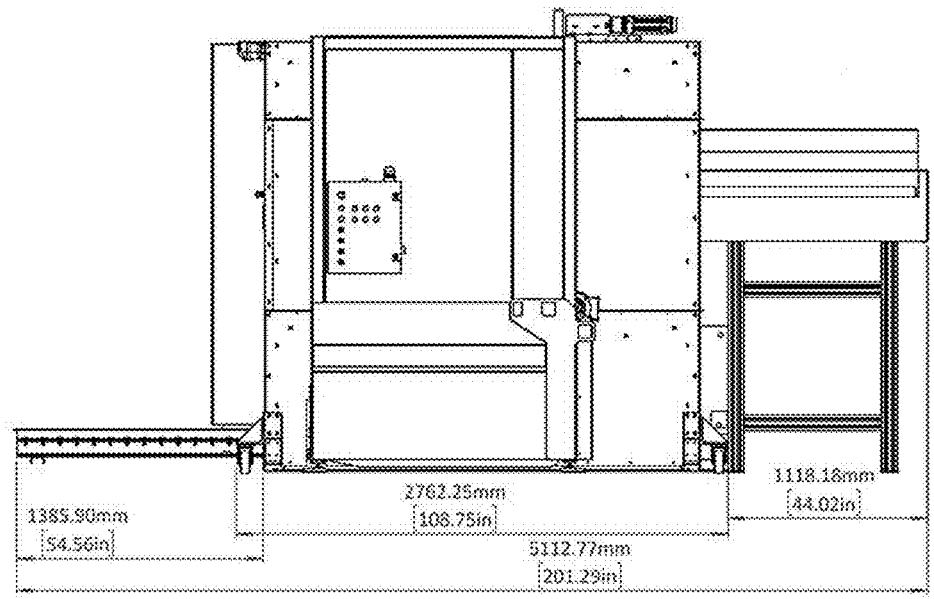
FIG. 39 illustrates a right side view of a compact palletizer with a pallet dispenser, outfeed conveyors, and a tier sheet dispenser according to the present invention.
Figure 40:
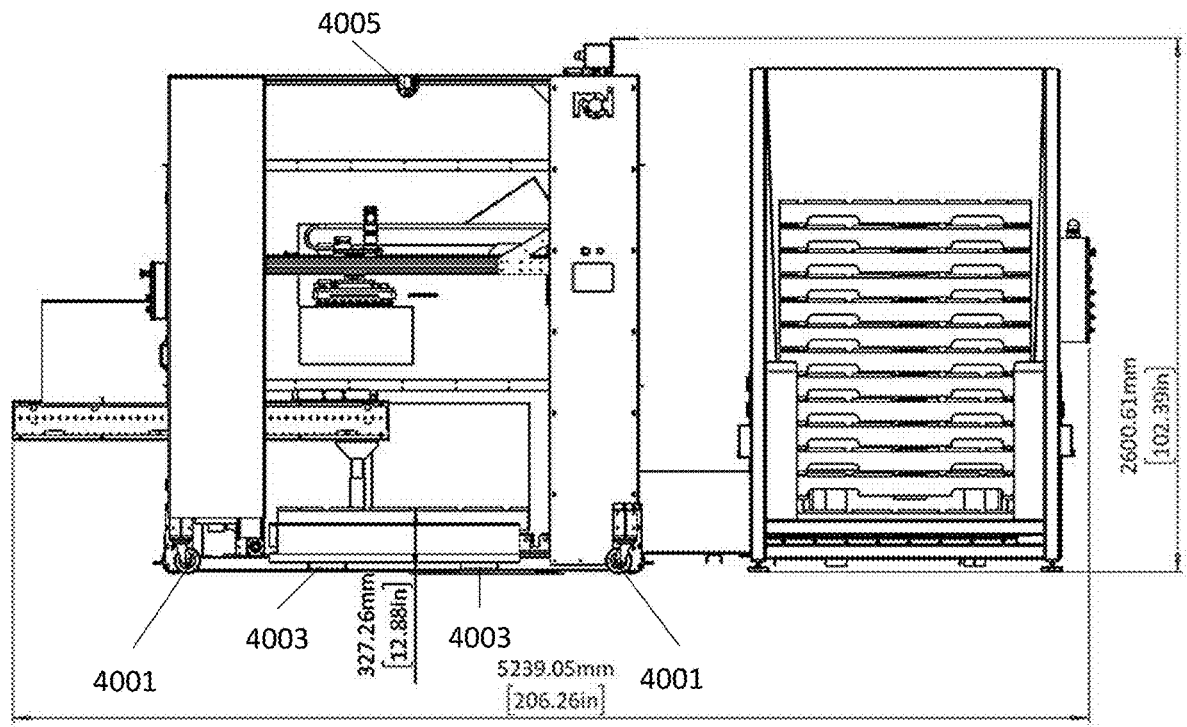
FIG. 40 illustrates a front view of a compact palletizer with a pallet dispenser and infeed and outfeed conveyors according to the present invention.
Figure 41:
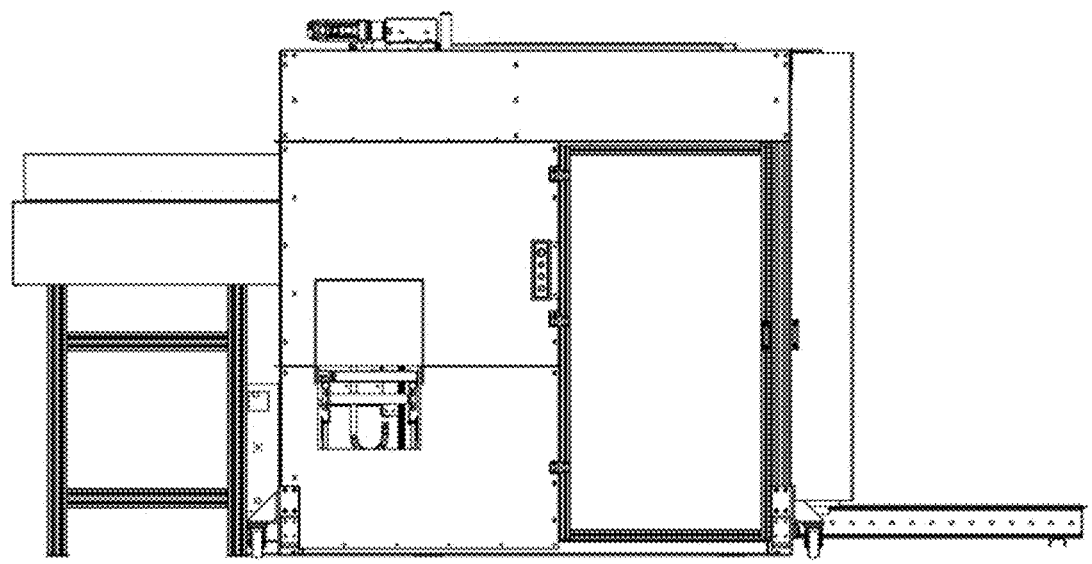
FIG. 41 illustrates a left side view of a compact palletizer with a tier sheet dispenser according to the present invention.

The indexing conveyor 3801 is controlled by an automated control system, a pre-programmed timing operation, or manually by an operator. A side panel or rear panel of the compact palletizer includes cutaways positioned such that the indexing conveyor 3801 and the transferred pallet are aligned and fed through. In the illustrated embodiment, the products are delivered to the palletizer through a side infeed conveyor 3807 however one skilled in the art will recognize that a conveyor is operable to be positioned on the rear, front, or multiple sides of the palletizer. Similarly, while the pallet dispenser 3809 is depicted as being positioned adjacent to the side of the palletizer, the pallet dispenser 3809 is operable to be positioned in any manner that connects to the indexing conveyor 3801. Similarly, in further embodiments, one or more of a tier sheet dispenser, infeed conveyor, outfeed conveyor, or any other attachment is operable to be positioned in any of these desired positions along with appropriate modifications to side panels or screens for attachment and delivery of objects. In one embodiment, the pallets are loaded into and dispensed from the pallet dispenser 3809 such that the pallet does not need to be rotated to be in alignment with a pallet placement station. For example, in one embodiment the pallet is dispensed with the front of the pallet facing the same direction as the front of the palletizer, and the indexing conveyor 3801 maintains this orientation while transporting the pallet to the pallet platform 3803. In a depalletizing embodiment, the objects are depalletized from a pallet delivered along an infeed conveyor, whereby the depalletized objects are removed along an outfeed conveyor, and the pallets are removed along a second outfeed conveyor. While the conveyors shown are roller conveyors, one skilled in the art will recognize that the present invention is operable to be used with any conveyor capable of delivering and removing pallets and objects (e.g., a belt conveyor). FIGS. 39, 40, and 41 illustrate right, front, and left views, respectively, of the palletizer with the pallet dispenser and tier sheet dispenser.

FIG. 40 illustrates a front view of the compact palletizer of FIG. 38, wherein the palletizer includes four swivel wheels (two front swivel wheels 4001 and two rear swivel wheels). Due to its relatively light weight, the palletizer is operable to be moved by raising any leveling pads so that the palletizer is resting on the swivel wheels and pushing the palletizer. Alternatively, forklift pockets 4003 allow for movement of the compact palletizer through use of a forklift. In the illustrated embodiment, the forklift pockets 4003 extend from the front side to the rear side of the compact palletizer and are accessible from either side. The increased portability supplied by the forklift pockets and wheels as well as the compactness of the machine is a significant advantage over other palletizer systems, which are usually permanently installed and are not as adaptable to multiple manufacturing and packaging needs as the present invention.

FIG. 40 further illustrates a scanner 4005, which is operable to prevent unsafe access, track pallets, incoming products, and palletized products as well as scan elements on the products (e.g., barcodes, QR codes, and/or any other type of tag or identifier) and measure speed or size of the products. In another embodiment, the scanner includes a radio frequency (RF) or Near Field Communication (NFC) component which is operable to identify or scan RF or NFC tags on the products or sets of products. The sensor output is combined with the control system to assure an efficient palletizing or depalletizing process and to track products and pallets. Scanners are placed along a horizontal bar above at least one of any input or output conveyor or pallet placement station. In one embodiment, the scanner has mobility along a vertical support post or horizontal support bar with a track and/or motors. By way of example, the scanner is moveable via a structure similar to the y-axis subassembly, with the structure including a motor, bearing blocks, linear rails, and a timing belt. In another embodiment, the palletizer ceases operation, breaks a power supply, and/or displays a warning signal (e.g., a flashing light or sound) upon sensing a human or unsafe object within the bounds of the palletizer.

Notably, the palletizer is operable to have any number of conveyors for infeed and outfeed, for example, two conveyors on a left side, two on a right side, and two on a rear side.

Figure 42A:
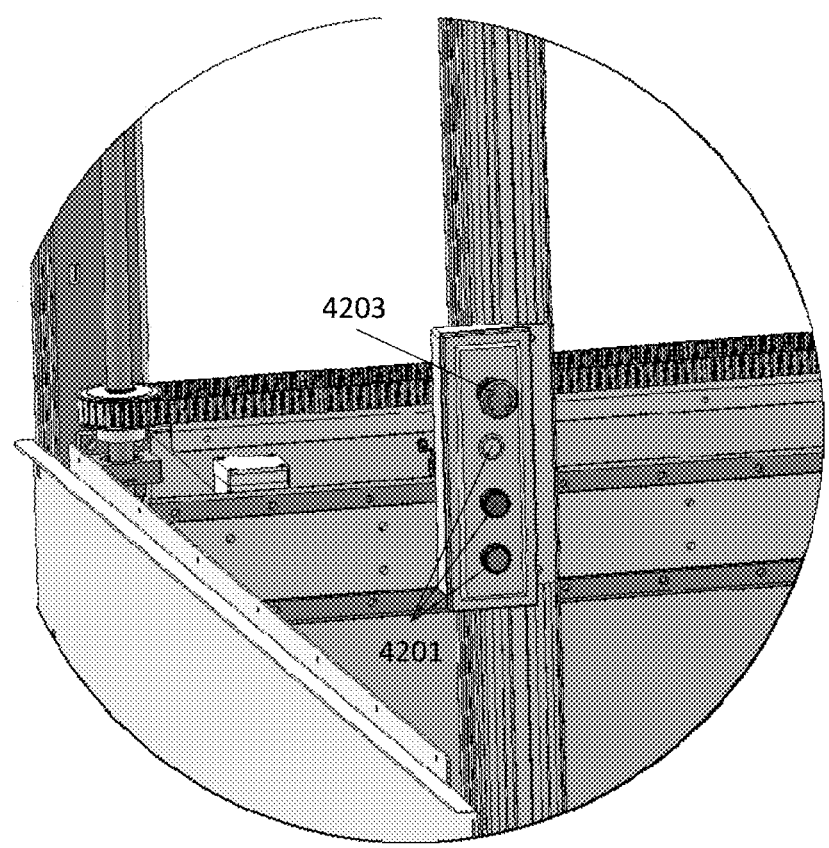
FIG. 42A illustrates a control mechanism according to the present invention.

FIG. 42A illustrates a control mechanism for the compact palletizer, wherein buttons 4201 on the control mechanism initiate functions of the system, including start, stop, or emergency stop procedures. In one embodiment, the palletizer does not begin palletizing before one or more buttons on one or more control mechanisms are simultaneously pressed. A dial 4203 further controls gradual functions of the compact palletizer, for example palletizing speed or infeed supply rate. Further operations of the control mechanisms include EOAT palletizing speed, height adjustments, or control and/or activation of externally attached equipment, including a conveyor, pallet dispenser, or tier sheet or slip sheet dispenser. Notably, the control mechanism is not limited to buttons and dials, but one skilled in the art will recognize that control mechanisms include switches, touch screens, infrared sensors, or any other human-machine interface (HMI) equipment.

Figure 42B:
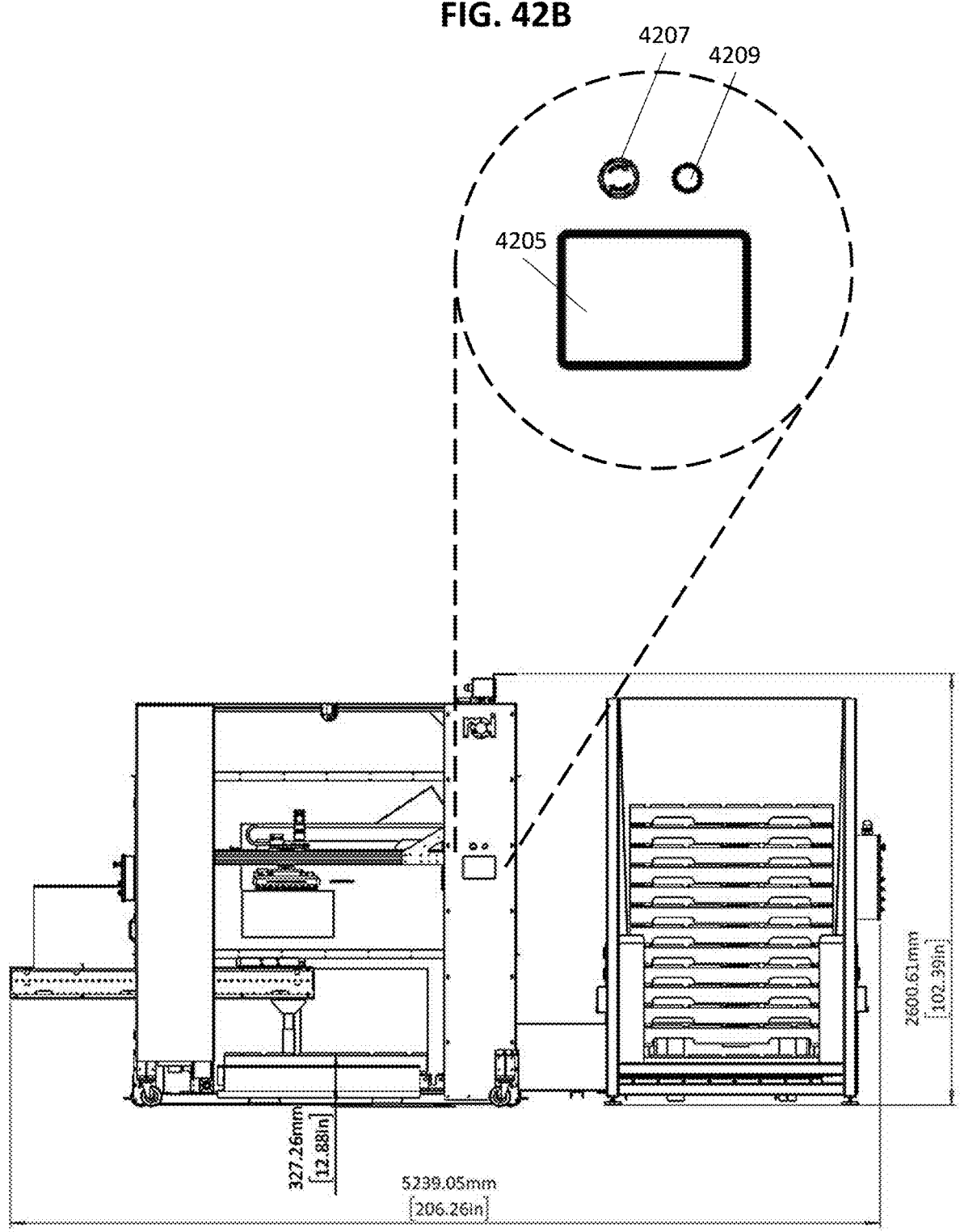
FIG. 42B illustrates a Human Machine Interface (HMI) screen and control buttons according to the present invention.

FIG. 42B illustrates an HMI embodiment of the control mechanism of the present invention. A screen 4205 is operable to display information about the operation of the palletizer, including a speed of operation, connected conveyors, connected external equipment, a selected pallet platform for palletizing, a configuration file, etc. In one embodiment, the screen 4205 is a touchscreen operable to receive inputs from a user, wherein the inputs from the user adjust the speed of operation of the palletizer, set operational preferences, and/or adjust a configuration file. Additional control mechanisms, including buttons, knobs, switches, and dials, are preferably connected to the HMI, wherein variables adjusted by the control mechanisms are relayed to and displayed on the screen 4205. For example, in the illustrated embodiment, a button 4209 and a dial 4207 provide further control of the compact palletizer.

Figure 43:
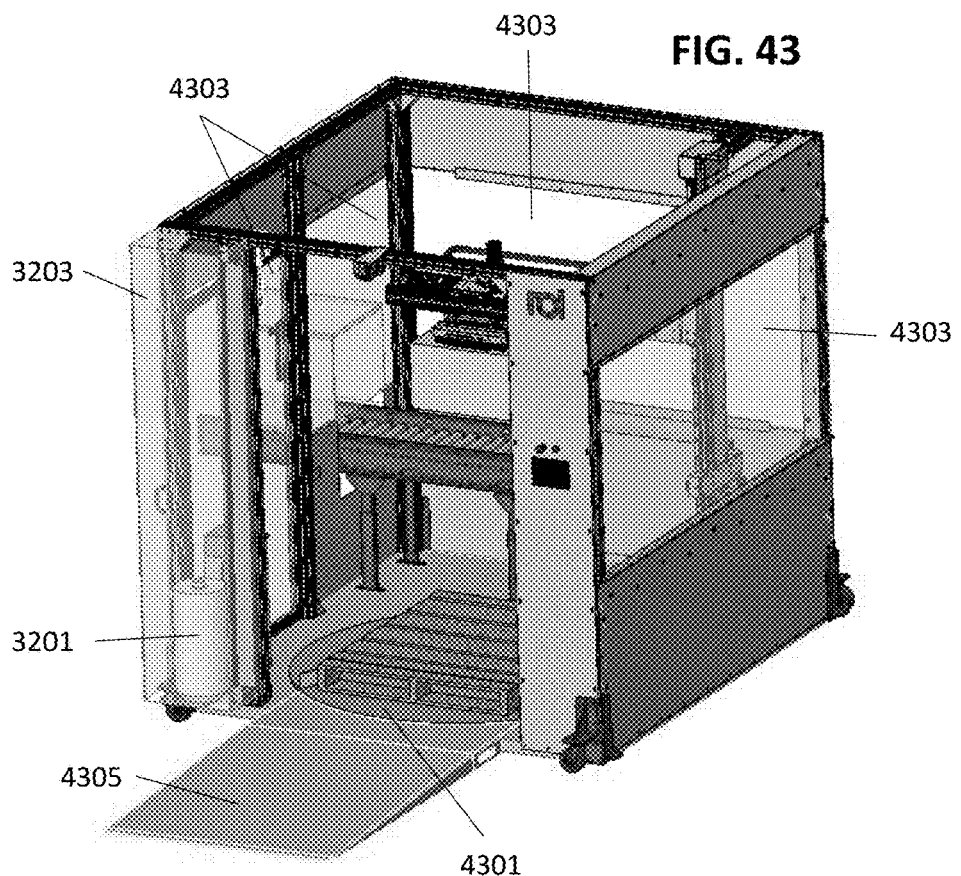
FIG. 43 illustrates a front perspective view of a compact palletizer including a pallet jack ramp, a stretch wrap system, and a stretch wrap protective guard according to the present invention.

FIG. 43 illustrates another embodiment of the compact palletizer. The compact palletizer is constructed with a stretch wrap system that includes a film pre-stretch unit 3201 for semi-automatic palletizing operations. The compact palletizer includes a pallet platform 4301, which performs as a turntable during the wrapping process. A stretch wrap protective guard 3203 is operable to open through a hinged door mechanism or have a sliding panel for access to a pre-stretch unit. Side panels are further operable to provide hinged or sliding door access to the stretch wrap system. FIG. 43 further illustrates one embodiment wherein plexiglass panels 4303 are placed between each the vertical posts and allow for protection as well as visual monitoring of the system while in operation. The illustrated embodiment includes plexiglass panels attached to the sides and rear of the compact palletizer, however, one skilled in the art will recognize that the palletizer is constructed to allow for the panels to be positioned in the front or top as well, wherein the panels have a position and size that would not inhibit the palletizing and pallet removal process. Furthermore, in an additional embodiment, the plexiglass panels are replaced with polycarbonate panels, wire mesh panels, or any other material that provides both visibility and safety. In an alternative embodiment, the panels are replaced with opaque panels (e.g., aluminum panels) for improved safety and durability in certain palletizing operations.

Loaded pallets are operable to be removed through manual methods (e.g., a forklift) or through automatic means, including a conveyor or transfer chain system. FIG. 43 further illustrates a pallet jack ramp 4305 that allows access to any pallets placed on the pallet platform 4301. The ramp is constructed to allow attachment to the palletizer and easy removal when moving the palletizer.

Figure 44:
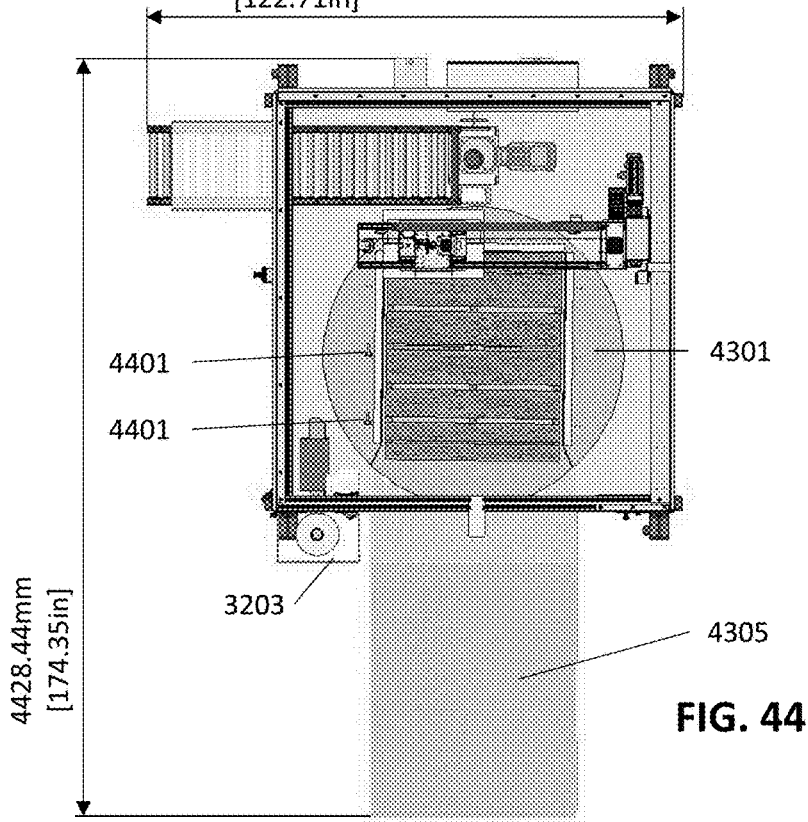
FIG. 44 illustrates a top view of a compact palletizer including a stretch wrap system, clips for stretch wrap film, and a stretch wrap protective guard for inserting and removing a stretch wrap roll according to the present invention.
Figure 45:
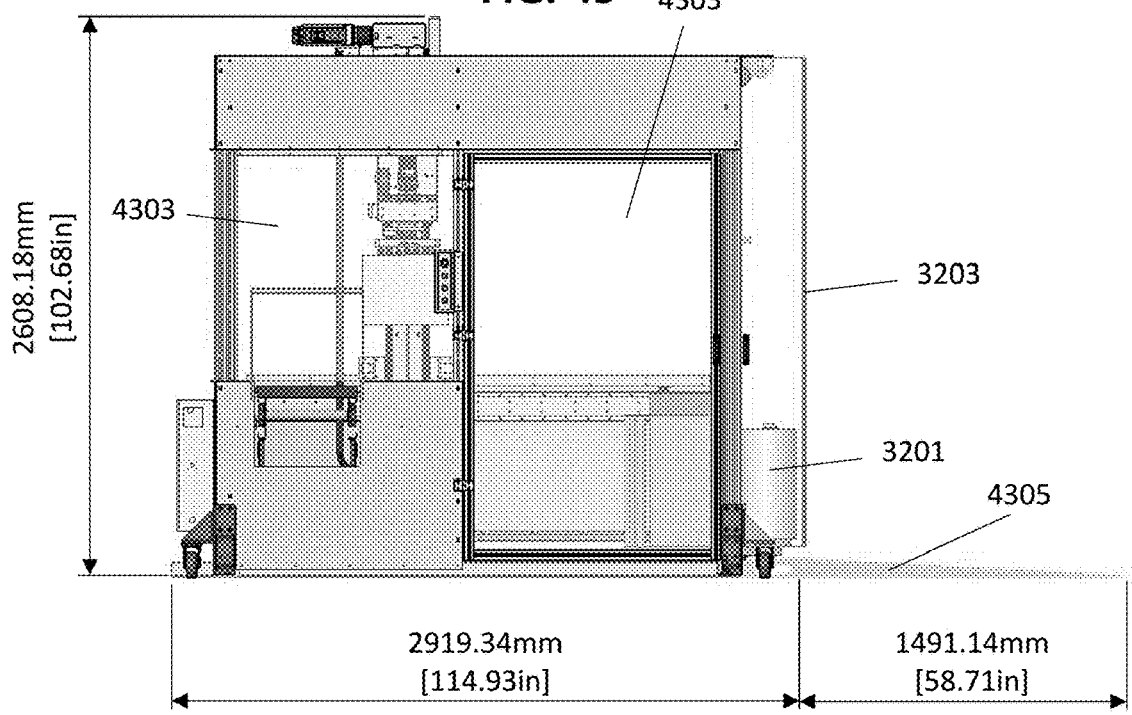
FIG. 45 illustrates a left side view of a compact palletizer including a stretch wrap system, a stretch wrap protective guard, and a pallet jack ramp according to the present invention.
Figure 46:
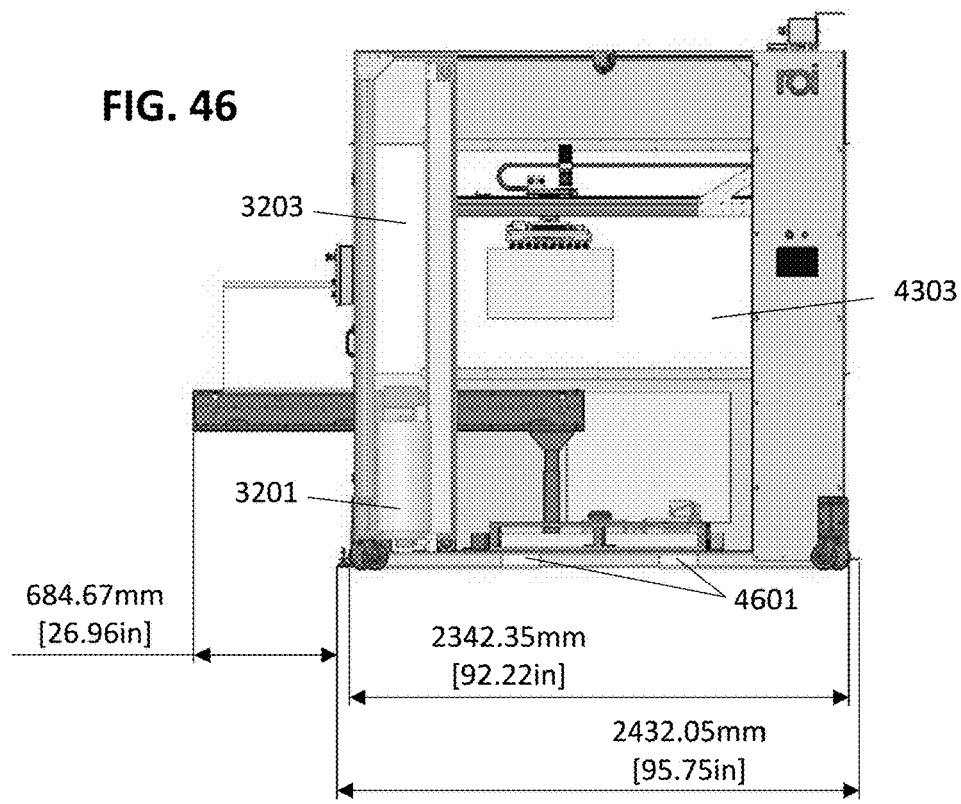
FIG. 46 illustrates a front view of a compact palletizer with a stretch wrap system and forklift pockets according to the present invention.

FIG. 44 illustrates a top view of the compact palletizer, wherein stretch wrap clips 4401 allow for manual placement of stretch wrap film prior to activating the stretch wrap system or automatic placement of stretch wrap film by a swing arm. In the manual embodiment illustrated, the stretch wrap clips 4401 are operable to hold an unrolled end of stretch wrap film roll. Upon finishing a palletizing procedure, the stretch wrap is manually cut and reattached to the stretch wrap clips 4401 for the next palletizing procedure. FIGS. 45 and 46 further illustrate left and front views, respectively, of the compact palletizer with a stretch wrap system. The front view of FIG. 46 illustrates an embodiment without a pallet jack ramp, wherein forklift pockets 4601 extend from a front side to a rear side of the palletizer and are accessible by a forklift from either of the sides for transportation of the compact palletizer.

Figure 47A:
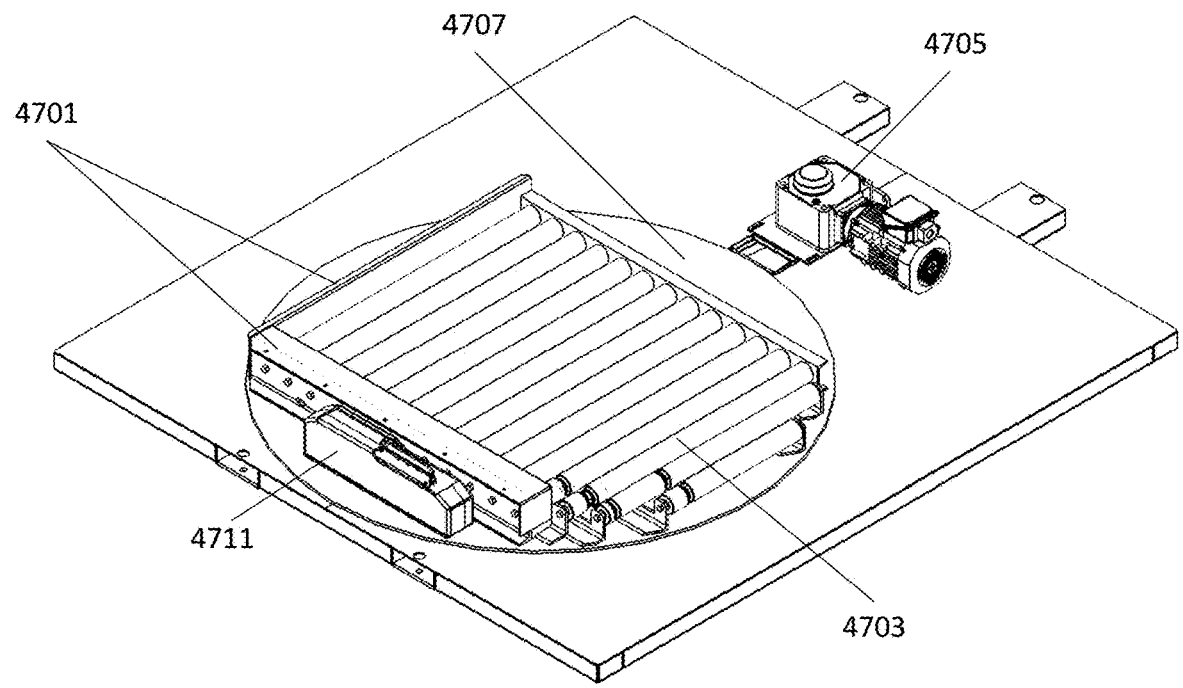
FIG. 47A illustrates an isometric view of a pallet platform with an automatic stretch wrap gripper according to the present invention.
Figure 47B:
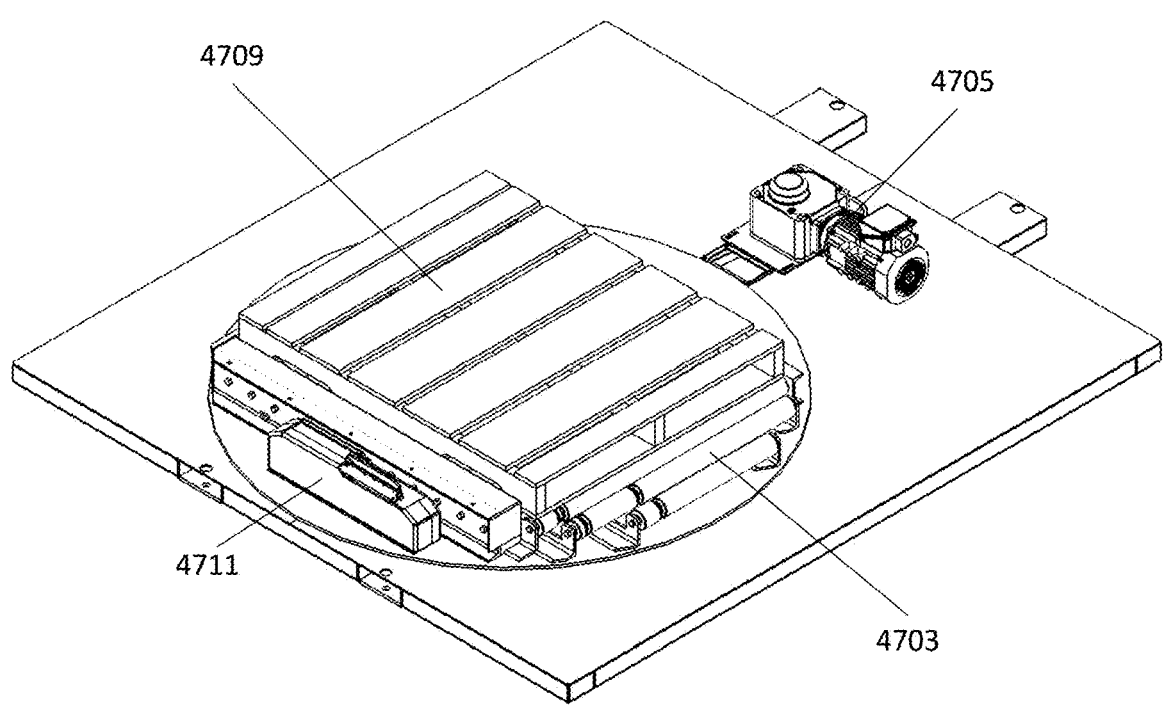
FIG. 47B illustrates an isometric view of a pallet platform with a pallet and automatic stretch wrap gripper according to the present invention.

FIG. 47A illustrates an isometric view of the pallet platform including positioning rails 4701 and rollers 4703. A motor 4705 controls the rotation of the turntable 4707. Further illustrated is an automatic stretch wrap gripper 4711, which is operable to clamp stretch wrap film automatically upon completing a wrapping cycle and/or when activated by a swing arm. In one embodiment, the positioning rails 4701 are operable to automatically align palletized objects through linear movement towards the palletized objects. The positioning rails 4701 are further operable to activate the rollers 4703 upon actuation by a motor. In one embodiment, the stretch wrap grip is further operable to cut the stretch wrap film without the swing arm and performs independently of the swing arm. In alternative embodiments, the stretch wrap grip is replaced with hooks, clamps, grips, high-friction surfaces, or any other construction operable to secure stretch wrap film for wrapping or cutting. FIG. 47B illustrates an isometric view of the pallet platform with a pallet 4709 placed on the rollers 4703.

Figure 48A:
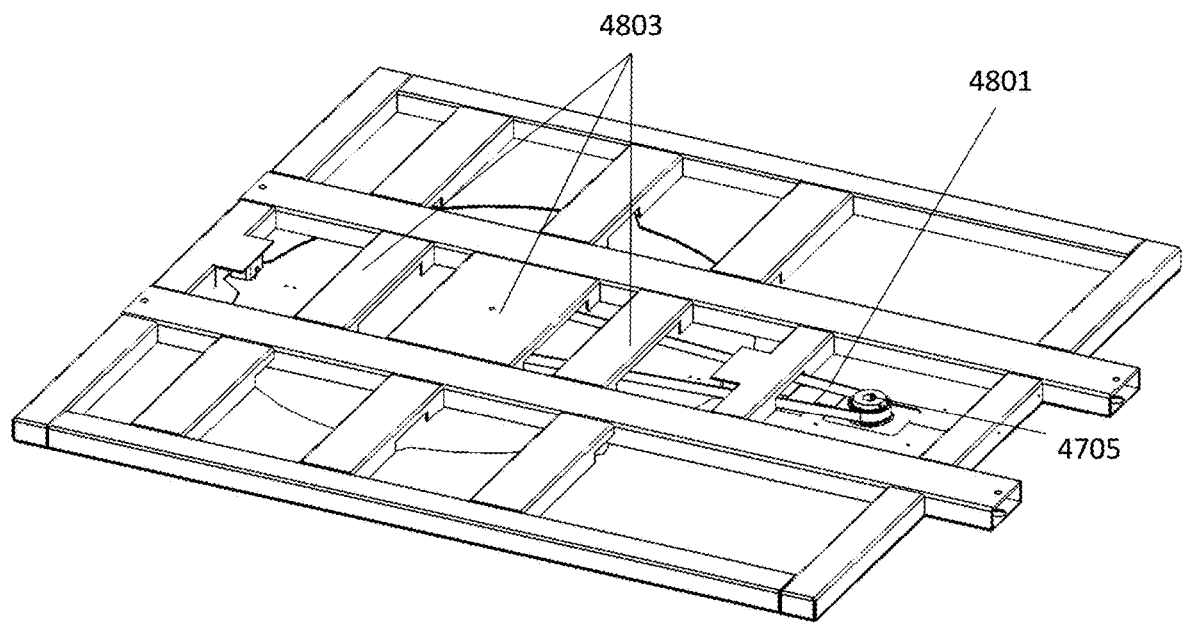
FIG. 48A illustrates a bottom perspective view of a pallet platform with crosspieces according to the present invention.
Figure 48B:
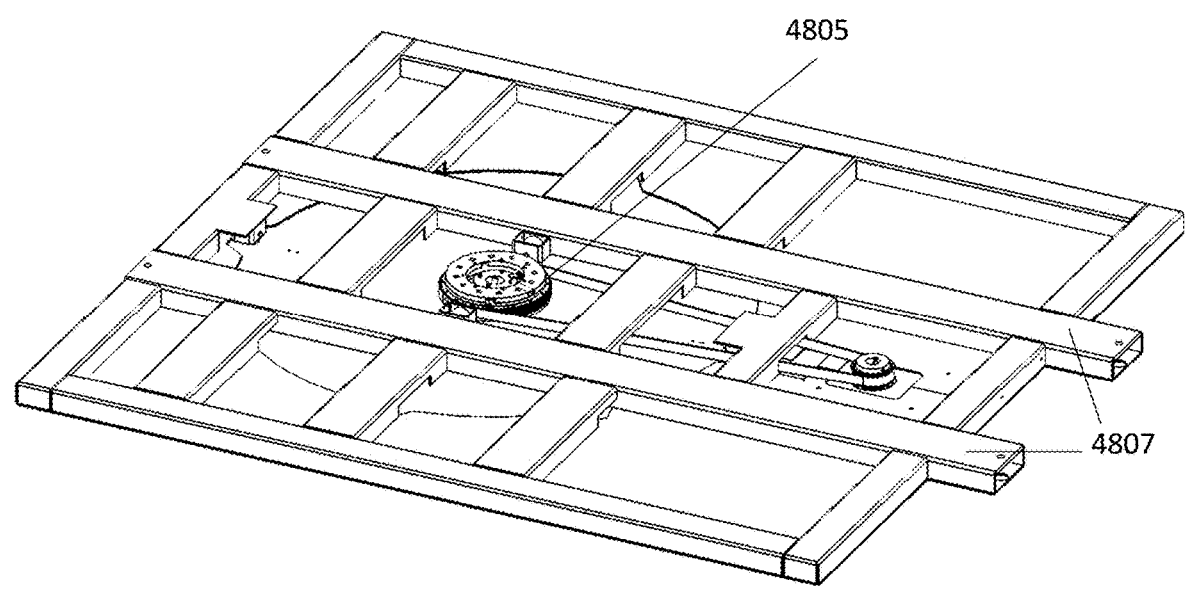
FIG. 48B illustrates a bottom perspective view of a pallet platform with a removed crosspiece according to the present invention.

FIG. 48A illustrates a bottom perspective view of the pallet platform, wherein the bottom of the motor 4705 controls a belt 4801. Crosspieces 4803 secure the belt 4801 and the slewing bearing (see FIG. 48B, 4805) in place. FIG. 48B illustrates a slewing bearing 4805, which controls the rotational movement of the turntable above. FIG. 48B further illustrates forklift pockets 4807, which allow for access by a forklift to easily move the compact palletizer.

Figure 49A:
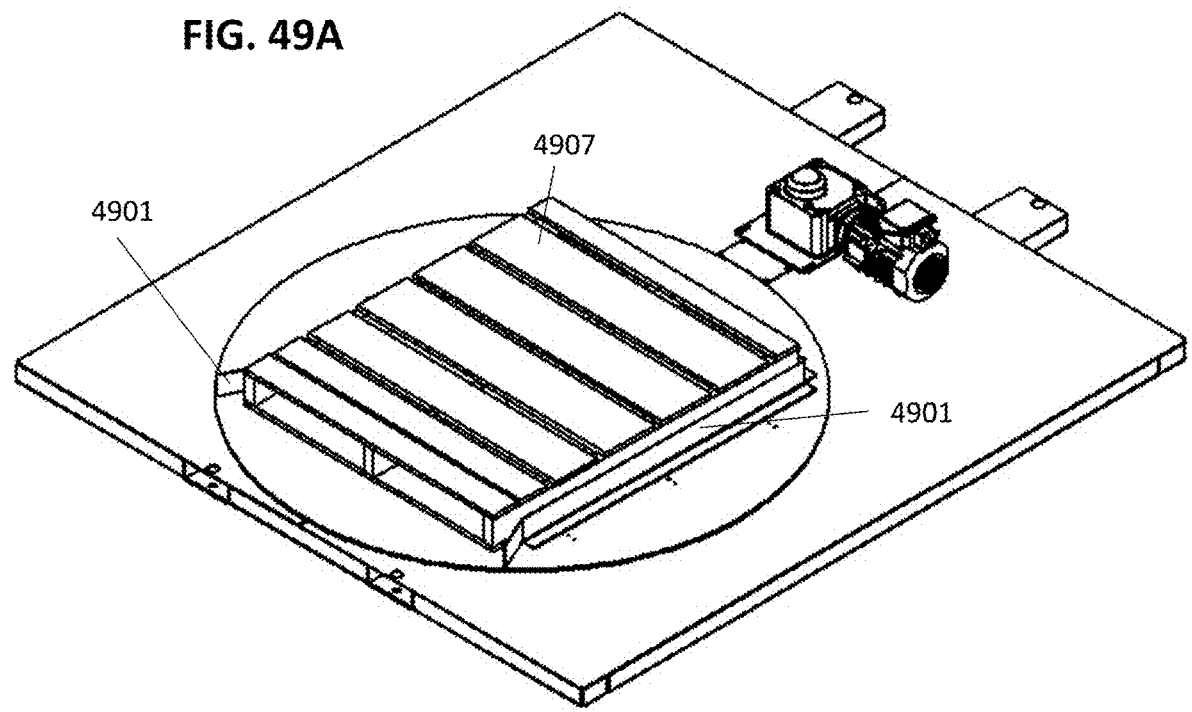
FIG. 49A illustrates a top isometric view of a semi-automatic pallet platform with a turntable, positioning rails, and a pallet according to the present invention.
Figure 49B:
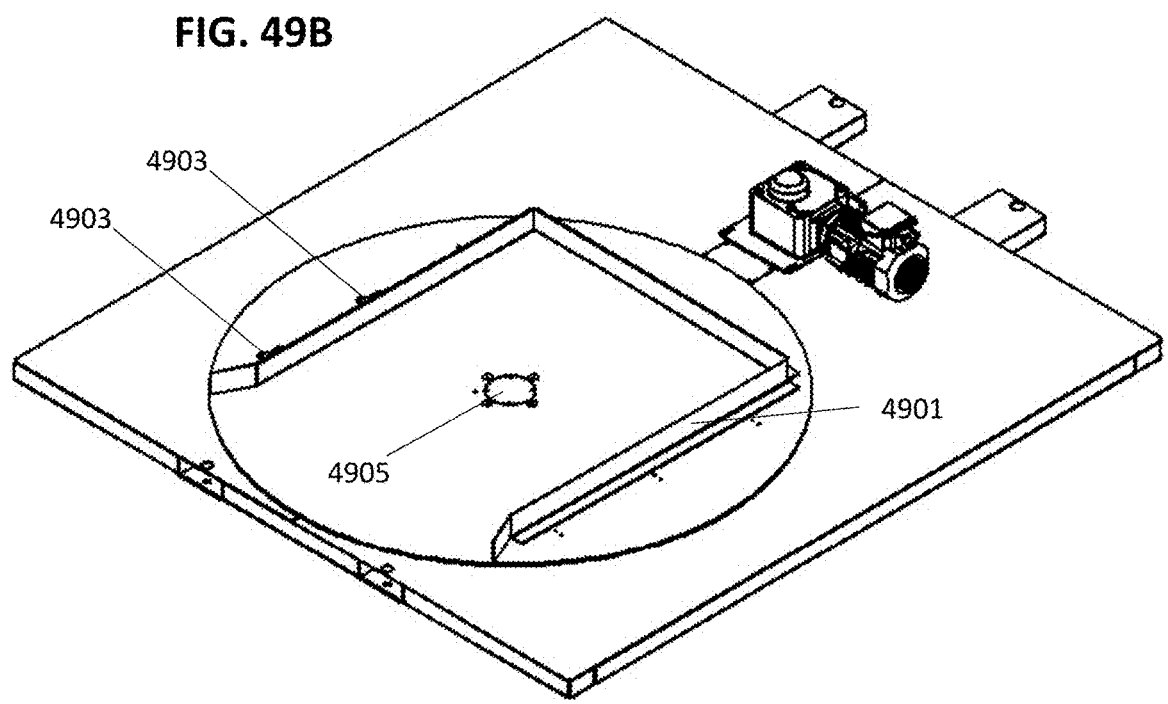
FIG. 49B illustrates a top isometric view of a semi-automatic pallet platform with a turntable, clips, and positioning rails according to the present invention.

FIG. 49A illustrates an isometric view of one embodiment of a semi-automatic pallet platform with turntable and a pallet 4907. When placed in the palletizer, a pallet sits within positioning rails 4901, which are preferably constructed and positioned to provide support to the pallet 4907 from three sides. FIG. 49B illustrates an isometric view of a semi-automatic pallet platform with turntable without a pallet. Notably, the turntable of the semi-automatic pallet platform is similar to that of automatic pallet platform. However, in the semi-automatic embodiment, the positioning rails 4901 are paired with clips 4903 (see also FIG. 44, 4401) instead of an automatic clamp or automatic grabber. The turntable is connected to a slewing bearing with a turntable plug 4905, which rotates the pallet platform upon actuation by a motor with a drive belt.

Figure 50A:
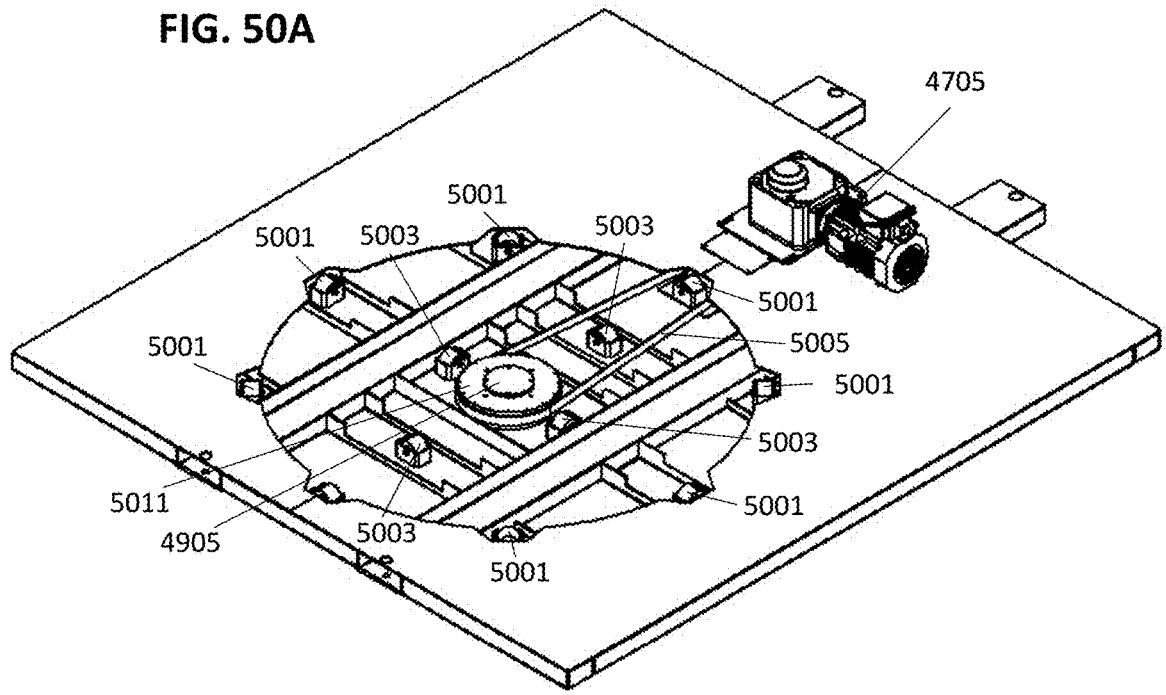
FIG. 50A illustrates a top isometric view of manual pallet platform with inner and outer wheels, a slewing bearing, and a turntable plug according to the present invention.

FIG. 50A illustrates an isometric view of a semi-automatic pallet platform with the turntable removed. A center plate 4905 covers an annular opening of a slewing bearing 5011 for this semi-automatic embodiment. Inner wheels 5003 and outer wheels 5001 support a turntable when attached and allow for the turntable to smoothly rotate when actuated by a gear motor 4705, timing belt 5005, and slewing bearing 5011. The inner and outer wheels (5003 and 5001) also provide distributed support for up to approximately 1814.369 kg (4000 pound (lb)) loads. Upon activation of the timing belt 5005, the slewing bearing 5011 rotates an attached turntable. In one embodiment, the slewing bearing 5011 is operable to rotate up to approximately 12 rpm. In the illustrated embodiment, the slewing bearing 5011 is operable to attach to a turntable through screws or bolts and rotates the turntable upon actuation by a motor with a drive belt. However, in alternative embodiments, a turn table is rotated by way of a slewing bearing fitted to a slotted section of the turntable, a drive shaft operably connected to a gear or bearing, and/or powered wheels that frictionally drive the turntable. Additionally, the slewing bearing 5011 is operable to be replaced with any suitable bearing or gear that is operable to facilitate rotational movement of the turntable.

Figure 50B:
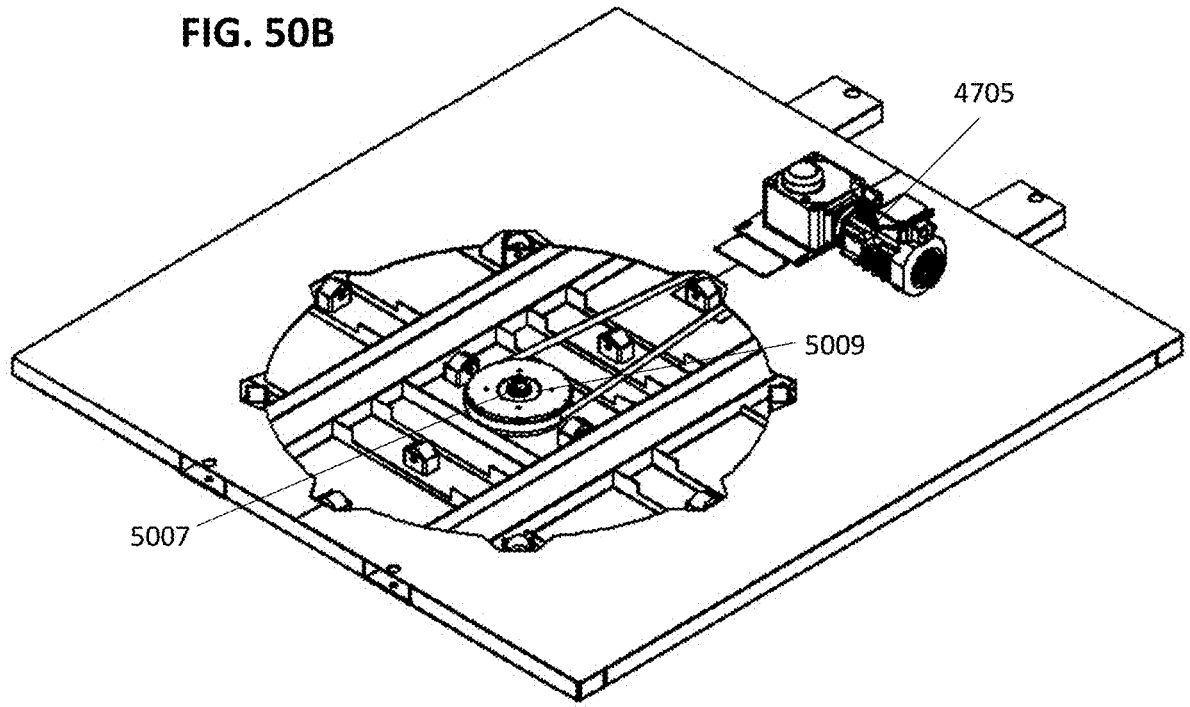
FIG. 50B illustrates a top isometric view of an automatic pallet platform with an electric slip ring and a pneumatic rotary manifold according to the present invention.
Figure 51:
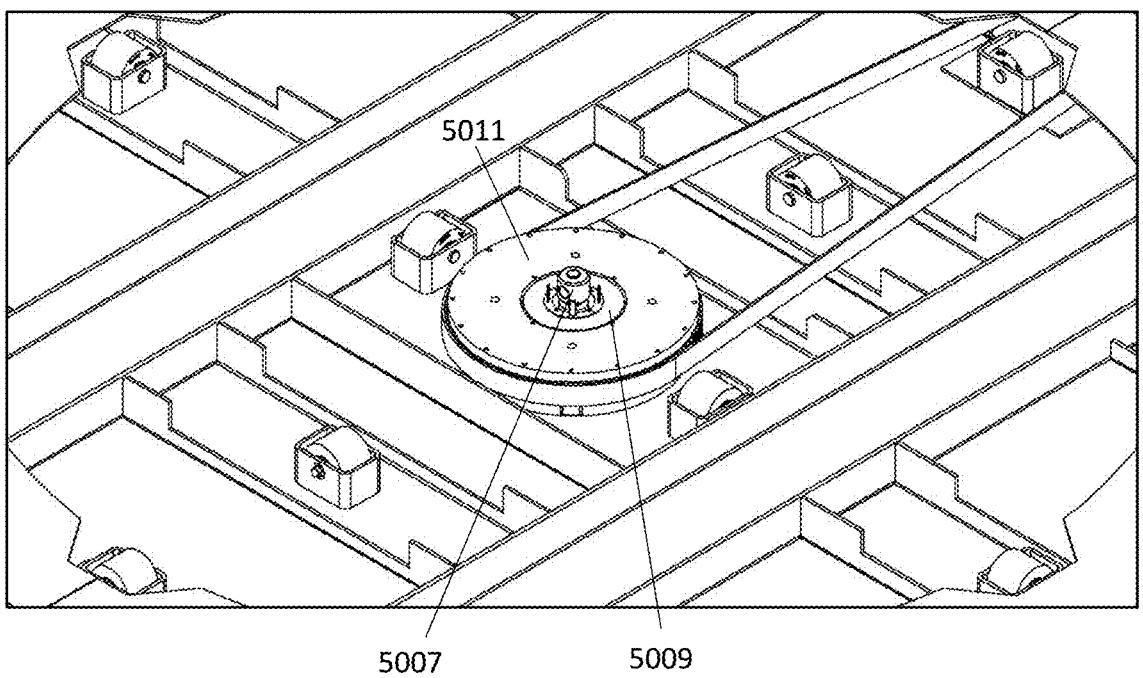
FIG. 51 illustrates a detail view of an automatic pallet platform with an electric slip ring, pneumatic rotary manifold, and a slewing bearing according to the present invention.

FIG. 50B illustrates one embodiment of an automatic pallet platform, wherein the center cover plate of the semi-automatic pallet platform is replaced by a pneumatic rotary manifold 5007 and an electric slip ring 5009, which provide power and control to conveyors, automatic stretch wrap gripper, and/or positioning devices of the automatic pallet platform. FIG. 51 illustrates a detail view of the slewing bearing 5011 with pneumatic rotary manifold 5007 and electric slip ring 5009. In alternative embodiments, the pneumatic rotary manifold 5007 is replaced with a hydraulic rotary manifold or any other manifold capable of providing control to the automatic systems of the compact palletizer.

Figure 52A:
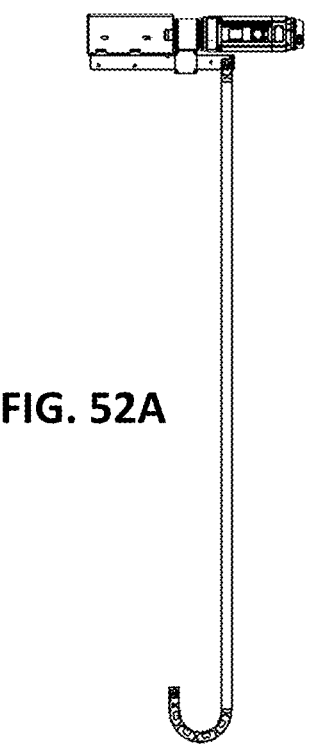
FIG. 52A illustrates a front view of a cable carrier according to the present invention.
Figure 52B:
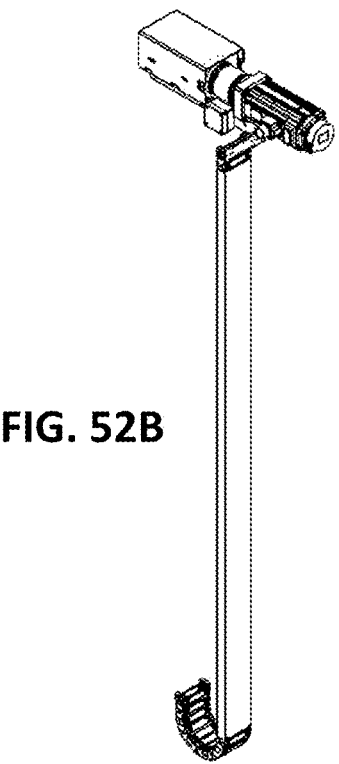
FIG. 52B illustrates an isometric view of a cable carrier according to the present invention.

FIGS. 52A and 52B illustrate a front view and an isometric view, respectively, of a cable carrier. The cable carrier assists in organizing and managing electrical cables and pneumatic tubing for the palletizer.

Figure 53A:
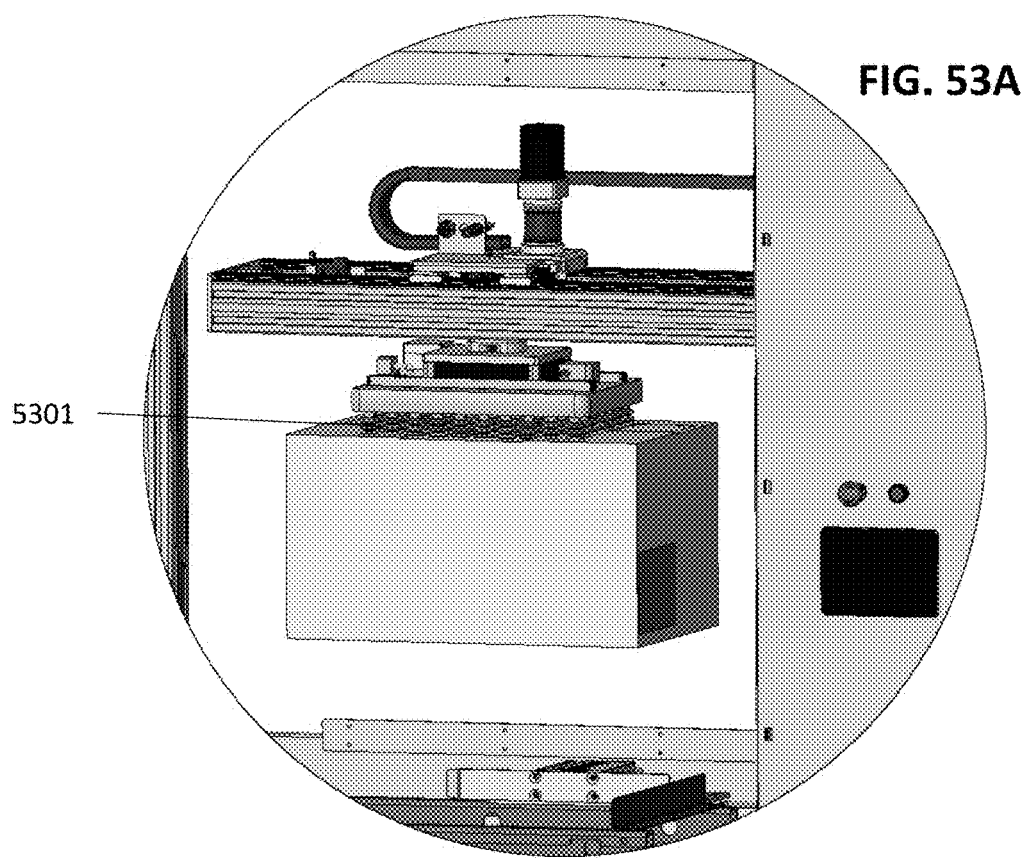
FIG. 53A illustrates one embodiment of an end-of-arm tooling (EOAT) subassembly with a vacuum gripper according to the present invention.
Figure 53B:
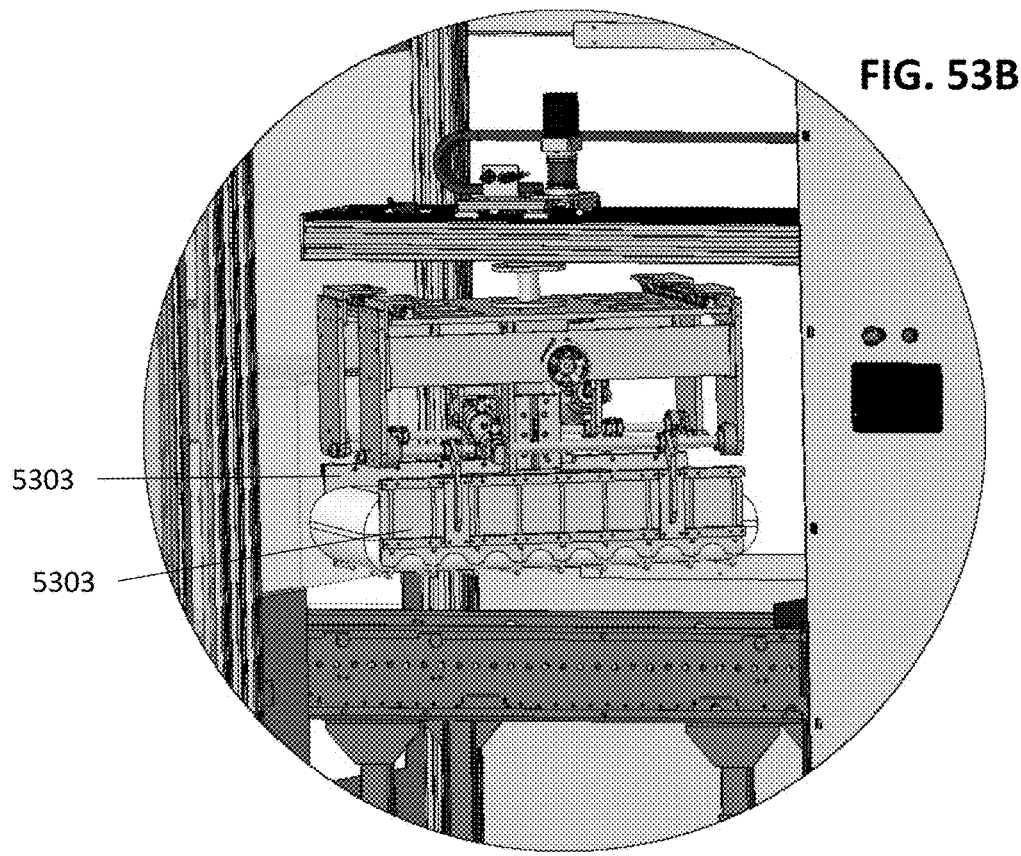
FIG. 53B illustrates one embodiment of an EOAT subassembly with a bag gripper according to the present invention.
Figure 53C:
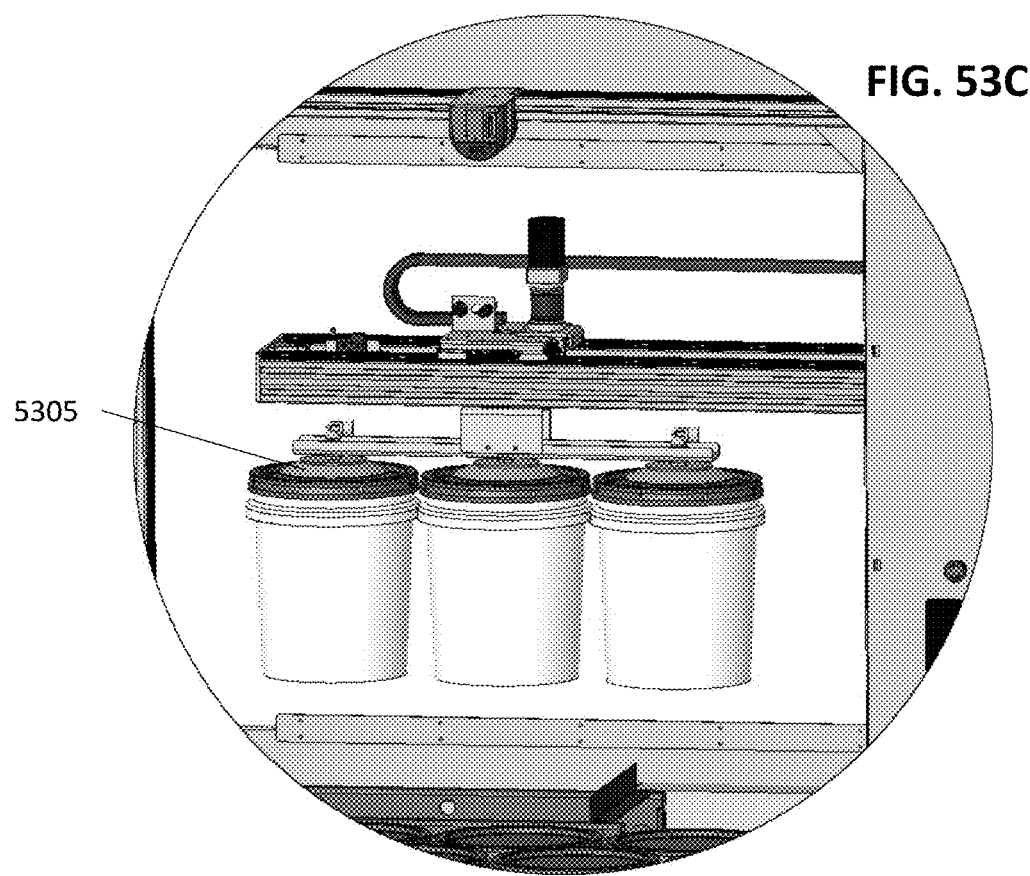
FIG. 53C illustrates one embodiment of an EOAT subassembly with a pail gripper according to the present invention.

In further embodiments, the EOAT is operable to be constructed with or have an attachment for multiple types of grippers. FIG. 53A illustrates one embodiment of a vacuum gripper, wherein upon automatic or manual activation and deactivation of a vacuum system, the EOAT is operable to securely attach to and release an object during palletizing procedures through a plurality of small suction cups 5301. In one embodiment, the plurality of suction cups 5301 comprises 70 suction cups between approximately 5.08 cm (2 inches) and 15.24 cm (6 inches) in diameter each. FIG. 53B illustrates a bag gripper embodiment of the EOAT, wherein rotating panels with hooks 5303 are operable to grab, transport, and release bags and packages with straps and/or handles. FIG. 53C illustrates a pail gripper embodiment of the EOAT, wherein upon automatic or manual activation of a vacuum system, the EOAT is operable to securely attach to and release multiple objects through a plurality of large suction cups 5305. In one embodiment, the plurality of large suction cups 5305 comprises three suction cups between approximately 15.24 cm (6 inches) and 60.96 cm (2 feet) in diameter each. The plurality of large suction cups 5305 and the plurality of small suction cups 5301 are operable to be positioned in a line configuration, grid configuration, diagonal configuration, or any configuration required for secure and efficient palletizing procedures. Alternatively, in each of the EOAT embodiments, the palletizer is operable to activate a vacuum system for each suction cup or a cluster of suction cups individually through a manifold or other control mechanism. The vacuum system of the EOAT is operable to be connected to a main pneumatic system for the palletizer or have a dedicated pump for pneumatic control of a gripper.

The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A compact palletizer comprising:
   a skeleton including a base, a frame, and an x-axis structure attached to the frame;
   an assembly including an x-axis subassembly, a y-axis subassembly, and a z-axis subassembly; and
   a stretch wrap system positioned at least partially inside the frame;
   wherein the x-axis subassembly is attached to the x-axis structure, and the x-axis subassembly provides an interface for movement of the z-axis subassembly;
   wherein the z-axis subassembly is attached to the y-axis subassembly, and the z-axis subassembly provides an interface for movement of the y-axis subassembly; and
   wherein the stretch wrap system includes a pre-stretch unit and a turntable.

2. The compact palletizer of claim 1, wherein the turntable further includes a stretch wrap gripper operable to automatically secure an unrolled end of a stretch wrap film roll.

3. The compact palletizer of claim 1, wherein the z-axis subassembly includes a chassis subassembly and a spine, wherein the chassis subassembly is operable to move vertically along the spine.

4. The compact palletizer of claim 1, wherein the y-axis subassembly is attached to the z-axis subassembly via a chassis subassembly and a spine.

5. The compact palletizer of claim 1, wherein the pre-stretch unit translates along a vertical track automatically or based on manual input.

6. The compact palletizer of claim 1, wherein the turntable automatically or manually rotates to facilitate stretch wrapping of palletized objects.

7. The compact palletizer of claim 1, further comprising a theta axis subassembly, wherein the theta axis subassembly includes an end of arm tooling (EOAT) subassembly.

8. The compact palletizer of claim 1, further comprising at least one pallet dispenser, wherein the at least one pallet dispenser delivers pallets to the compact palletizer via an indexing conveyor.

9. The compact palletizer of claim 1, wherein the compact palletizer is less than approximately 2.3484 meters (96 inches) in length, between approximately 2.6924 and 3.6576 meters (106 and 144 inches) in height, and less than approximately 2.7686 meters (109 inches) in depth.

10. A compact palletizer comprising:
a skeleton including a base and a frame;
an assembly attached to the frame, the assembly including an end of arm tooling (EOAT) subassembly; and
a stretch wrap system positioned at least partially inside the frame;
wherein the stretch wrap system includes a pre-stretch unit and a turntable; and
wherein the turntable further includes an attached stretch wrap gripper operable to automatically secure an unrolled end of a stretch wrap film roll.

11. The compact palletizer of claim 10, wherein the stretch wrap system further comprises a swing arm with a wiper.

12. The compact palletizer of claim 10, wherein the assembly further includes an x-axis subassembly, a y-axis subassembly, and a z-axis subassembly.

13. The compact palletizer of claim 10, wherein a calibration configuration of the compact palletizer is location-independent.

14. The compact palletizer of claim 10, further comprising an infeed conveyor and an outfeed conveyor.

15. A compact palletizer comprising:
a skeleton including a base and a frame;
an assembly attached to the frame, the assembly including an end of arm tooling (EOAT) subassembly; and
a stretch wrap system positioned at least partially inside the frame;
wherein the stretch wrap system includes a pre-stretch unit and a turntable; and
wherein the compact palletizer is operable to palletize a set of objects using the EOAT subassembly and wrap the palletized set of objects using the stretch wrap system.

16. The compact palletizer of claim 15, wherein the compact palletizer is operable to palletize the set of objects at a rate between 8 objects per minute and 16 objects per minute.

17. The compact palletizer of claim 15, further comprising a control system, wherein the control system is operable to govern a movement of the EOAT subassembly and a placement of the set of objects on a pallet.

18. The compact palletizer of claim 15, further comprising a scanner, which is operable to detect objects entering within a proximity of the frame of the compact palletizer.

19. The compact palletizer of claim 18, wherein the compact palletizer is further operable to identify the set of objects or elements of the set of objects via the scanner.

20. The compact palletizer of claim 15, further comprising a pallet dispenser, wherein the pallet dispenser is operable to deliver a pallet to the compact palletizer.

* * * * *